US011973218B2

(12) United States Patent
Zhou et al.

(10) Patent No.: US 11,973,218 B2
(45) Date of Patent: Apr. 30, 2024

(54) POSITIVE ELECTRODE SHEET, SECONDARY BATTERY, BATTERY MODULE, BATTERY PACK, AND ELECTRICAL APPARATUS

(71) Applicant: CONTEMPORARY AMPEREX TECHNOLOGY CO., LIMITED, Ningde (CN)

(72) Inventors: Xiang Zhou, Ningde (CN); Baiqing Li, Ningde (CN); Jiang Liu, Ningde (CN); Yao Jiang, Ningde (CN); Xiaomei Liu, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 0 days.

(21) Appl. No.: 18/487,266

(22) Filed: Oct. 16, 2023

(65) Prior Publication Data

US 2024/0047657 A1 Feb. 8, 2024

Related U.S. Application Data

(63) Continuation of application No. PCT/CN2022/079285, filed on Mar. 4, 2022.

(51) Int. Cl.
*H01M 4/36* (2006.01)
*H01M 4/02* (2006.01)
(Continued)

(52) U.S. Cl.
CPC ........... *H01M 4/366* (2013.01); *H01M 4/505* (2013.01); *H01M 4/525* (2013.01); *H01M 2004/028* (2013.01); *H01M 2220/20* (2013.01)

(58) Field of Classification Search
None
See application file for complete search history.

(56) References Cited

U.S. PATENT DOCUMENTS

| | | | | |
|---|---|---|---|---|
| 2013/0209886 | A1* | 8/2013 | Ohira | H01M 4/505 252/500 |
| 2014/0186714 | A1* | 7/2014 | Kamimura | C01B 25/45 429/231.95 |
| 2015/0221940 | A1 | 8/2015 | Shimonishi et al. | |

FOREIGN PATENT DOCUMENTS

| | | |
|---|---|---|
| CN | 103548189 A | 1/2014 |
| CN | 108376762 A | 8/2018 |

(Continued)

OTHER PUBLICATIONS www.espacenet.com machine translation of CN 114256448A. (Year: 2022).*

(Continued)

*Primary Examiner* — Gregg Cantelmo
(74) *Attorney, Agent, or Firm* — Ladas & Parry LLP

(57) ABSTRACT

A novel positive electrode sheet, a secondary battery, a battery module, a battery pack and an electrical apparatus are described. The positive electrode sheet includes a positive electrode current collector and a positive electrode film layer with a single-layer structure or a multi-layer structure. When the positive electrode film layer is a single-layer structure, at least one of the positive electrode film layers comprises a first positive electrode active material and a second positive electrode active material; and/or, when the positive electrode film layer is a multi-layer structure, at least one layer of at least one of the positive electrode film layers comprises a first positive electrode active material and a second positive electrode active materials. The first positive electrode active material includes an inner core, a first cladding layer comprising crystalline pyrophosphates, a second cladding layer comprising crystalline phosphate, and a third cladding layer.

20 Claims, 10 Drawing Sheets

(51) Int. Cl.
*H01M 4/505* (2010.01)
*H01M 4/525* (2010.01)

(56) References Cited

FOREIGN PATENT DOCUMENTS

| | | | | |
|---|---|---|---|---|
| CN | 110098383 | A | | 8/2019 |
| CN | 114256448 | A | * | 3/2022 |
| JP | 2015082476 | A | * | 4/2015 |

OTHER PUBLICATIONS

Abstract of JP-2015082476-A (Year: 2015).*
ISR for International Application PCT /CN2022/079285 mailed Nov. 28, 2022.
Written Opinion for International Application PCT /CN2022/079285 mailed Nov. 28, 2022.

* cited by examiner

POSITIVE ELECTRODE SHEET, SECONDARY BATTERY, BATTERY MODULE, BATTERY PACK, AND ELECTRICAL APPARATUS

CROSS-REFERENCE TO RELATED APPLICATION

This application is a continuation of International Patent Application No. PCT/CN2022/079285 filed on Mar. 4, 2022, the entire content of which are hereby incorporated herein by reference.

TECHNICAL FIELD

The present application relates to the technical field of secondary batteries, and in particular to a novel positive electrode sheet, a secondary battery, a battery module, a battery pack and an electrical apparatus.

BACKGROUND ART

In recent years, with the increasingly wide use of secondary batteries, secondary batteries are widely used in energy storage power systems such as water power, thermal power, wind power and solar power stations, as well as electric tools, electric bicycles, electric motorcycles, electric vehicles, military equipment, aerospace and other fields. Due to the great development of secondary batteries, higher requirements have also been put forward for their energy density, cycling performance and safety performance. In the existing technology, lithium manganese iron phosphate is used as the main material and mixed with ternary materials such as lithium nickel cobalt manganese oxide, lithium nickel cobalt aluminum oxide or lithium cobalt oxide to make secondary batteries. Although this technology combines the respective advantages of lithium manganese iron phosphate and ternary materials, lithium manganese iron phosphate results in poor kinetic performance of the battery and low battery cell rate performance, failing to meet the needs of power batteries.

SUMMARY OF THE INVENTION

The present application is made in view of the above-mentioned problems, and its objective is to provide a novel positive electrode sheet, a secondary battery, a battery module, a battery pack, and an electrical apparatus to solve the problems of secondary batteries prepared using ex isting positive electrode active materials, including low energy density, low battery cell rate performance, poor kinetic performance, poor low-temperature performance, short cycle life, and low safety.

In order to achieve the above objective, a first aspect of the present application provides a positive electrode sheet, which includes a positive electrode current collector and a positive electrode film layer arranged on at least one surface of the positive electrode current collector; the positive electrode film layer is a single-layer structure or a multi-layer structure; when the positive electrode film layer is a single-layer structure, at least one positive electrode film layer comprises both a first positive electrode active material with a core-shell structure and a second positive electrode active material; and/or, when the positive electrode film layer is a multi-layer structure, at least one layer of at least one positive electrode film layer comprises both a first positive electrode active material with a core-shell structure and a second positive electrode active material; the first positive electrode active material includes an inner core, a first cladding layer coating the inner core, a second cladding layer coating the first cladding layer and a third cladding layer coating the second cladding layer; wherein, the inner core has a chemical formula of $Li_{1+x}Mn_{1-y}A_yP_{1-z}R_zO_4$, the first cladding layer includes crystalline pyrophosphates $Li_aMP_2O_7$ and/or $M_b(P_2O_7)_c$, the second cladding layer includes crystalline phosphate $XPO_4$, and the third cladding layer is carbon; wherein, A is selected from one or more elements of Zn, Al, Na, K, Mg, Mo, W, Ti, V, Zr, Fe, Ni, Co, Ga, Sn, Sb, Nb and Ge; R is selected from one or more elements of B, Si, N and S; x is selected from any value within the range of −0.100 to 0.100; y is selected from any value within the range of 0.001 to 0.500; z is selected from any value within the range of 0.001 to 0.100; M in crystalline pyrophosphates $Li_aMP_2O_7$ and $M_b(P_2O_7)_c$ is each independently selected from one or more elements of Fe, Ni, Mg, Co, Cu, Zn, Ti, Ag, Zr, Nb and Al; a is selected from any value within the range of 0 to 2; b is selected from any value within the range of 1 to 4; c is selected from any value within the range of 1 to 6; X is one or more elements selected from Li, Fe, Ni, Mg, Co, Cu, Zn, Ti, Ag, Zr, Nb and Al; the second positive electrode active material is selected from one or more of $LiNi_dCo_eMn_{(1-d-e)}O_2$, $LiNi_dCo_eAl_{(1-d-e)}O_2$ and $LiCoO_2$, wherein, d is independently selected from any value within the range of 0.3-0.9 (optionally 0.33-0.8), the sum of d and e is selected from any value within the range of 0.3-0.9 (optionally 0.66-0.9).

Herein, crystalline means that the degree of crystallinity is 50% or higher, that is, 50%-100%. A crystallinity of less than 50% is called glassy state. The crystalline pyrophosphate and crystalline phosphate of the present application have a crystallinity of 50% to 100%. Pyrophosphates and phosphates with a certain degree of crystallinity not only promote the full exertion of the ability of the pyrophosphate cladding layer to hinder manganese dissolution and the excellent lithium ion-conducting ability of the phosphate cladding layer to reduce the interfacial side reactions, but also allow for better lattice matching between the pyrophosphate cladding layer and the phosphate cladding layer, to enable tight bonding between the cladding layers.

Hence, in the present application, a doped lithium manganese phosphate inner core is obtained by doping element A at the position of manganese and element R at the position of phosphorus in lithium manganese phosphate, and then three cladding layers are disposed on the surface of the inner core, to provide a novel first positive electrode active material with a core-shell structure. The first positive electrode active material can achieve significantly reduced manganese leaching and reduced lattice change rate, and when used in a secondary battery, can significantly improve the high temperature cycling performance, cycle stability, high temperature storage performance, rate performance, safety performance of the secondary battery, and increase the capacity of the secondary battery.

In the present application, by using a mixture of the first positive electrode active material and the second positive electrode active material, the advantages of the two materials complement each other, which improves the energy density of the secondary battery, and at the same time makes the secondary battery have excellent rate performance, kinetic performance, cycling performance, low-temperature performance and safety. The particles of the first positive electrode active material are evenly coated on the surface of the second positive electrode active material, so that the crystal lattice of the second positive electrode active material is relatively independent with a stable skeleton, and it is not easy to collapse during the charging and discharging process of the secondary battery, which further improves the cycle life of the secondary battery. Moreover, the cladding layer formed by the first positive electrode active material provides elastic strain force for external force impact or shear, effectively solving the safety problem of the second positive electrode active material.

A second aspect of the present application provides a positive electrode sheet, which includes a positive electrode current collector and a positive electrode film layer arranged on at least one surface of the positive electrode current collector; at least one positive electrode film layer is a multi-layer structure; any one of the positive electrode film layers with a multi-layer structure comprises a first positive electrode active material with a core-shell structure and a second positive electrode active material in different layers, respectively; the first positive electrode active material includes an inner core, a first cladding layer coating the inner core, a second cladding layer coating the first cladding layer and a third cladding layer coating the second cladding layer; wherein, the inner core has a chemical formula of $Li_{1+x}Mn_{1-y}A_yP_{1-z}R_zO_4$, the first cladding layer includes crystalline pyrophosphates $Li_aMP_2O_7$ and/or $M_b(P_2O_7)_c$, the second cladding layer includes crystalline phosphate $XPO_4$, and the third cladding layer is carbon; wherein, A is selected from one or more elements of Zn, Al, Na, K, Mg, Mo, W, Ti, V, Zr, Fe, Ni, Co, Ga, Sn, Sb, Nb and Ge; R is selected from one or more elements of B, Si, N and S; x is selected from any value within the range of −0.100 to 0.100; y is selected from any value within the range of 0.001 to 0.500; z is selected from any value within the range of 0.001 to 0.100; M in crystalline pyrophosphates $Li_aMP_2O_7$ and $M_b(P_2O_7)_c$ is each independently selected from one or more elements of Fe, Ni, Mg, Co, Cu, Zn, Ti, Ag, Zr, Nb and Al; a is selected from any value within the range of 0 to 2; b is selected from any value within the range of 1 to 4; c is selected from any value within the range of 1 to 6; X is one or more elements selected from Li, Fe, Ni, Mg, Co, Cu, Zn, Ti, Ag, Zr, Nb and Al; the second positive electrode active material is selected from one or more of $LiNi_dCo_eMn_{(1-d-e)}O_2$, $LiNi_dCo_eAl_{(1-d-e)}O_2$ and $LiCoO_2$, wherein, d is independently selected from any value within the range of 0.3-0.9 (optionally 0.33-0.8), the sum of d and e is selected from any value within the range of 0.3-0.9 (optionally 0.66-0.9); optionally, any one of the positive electrode film layers with a multi-layer structure comprises a first positive electrode active material and a second positive electrode active material in adjacent layers, respectively.

Therefore, the first positive electrode active material can significantly reduce manganese dissolution and lattice change rate, and when used in a secondary battery, can significantly improve the high temperature cycling performance, cycle stability, high temperature storage performance, rate performance, and safety performance of the secondary battery, and increase the capacity of the secondary battery.

In the present application, the first positive electrode active material and the second positive electrode active material are used in combination, the advantages of the two materials are complementary, which improves the energy density of the secondary battery, and at the same time makes the secondary battery have excellent rate performance, kinetic performance, cycling performance and low-temperature performance. Also, the first positive electrode active material provides elastic strain force for external force impact or shear, which effectively solves the safety problem of the second positive electrode active material.

A third aspect of the present application provides a positive electrode sheet, which includes a positive electrode current collector and a positive electrode film layer A and a positive electrode film layer B disposed on the two surfaces of the positive electrode current collector, respectively; the positive electrode film layer A and the positive electrode film layer B are each independently a single-layer structure or a multi-layer structure; at least one layer of the positive electrode film layer A comprises a first positive electrode active material with a core-shell structure, and at the same time, at least one layer of the positive electrode film layer B comprises a second positive electrode active material; the first positive electrode active material includes an inner core, a first cladding layer coating the inner core, a second cladding layer coating the first cladding layer and a third cladding layer coating the second cladding layer; wherein, the inner core has a chemical formula of $Li_{1+x}Mn_{1-y}A_yP_{1-z}R_zO_4$, the first cladding layer includes crystalline pyrophosphates $Li_aMP_2O_7$ and/or $M_b(P_2O_7)_c$, the second cladding layer includes crystalline phosphate $XPO_4$, and the third cladding layer is carbon; wherein, A is selected from one or more elements of Zn, Al, Na, K, Mg, Mo, W, Ti, V, Zr, Fe, Ni, Co, Ga, Sn, Sb, Nb and Ge; R is selected from one or more elements of B, Si, N and S; x is selected from any value within the range of −0.100 to 0.100; y is selected from any value within the range of 0.001 to 0.500; z is selected from any value within the range of 0.001 to 0.100; M in crystalline pyrophosphates $Li_aMP_2O_7$ and $M_b(P_2O_7)_c$ is each independently selected from one or more elements of Fe, Ni, Mg, Co, Cu, Zn, Ti, Ag, Zr, Nb and Al; a is selected from any value within the range of 0 to 2; b is selected from any value within the range of 1 to 4; c is selected from any value within the range of 1 to 6; X is one or more elements selected from Li, Fe, Ni, Mg, Co, Cu, Zn, Ti, Ag, Zr, Nb and Al; the second positive electrode active material is selected from one or more of $LiNi_dCo_eMn_{(1-d-e)}O_2$, $LiNi_dCo_eAl_{(1-d-e)}O_2$ and $LiCoO_2$, wherein, d is independently selected from any value within the range of 0.3-0.9 (optionally the sum of d and e is selected from any value within the range of 0.3-0.9 (optionally 0.66-0.9).

Therefore, the first positive electrode active material of the present application can significantly reduce manganese dissolution and lattice change rate, and when used in a secondary battery, can significantly improve the high temperature cycling performance, cycle stability, high temperature storage performance, rate performance, and safety performance of the secondary battery, and increase the capacity of the secondary battery.

In the present application, the first positive electrode active material and the second positive electrode active material are used in combination, the advantages of the two materials are complementary, which improves the energy density of the secondary battery, and at the same time makes the secondary battery have excellent rate performance, kinetic performance, cycling performance and low-temperature performance. Also, the first positive electrode active material provides elastic strain force for external force impact or shear, which effectively solves the safety problem of the second positive electrode active material.

Unless otherwise specified, in the above chemical formula, when A is two or more elements, the definition for the value range of y is not only a definition for the stoichiometric number of each element as A, but also a definition for the sum of the stoichiometric numbers of various elements as A. For example, when A is two or more elements A1, A2 . . . An, the respective stoichiometric numbers y1, y2 . . . yn for A1, A2 . . . An are each required to fall within the numerical range defined for y in the present application, and the sum of y1, y2 . . . yn are also required to fall within this numerical range. Similarly, in the case where R is two or more elements, the definition for the numerical range of the stoichiometric number of R in the present application also has the above-mentioned meaning.

In any embodiment of the first to third aspects, the mass ratio of the first active material to the second active material is 1:7-7:1, optionally 1:4-4:1. This can ensure that the secondary battery has excellent rate performance and cycling performance, high energy density, excellent kinetic performance and low-temperature performance. Also, it reduces interfacial side reactions, and improves the safety of the secondary battery.

In any embodiment of the first to third aspects, in the first positive electrode active material, A is selected from one or more elements of Fe, Ti, V, Ni, Co and Mg. By selecting the doping elements within the above range, it is beneficial to enhancing the doping effect. On the one hand, the lattice change rate is further reduced, thereby inhibiting the dissolution of manganese and reducing the consumption of the electrolyte solution and active lithium. On the other hand, it also facilitates reducing the surface oxygen activity and decreasing the interfacial side reactions between the first positive electrode active material and the electrolyte solution, thereby improving the cycling performance and high-temperature storage performance of the secondary battery.

In any embodiment of the first to third aspects, in the first positive electrode active material, R is selected from one element of B, Si, N and S. By selecting doping elements within the above range, the rate performance and electrical conductivity of the secondary battery can be further improved, thereby improving the gram capacity, cycling performance and high-temperature performance of the secondary battery.

In any embodiment of the first to third aspects, in the first positive electrode active material, the ratio of y to 1-y is selected from 1:10 to 1:1, optionally 1:4 to 1:1. Thereby, the energy density, cycling performance and rate performance of the secondary battery can be further improved.

In any embodiment of the first to third aspects, in the first positive electrode active material, the ratio of z to 1-z is selected from 1:9 to 1:999, optionally 1:499 to 1:249. Thereby, the energy density, cycling performance and rate performance of the secondary battery can be further improved.

In any embodiment of the first to third aspects, in the first positive electrode active material, the interplanar spacing of crystalline pyrophosphate in the first cladding layer is in the range of nm, and the angle of the crystal orientation (111) is in the range of 18.00°-32.00°; and the interplanar spacing of the crystalline phosphate in the secondary cladding layer is in the range of 0.244 to 0.425 nm, and the angle of the crystal orientation (111) is in the range of 20.00°-37.00°.

The first cladding layer and the second cladding layer in the positive electrode active material of the present application are both formed of crystalline substances having an interplanar spacing and angle falling within the above-mentioned ranges. Thus, the impurity phase in the cladding layer can be effectively avoided, thereby improving the gram capacity of the material and the cycling performance and rate performance of the secondary battery.

In any embodiment of the first to third aspects, in the first positive electrode active material, the carbon in the third cladding layer is a mixture of SP2 hybridized carbon and SP3 hybridized carbon. Optionally, the molar ratio of the SP2 hybridized carbon to SP3 hybridized carbon is any value within the range of 0.1-10, and optionally any value within the range of 2.0-3.0.

In the present application, the overall performance of the secondary battery is improved by defining the molar ratio of the SP2 hybridized carbon to the SP3 hybridized carbon within the above range.

In any embodiment of the first to third aspects, the coating amount of the first cladding layer is greater than 0 and less than or equal to 6 wt %, optionally greater than 0 and less than or equal to and more optionally greater than 0 and less than or equal to 2 wt %, based on the weight of the inner core; and/or the coating amount of the second cladding layer is greater than 0 and less than or equal to 6 wt %, optionally greater than 0 and less than or equal to 5.5 wt %, and more optionally 2-4 wt %, based on the weight of the inner core; and/or the coating amount of the third cladding layer is greater than 0 and less than or equal to 6 wt %, optionally greater than 0 and less than or equal to 5.5 wt %, and more optionally greater than 0 and less than or equal to 2 wt %, based on the weight of the inner core.

In the first positive electrode active material with a core-shell structure of the present application, the coating amounts of the three cladding layers are preferably within the above ranges, so that the inner core can be sufficiently coated, and the kinetic performance and safety performance of the secondary battery can be further improved without compromising the gram capacity of the first positive electrode activity material.

In any embodiment of the first to third aspects, in the first positive electrode active material, the thickness of the first cladding layer is 1-10 nm. In the present application, when the thickness of the first cladding layer is in the range of 1-10 nm, the possible adverse effects on the kinetic performance of the material caused when the thickness is too large, and the inability to effectively hinder the migration of transition metal ions caused when the thickness is too small can be avoided.

In any embodiment of the first to third aspects, in the first positive electrode active material, the thickness of the second cladding layer is 2-15 nm. When the thickness of the second cladding layer is in the range of 2-15 nm, the surface structure of the second cladding layer is stable, and the side reaction with the electrolyte solution is less, so the interfacial side reactions can be effectively reduced, thereby improving the high-temperature performance of secondary batteries.

In any embodiment of the first to third aspects, in the first positive electrode active material, the thickness of the third cladding layer is 2-25 nm. When the thickness of the third cladding layer is in the range of 2-25 nm, the electrical conductivity performance of the material can be improved and the compacted density of the battery electrode sheet prepared using the first positive electrode active material can be improved.

In any embodiment of the first to third aspects, in the first positive electrode active material, based on the weight of the first positive electrode active material, the content of element manganese is in the range of 10 wt % to 35 wt %, optionally in the range of 15 wt % to 30 wt %, more optionally in the range of 17 wt % to 20 wt %.

In the first positive electrode active material with a core-shell structure of the present application, when the content of element manganese is within the above range, the deterioration of the structure stability, the decrease in density of the material, and other problems that may be caused if the content of element manganese is too large can be avoided to improve the cycling performance, storage performance, compacted density and other performances of the secondary battery; and the problems such as low voltage plateau that may be caused if the content of manganese is too small can be avoided, thereby improving the energy density of the secondary battery.

In any embodiment of the first to third aspects, in the first positive electrode active material, based on the weight of the first positive electrode active material, the content of element phosphorus is in the range of 12 wt % to 25 wt %, optionally in the range of 15 wt % to 20 wt %.

In the first positive electrode active material with a core-shell structure of the present application, when the content of element phosphorus is within the above range, the following situations can be effectively avoided: if the content of element phosphorus is too large, a potential too strong covalent nature of P—O affects the electrical conduction of small polarons, thereby affecting the electrical conductivity of the material; and if the content of element phosphorus is too small, the stability of the lattice structure of the inner core, the pyrophosphate in the first cladding layer and/or the phosphate in the second cladding layer may be caused to decrease, thereby affecting the overall stability of the material.

In any embodiment of the first to third aspects, in the first positive electrode active material, based on the weight of the first positive electrode active material, the weight ratio of element manganese to element phosphorus is in the range of 0.90-1.25, optionally 0.95-1.20.

In the first positive electrode active material with a core-shell structure of the present application, when the weight ratio of element manganese to element phosphorus is within the above range, the following situation can be avoided: if the weight ratio is too large, increased dissolution of the transition metal may be caused, affecting the stability of the material and the cycling and storage performances of the secondary battery; and if the weight ratio is too small, the discharge voltage plateau of the material may decrease, resulting in reduced energy density of the secondary battery.

In any embodiment of the first to third aspects, the lattice change rate of the first positive electrode active material before and after complete intercalation and deintercalation of lithium is 4% or less, optionally 3.8% or less, and more optionally 2.0-3.8%.

The first positive electrode active material with a core-shell structure of the present application can achieve a lattice change rate of less than 4% before and after lithium intercalation and deintercalation. Therefore, the use of the first positive electrode active material can improve the gram capacity and rate performance of the secondary battery.

In any embodiment of the first to third aspects, the Li/Mn antisite defect concentration of the first positive electrode active material with a core-shell structure is 4% or less, optionally 2.2% or less, and more optionally 1.5-2.2%. With the Li/Mn antisite defect concentration in the above range, it can avoid $Mn^{2+}$ hindering $Li^{+}$ transport, and improve the gram capacity of the first positive electrode active material and the rate performance of the secondary battery.

In any embodiment of the first to third aspects, the compacted density of the first positive electrode active material at 3T is 2.2 g/cm$^3$ or more, optionally 2.2 g/cm$^3$ or more and 2.8 g/cm$^3$ or less. Therefore, when the compacted density is increased, the weight of the first positive electrode active material per unit volume increases, which is beneficial to the increase of the volumetric energy density of the secondary battery.

In any embodiment of the first to third aspects, the surface oxygen valence of the first positive electrode active material is −1.90 or less, and optionally −1.90 to −1.98. Therefore, by defining the surface oxygen valence of the first positive electrode active material in the above-mentioned range, the interfacial side reactions between the first positive electrode material and the electrolyte solution can be reduced, thereby improving the cycling performance and gas generation upon high-temperature storage of the battery cell.

In any embodiment of the first to third aspects, in the second positive electrode active material, the ratios of d, (1−d−e) and e in $LiNi_dCo_eMn_{(1-d-e)}O_2$ and $LiNi_dCo_eAl_{(1-d-e)}O_2$ are each independently 5:2:3 or 3:1:1 or 8:1:1. Thus, the energy density of the secondary battery can be further improved.

In any embodiment of the first to third aspects, the sum of the mass of the first positive electrode active material and the second positive electrode active material accounts for 88%-98.7% of the mass of the positive electrode sheet. It further ensures that the secondary battery has excellent rate performance, kinetic performance, cycling performance and low-temperature performance, as well as high energy density.

A fourth aspect of the present application provides a secondary battery comprising the positive electrode sheet of any one of the first to third aspects of the present application.

A fifth aspect of the present application provides a battery module comprising the secondary battery of the fourth aspect of the present application.

A sixth aspect of the present application provides a battery pack comprising the battery module of the fifth aspect of the present application.

A seven aspect of the present application provides an electrical apparatus comprising at least one selected from the secondary battery of the fourth aspect of the present application, the battery module of the fifth aspect of the present application, and the battery pack of the sixth aspect of the present application.

DESCRIPTION OF REFERENCE NUMERALS

Figure 1:
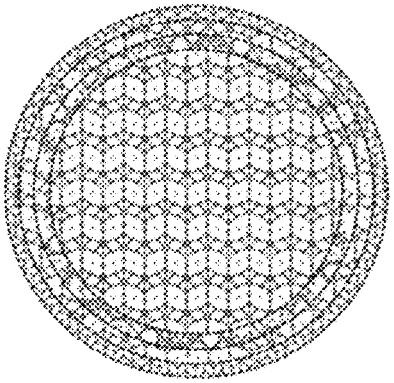
FIG. 1 is a schematic diagram of a first positive electrode active material with a three-layer cladding structure according to an embodiments of the present application.

1 battery pack; 2 upper box body; 3 lower box body; 4 battery module; 5 secondary battery; 51 case; 52 electrode assembly; 53 top cover assembly.

DETAILED DESCRIPTION

Hereinafter, the embodiments of the positive electrode sheet, secondary battery, battery module, battery pack and electrical apparatus of the present application are specifically disclosed by referring to the detailed description of the drawings as appropriate. However, there are cases where unnecessary detailed descriptions are omitted. For example, there are cases where detailed descriptions of well-known items and repeated descriptions of actually identical structures are omitted. This is to avoid unnecessary redundancy in the following descriptions and to facilitate the understanding by those skilled in the art. In addition, the drawings and subsequent descriptions are provided for those skilled in the art to fully understand the present application, and are not intended to limit the subject matter recited in the claims.

The "range" disclosed in the present application is defined in terms of lower and upper limits, and a given range is defined by selecting a lower limit and an upper limit, which define the boundaries of a particular range. A range defined in this manner may be inclusive or exclusive of end values, and may be arbitrarily combined, that is, any lower limit may be combined with any upper limit to form a range. For example, if ranges of 60-120 and 80-110 are listed for a particular parameter, it is understood that ranges of 60-110 and 80-120 are also expected. Additionally, if the minimum range values 1 and 2 are listed, and if the maximum range values 3, 4 and 5 are listed, the following ranges are all contemplated: 1-3, 1-4, 1-5, 2-3, 2-4 and 2-5. In the present application, unless stated otherwise, the numerical range "a-b" represents an abbreviated representation of any combination of real numbers between a to b, wherein both a and b are real numbers. For example, the numerical range "0-5" means that all real numbers between "0-5" have been listed herein, and "0-5" is just an abbreviated representation of the combination of these numerical values. Additionally, when it is stated that a certain parameter is an integer of ≥2, it is equivalent to disclosing that the parameter is, for example, an integer of 2, 3, 4, 5, 6, 7, 8, 9, 10, 11, 12.

Unless otherwise specified, all embodiments and optional embodiments of the present application may be combined with each other to form new technical solutions.

Unless otherwise specified, all technical features and optional technical features of the present application may be combined with each other to form new technical solutions.

If not specifically stated, all steps of the present application may be performed sequentially or randomly, preferably sequentially. For example, the method comprises steps (a) and (b), indicating that the method may include steps (a) and (b) performed sequentially, or may include steps (b) and (a) performed sequentially. For example, when it is mentioned that the method can also include step (c), it means that step (c) can be added to the method in any order. For example, the method can include steps (a), (b), and (c), or steps (a), (c), and (b), or steps (c), (a), and (b).

If not specifically stated, "include" and "comprise" mentioned in the present application indicate open inclusion or closed inclusion. For example, "include" and "comprise" may indicate that other components not listed may also be included or contained, or only the listed components may be included or contained.

If not specifically stated, the term "or" is inclusive in the present application. By way of example, the phrase "A or B" means "A, B, or both A and B". More specifically, the condition "A or B" is satisfied by any of the following: A is true (or present) and B is false (or absent); A is false (or absent) and B is true (or present); or both A and B are true (or present).

Unless otherwise specified, in the present application, the term "cladding layer" refers to a material layer that coats an inner core. The material layer may completely or partially coat the inner core, and the "cladding layer" is used merely for the convenience of description, and not intended to limit the present invention.

Unless otherwise specified, in the present application, the term "thickness of the cladding layer" refers to the thickness of the material layer that coats the inner core along the radial direction of the inner core.

[Secondary Battery]

Secondary batteries, also known as rechargeable batteries or storage batteries, refer to batteries that, after being discharged, can activate active materials by charging for continuous use.

Typically, a secondary battery comprises a positive electrode sheet, a negative electrode sheet, a separator and an electrolyte solution. During charging and discharging of the battery, active ions (such as lithium ions) are intercalated and deintercalated back and forth between the positive electrode sheet and the negative electrode sheet. The separator is provided between the positive electrode sheet and the negative electrode sheet, and mainly functions to prevent a short circuit between the positive electrode and the negative electrode while allowing active ions to pass through.

The electrolyte solution mainly serves to conduct active ions between the positive electrode sheet and the negative electrode sheet.

[Positive Electrode Sheet]

An embodiment of a first aspect of the present application provides a positive electrode sheet, which includes a positive electrode current collector and a positive electrode film layer arranged on at least one surface of the positive electrode current collector; the positive electrode film layer is a single-layer structure or a multi-layer structure; when the positive electrode film layer is a single-layer structure, at least one positive electrode film layer comprises both a first positive electrode active material with a core-shell structure and a second positive electrode active material; and/or, when the positive electrode film layer is a multi-layer structure, at least one layer of at least one positive electrode film layer comprises both a first positive electrode active material with a core-shell structure and a second positive electrode active material; the first positive electrode active material includes an inner core, a first cladding layer coating the inner core, a second cladding layer coating the first cladding layer and a third cladding layer coating the second cladding layer; wherein, the inner core has a chemical formula of $Li_{1+x}Mn_{1-y}A_yP_{1-z}R_zO_4$, the first cladding layer includes crystalline pyrophosphates $Li_aMP_2O_7$ and/or $M_b(P_2O_7)_c$, the second cladding layer includes crystalline phosphate $XPO_4$, and the third cladding layer is carbon; wherein, A is selected from one or more elements of Zn, Al, Na, K, Mg, Mo, W, Ti, V, Zr, Fe, Ni, Co, Ga, Sn, Sb, Nb and Ge; R is selected from one or more elements of B, Si, N and S; x is selected from any value within the range of −0.100 to 0.100; y is selected from any value within the range of 0.001 to 0.500; z is selected from any value within the range of 0.001 to 0.100; M in crystalline pyrophosphates $Li_aMP_2O_7$ and $M_b(P_2O_7)_c$ is each independently selected from one or more elements of Fe, Ni, Mg, Co, Cu, Zn, Ti, Ag, Zr, Nb and Al; a is selected from any value within the range of 0 to 2; b is selected from any value within the range of 1 to 4; c is selected from any value within the range of 1 to 6; X is one or more elements selected from Li, Fe, Ni, Mg, Co, Cu, Zn, Ti, Ag, Zr, Nb and Al; the second positive electrode active material is selected from one or more of $LiNi_dCo_eMn_{(1-d-e)}O_2$, $LiNi_dCo_eAl_{(1-d-e)}O_2$ and $LiCoO_2$, wherein, d is independently selected from any value within the range of 0.3-0.9 (optionally 0.33-0.8, such as 0.5), the sum of d and e is selected from any value within the range of 0.3-0.9 (optionally 0.66-0.9, such as 0.7).

It should be noted that, when the positive electrode sheet includes two positive electrode film layers, "the positive electrode film layer is a single-layer structure or a multi-layer structure" means that the two positive electrode film layers are each independently a single-layer structure or a multi-layer structure, "when the positive electrode film layer is a single-layer structure" refers to when one or two positive electrode film layers is a single-layer structure, and "when the positive electrode film layer are a multi-layer structure" refers to when one or two positive electrode film layers are a multi-layer structure.

The first positive electrode active material of the present application can improve the gram capacity, cycling performance and safety performance of the secondary battery. Although the mechanism is still unclear, it is inferred that the first positive electrode active material of the present application has a core-shell structure. By doping element A and element R respectively at the position of manganese and the position of phosphorus in the inner core of lithium manganese phosphate, the manganese dissolution is effectively reduced, to reduce the manganese ions migrating to the negative electrode, reduce the electrolyte solution consumed by the decomposition of the SEI film, improve the cycling performance and safety performance of the secondary battery, and also promote the adjustment of the Mn—O bond, reduce the potential barrier to lithium ion migration, promote lithium ion migration and improve the rate performance of secondary batteries. By coating the inner core with the first cladding layer including crystalline pyrophosphate, the migration resistance of manganese can be further increased, the manganese dissolution is reduced, the surface impurity lithium content is reduced, and the contact between the core and the electrolyte solution is decreased, thereby reducing the interfacial side reactions, reducing gas generation, and improving the high-temperature storage performance, cycling performance and safety performance of the secondary battery. By further coating the crystalline phosphate cladding layer with excellent lithium ion conductivity, the interfacial side reactions on the surface of the first positive electrode active material are effectively reduced, thereby improving the high-temperature cycling performance and storage performance of the secondary battery. By further coating the carbon layer as the third cladding layer, the safety performance and kinetic performance of the secondary battery can be further improved. In addition, in the inner core, the doping of element A at the position of manganese in the lithium manganese phosphate also helps to reduce the lattice change rate of lithium manganese phosphate during the process of lithium intercalation and deintercalation, improve the structural stability of the first positive electrode material, greatly reduce the dissolution of manganese and reduce the oxygen activity on the particle surface. The doping of element R at the position of phosphorus also helps to change the difficulty in changing the Mn—O bond length, thereby improving the electronic conductivity and reducing the potential barrier to lithium ion migration, promoting lithium ion migration and improving the rate performance of secondary batteries.

In the present application, by using a mixture of the first positive electrode active material and the second positive electrode active material, the advantages of the two materials complement each other, which improves the energy density of the secondary battery, and at the same time makes the secondary battery have excellent rate performance, kinetic performance, cycling performance, low-temperature performance and safety. The particles of the first positive electrode active material are evenly coated on the surface of the second positive electrode active material, so that the crystal lattice of the second positive electrode active material is relatively independent with a stable skeleton, and it is not easy to collapse during the charging and discharging process of the secondary battery, which further improves the cycle life of the secondary battery. Moreover, the cladding layer formed by the first positive electrode active material provides elastic strain force for external force impact or shear, effectively solving the safety problem of the second positive electrode active material.

In some embodiments of the first aspect, a positive electrode film layer C and a positive electrode film layer D are respectively arranged on the two surfaces of the positive electrode current collector, the positive electrode film layer C is a multilayer structure, and the positive electrode film layer D is a single-layer structure, at least one layer of the positive electrode film layer C comprises a first positive electrode active material and a second positive electrode active material; optionally, the positive electrode film layer D comprises one or both of the first positive electrode active material and the second positive electrode active material; optionally, the remaining layers in the positive electrode film layer C comprise the first positive electrode active material or the second positive electrode active material.

In some embodiments of the first aspect, a positive electrode film layer C and a positive electrode film layer D are respectively arranged on the two surfaces of the positive electrode current collector, the positive electrode film layer C is a multi-layer structure, and the positive electrode film layer D is a single-layer structure, the positive electrode film layer D comprises both a first positive electrode active material and a second positive electrode active material; optionally, any layer in the positive electrode film layer C comprises the first positive electrode active material or the second positive electrode active material.

In some embodiments of the first aspect, a positive electrode film layer is arranged on each of the two surfaces of the positive electrode current collector, each positive electrode film layer is a multi-layer structure, at least one layer of each positive electrode film layer comprises both the first positive electrode active material and the second positive electrode active material; optionally, the remaining layers in the positive electrode film layer comprises the first positive electrode active material or the second positive electrode active material.

An embodiment of a second aspect of the present application provides a positive electrode sheet, which includes a positive electrode current collector and a positive electrode film layer arranged on at least one surface of the positive electrode current collector; at least one positive electrode film layer is a multi-layer structure; any one of the positive electrode film layers with a multi-layer structure comprises a first positive electrode active material with a core-shell structure and a second positive electrode active material in different layers, respectively; the first positive electrode active material includes an inner core, a first cladding layer coating the inner core, a second cladding layer coating the first cladding layer and a third cladding layer coating the second cladding layer; wherein, the inner core has a chemical formula of $Li_{1+x}Mn_{1-y}A_yP_{1-z}R_zO_4$, the first cladding layer includes crystalline pyrophosphates $Li_aMP_2O_7$ and/or $M_b(P_2O_7)_c$, the second cladding layer includes crystalline phosphate $XPO_4$, and the third cladding layer is carbon; wherein, A is selected from one or more elements of Zn, Al, Na, K, Mg, Mo, W, Ti, V, Zr, Fe, Ni, Co, Ga, Sn, Sb, Nb and Ge; R is selected from one or more elements of B, Si, N and S; x is selected from any value within the range of −0.100 to 0.100; y is selected from any value within the range of 0.001 to 0.500; z is selected from any value within the range of 0.001 to 0.100; M in crystalline pyrophosphates $Li_aMP_2O_7$ and $M_b(P_2O_7)_c$ is each independently selected from one or more elements of Fe, Ni, Mg, Co, Cu, Zn, Ti, Ag, Zr, Nb and Al; a is selected from any value within the range of 0 to 2; b is selected from any value within the range of 1 to 4; c is selected from any value within the range of 1 to 6; X is one or more elements selected from Li, Fe, Ni, Mg, Co, Cu, Zn, Ti, Ag, Zr, Nb and Al; the second positive electrode active material is selected from one or more of $LiNi_dCo_eMn_{(1-d-e)}O_2$, $LiNi_dCo_eAl_{(1-d-e)}O_2$ and $LiCoO_2$, wherein, d is independently selected from any value within the range of 0.3-0.9 (optionally 0.33-0.8, such as 0.5), the sum of d and e is selected from any value within the range of 0.3-0.9 (optionally 0.66-0.9, such as 0.7); optionally, any one of the positive electrode film layers with a multi-layer structure comprises the first positive electrode active material and the second positive electrode active material in adjacent layers, respectively.

The first positive electrode active material of the present application can improve the gram capacity and kinetic performance of the secondary battery, effectively reduce manganese dissolution, reduce the lattice change rate and reduce the oxygen activity on the particle surface, reduce the migration of manganese ions to the negative electrode, and reduce the electrolyte solution consumed by SEI film decomposition, and improve the cycling performance and safety performance of the secondary battery; the first positive electrode active material can promote the migration of lithium ions and improve the rate performance of the secondary battery; the first positive electrode active material can reduce interfacial side reactions, reduce gas generation, thereby improving the storage performance, cycling performance and safety performance of the secondary battery.

In the present application, by using a mixture of the first positive electrode active material and the second positive electrode active material, the advantages of the two materials complement each other, which improves the energy density of the secondary battery, and at the same time makes the secondary battery have excellent rate performance, kinetic performance, cycling performance, low-temperature performance and safety. The particles of the first positive electrode active material are evenly coated on the surface of the second positive electrode active material, so that the crystal lattice of the second positive electrode active material is relatively independent with a stable skeleton, and it is not easy to collapse during the charging and discharging process of the secondary battery, which further improves the cycle life of the secondary battery. Moreover, the cladding layer formed by the first positive electrode active material provides elastic strain force for external force impact or shear, effectively solving the safety problem of the second positive electrode active material.

In some embodiments of the second aspect, a positive electrode film layer is arranged on each of the two surfaces of the positive electrode current collector, each positive electrode film layer is a multi-layer structure, and two adjacent layers in each positive electrode film layer each comprise the first positive electrode active material and the second positive electrode active material.

In some embodiments of the second aspect, a positive electrode film layer E and a positive electrode film layer F are respectively arranged on the two surfaces of the positive electrode current collector, the positive electrode film layer E is a multi-layer structure, and the positive electrode film layer F is a single-layer structure, two adjacent layers in the positive electrode film layer E each comprise the first positive electrode active material and the second positive electrode active material; optionally, the remaining layers in the positive electrode film layer E and the positive electrode film layer F each independently comprise the first positive electrode active material or the second positive electrode active material.

An embodiment of a third aspect of the present application provides a positive electrode sheet, which includes a positive electrode current collector and a positive electrode film layer A and a positive electrode film layer B disposed on the two surfaces of the positive electrode current collector, respectively; the positive electrode film layer A and the positive electrode film layer B are each independently a single-layer structure or a multi-layer structure; at least one layer of the positive electrode film layer A comprises a first positive electrode active material with a core-shell structure, and at the same time, at least one layer of the positive electrode film layer B comprises a second positive electrode active material; the first positive electrode active material includes an inner core, a first cladding layer coating the inner core, a second cladding layer coating the first cladding layer and a third cladding layer coating the second cladding layer; wherein, the inner core has a chemical formula of $Li_{1+x}Mn_{1-y}A_yP_{1-z}R_zO_4$, the first cladding layer includes crystalline pyrophosphates $Li_aMP_2O_7$ and/or $M_b(P_2O_7)_c$, the second cladding layer includes crystalline phosphate $XPO_4$, and the third cladding layer is carbon; wherein, A is selected from one or more elements of Zn, Al, Na, K, Mg, Mo, W, Ti, V, Zr, Fe, Ni, Co, Ga, Sn, Sb, Nb and Ge; R is selected from one or more elements of B, Si, N and S; x is selected from any value within the range of −0.100 to 0.100; y is selected from any value within the range of 0.001 to 0.500; z is selected from any value within the range of 0.001 to 0.100; M in crystalline pyrophosphates $Li_aMP_2O_7$ and $M_b(P_2O_7)_c$ is each independently selected from one or more elements of Fe, Ni, Mg, Co, Cu, Zn, Ti, Ag, Zr, Nb and Al; a is selected from any value within the range of 0 to 2; b is selected from any value within the range of 1 to 4; c is selected from any value within the range of 1 to 6; X is one or more elements selected from Li, Fe, Ni, Mg, Co, Cu, Zn, Ti, Ag, Zr, Nb and Al; the second positive electrode active material is selected from one or more of $LiNi_dCo_eMn_{(1-d-e)}O_2$, $LiNi_dCo_eAl_{(1-d-e)}O_2$ and $LiCoO_2$, wherein, d is independently selected from any value within the range of 0.3-0.9 (optionally 0.33-0.8, such as 0.5), the sum of d and e is selected from any value within the range of 0.3-0.9 (optionally 0.66-0.9, such as 0.7).

The first positive electrode active material of the present application can improve the gram capacity and kinetic performance of the secondary battery, effectively reduce manganese dissolution, reduce the lattice change rate and reduce the oxygen activity on the particle surface, reduce the migration of manganese ions to the negative electrode, and reduce the electrolyte solution consumed by SEI film decomposition, and improve the cycling performance and safety performance of the secondary battery; the first positive electrode active material can promote the migration of lithium ions and improve the rate performance of the secondary battery; the first positive electrode active material can reduce interfacial side reactions, reduce gas generation, thereby improving the storage performance, cycling performance and safety performance of the secondary battery.

In the present application, by using a mixture of the first positive electrode active material and the second positive electrode active material, the advantages of the two materials complement each other, which improves the energy density of the secondary battery, and at the same time makes the secondary battery have excellent rate performance, kinetic performance, cycling performance, low-temperature performance and safety. The particles of the first positive electrode active material are evenly coated on the surface of the second positive electrode active material, so that the crystal lattice of the second positive electrode active material is relatively independent with a stable skeleton, and it is not easy to collapse during the charging and discharging process of the secondary battery, which further improves the cycle life of the secondary battery. Moreover, the cladding layer formed by the first positive electrode active material provides elastic strain force for external force impact or shear, effectively solving the safety problem of the second positive electrode active material.

Unless otherwise specified, in the chemical formulas of the first to third aspects, when A is two or more elements, the definition for the value range of y is not only a definition for the stoichiometric number of each element as A, but also a definition for the sum of the stoichiometric numbers of various elements. For example, when A is two or more elements A1, A2 . . . An, the respective stoichiometric numbers y1, y2 . . . yn for A1, A2 . . . An are each required to fall within the numerical range defined for y in the present application, and the sum of y1, y2 . . . yn are also required to fall within this numerical range. Similarly, in the case where R is two or more elements, the definition for the numerical range of the stoichiometric number of R in the present application also has the above-mentioned meaning.

In some embodiments of the first to third aspects, when A is one, two, three or four elements selected from Zn, Al, Na, K, Mg, Mo, W, Ti, V, Zr, Fe, Ni, Co, Ga, Sn, Sb, Nb and Ge, $A_y$ is $Q_{n1}D_{n2}E_{n3}K_{n4}$, where n1+n2+n3+n4=y, and n1, n2, n3, and n4 are all positive numbers and not zero at the same time, Q, D, E, and K are independently one selected from Zn, Al, Na, K, Mg, Mo, W, Ti, V, Zr, Fe, Ni, Co, Ga, Sn, Sb, Nb and Ge, and optionally, at least one of Q, D, E and K is Fe. Optionally, one of n1, n2, n3, and n4 is zero, and the rest are not zero; more optionally, two of n1, n2, n3, and n4 are zero, and the rest are not zero; and optionally, three of n1, n2, n3, and n4 are zero, and the rest one is not zero. In the inner core, $Li_{1+x}Mn_{1-y}A_yP_{1-z}R_zO_4$, it is advantageous to dope one, two, three or four of the above-mentioned elements A at the position of manganese. Optionally, one, two or three of the above-mentioned elements A are doped. In addition, it is advantageous to dope one or two of elements R at the position of phosphorus, which is beneficial to the uniform distribution of the doping elements.

In the first to third aspects, the values of x, y and z satisfy such a condition that the whole inner core remains electrically neutral.

In the inner core, $Li_{1+x}Mn_{1-y}A_yP_{1-z}R_zO_4$, the magnitude of x is affected by the magnitude of the valence of A and R and the magnitude of y and z, so as to ensure that the entire system remains electrically neutral. If the value of x is too small, the lithium content of the entire inner core system is reduced, affecting the gram capacity of the material. The value of y will limit the total amount of all doping elements. If y is too small, that is, the doping amount is too small, the doping elements are ineffective. If y exceeds 0.5, the content of Mn in the system will be less, affecting the voltage plateau of the material. The element R is doped at the position of P. Since the PO tetrahedron is relatively stable, and a too high z value will affect the stability of the material, the z value is defined to 0.001-0.100.

In addition, in the first to third aspects, the entire inner core system remains electrically neutral, to ensure as few defects and impurities in the first positive electrode active material as possible. If there is an excess of transition metals (such as manganese) in the first positive electrode active material, due to the relatively stable structure of the material system, the excessive transition metals are likely to be precipitated in the form of elemental substances, or form impurity phases inside the lattice, and remaining electrically neutral can minimize such impurity phases. In addition, ensuring the electrical neutrality of the system can also generate lithium vacancies in the material in some cases, so that the kinetic performance of the material become much better.

In the first to third aspects, the values of a, b and c satisfy such a condition that the crystalline pyrophosphate $Li_aMP_2O_7$ or $M_b(P_2O_7)_c$ remains electrically neutral.

In the first to third aspects, crystalline means that the degree of crystallinity is 50% or higher, that is, 50%-100%. A crystallinity of less than 50% is called glassy state. The crystalline pyrophosphate and crystalline phosphate of the present application have a crystallinity of 50% to 100%.

Pyrophosphates and phosphates with a certain degree of crystallinity not only promote the full exertion of the ability of the pyrophosphate cladding layer to hinder manganese dissolution and the excellent lithium ion-conducting ability of the phosphate cladding layer to reduce the interfacial side reactions, but also allow for better lattice matching between the pyrophosphate cladding layer and the phosphate cladding layer, to enable tight bonding between the cladding layers.

In the first to third aspects, the crystallinity of the first cladding layer material crystalline pyrophosphate and the second cladding layer material crystalline phosphate in the first positive electrode active material can be tested by conventional technical means in the art, for example, by density method, infrared spectroscopy, differential scanning calorimetry, and nuclear magnetic resonance spectroscopy, or by, for example, X-ray diffraction method.

The X-ray diffraction method for testing the crystallinity of the first cladding layer of crystalline pyrophosphate and the second cladding layer of crystalline phosphate in the first positive electrode active material may include the following steps specifically:

A certain amount of the first positive electrode active material powder is taken, and measured for the total scattering intensity by X-ray diffraction, which is the sum of the scattering intensities of the material in the entire space, and only related to the intensity of the primary ray, the chemical structure of the first positive electrode active material powder, and the total number of electrons participating in the diffraction, that is, the mass, and independent the state order of the sample. The crystalline scattering and the non-crystalline scattering are then split from the diffractogram, and the crystallinity is the ratio of the crystalline scattering to the total scattering intensity.

It should be noted that in the first to third aspects, the crystallinity of pyrophosphate and phosphate in the cladding layer can be adjusted, for example, by adjusting the process conditions in the sintering process, such as sintering temperature, and sintering time.

In the first to third aspects, since metal ions are difficult to migrate in pyrophosphate, pyrophosphate can be used as the first cladding layer to effectively isolate the doped metal ions from the electrolyte solution. Since the structure of crystalline pyrophosphate is stable, cladding with crystalline pyrophosphate can effectively inhibit the dissolution of transition metals and improve the cycling performance.

In the first to third aspects, the bonding between the first cladding layer and the core is similar to a heterojunction, and the firmness of the bonding depends on the degree of lattice matching. When the lattice mismatch is less than 5%, the lattice matching is better, and the two are easy to bond closely. The tight bonding can ensure that the cladding layer will not fall off in the subsequent cycle process, which is beneficial to ensuring the long-term stability of the material. The degree of bonding between the first cladding layer and the core is mainly measured by calculating the mismatch degree of the lattice constants between the core and the cladding layer. In the present application, after the inner core is doped with elements A and R, compared with the case without element doping, the matching degree between the inner core and the first cladding layer is improved, and the inner core and the pyrophosphate cladding layer can be more closely bonded.

In the first to third aspects, crystalline phosphate is chosen as the second cladding layer for the reason that: firstly, crystalline phosphate has higher lattice match (only 3% mismatch) with the first layer cladding material crystalline pyrophosphate; secondly, the stability of phosphate itself is better than that of pyrophosphate, and cladding pyrophosphate therewith facilitate improving the stability of the material. The crystalline phosphate is very stable in structure, and has excellent ability to conduct lithium ions. Therefore, the use of crystalline phosphate for cladding can effectively reduce the interfacial side reactions on the surface of the first positive electrode active material, thereby improving the high-temperature cycling performance and storage performance of the secondary battery. The lattice matching between the second cladding layer and the first cladding layer is similar to that for the bonding between the first cladding layer and the core above. When the lattice mismatch is less than 5%, the lattice matching is good, and the two are easy to bond tightly.

In the first to third aspects, the main reason for using carbon as the third cladding layer is the better electronic conductivity of the carbon layer. When used in a secondary battery, an electrochemical reaction takes place, requiring the participation of electrons. Therefore, to increase the electron transport between the particles and the electron transport between different positions on the particles, it is possible to use carbon having excellent electrical conductivity performance for cladding. Carbon cladding can effectively improve the electrical conductivity performance and desolvation ability of the first positive electrode active materials.

FIG. 1 is a schematic diagram of a desirable first positive electrode active material with a three-layer cladding structure. As shown, the innermost circle schematically represents the inner core, followed by the first cladding layer, the second cladding layer, and the third cladding layer from the inside to the outside. This figure shows an ideal state where each layer dads the interior completely. In practice, each cladding layer may completely or partially clad the interior.

In some embodiments of the first to third aspects, the mass ratio of the first active material to the second active material is 1:7-7:1, optionally 1:4-4:1, further optionally 1:3-3:1, such as 1:7, 1:5, 1:3, 1:2, 3:5, 1:1, 5:3, 2:1, 3:1, 5:1, 7:1. This can ensure that the secondary battery has excellent rate performance, excellent cycling performance and high-temperature stability, high energy density, excellent kinetic performance and low-temperature performance. Also, it reduces interfacial side reactions, and improves the safety of the secondary battery.

In some embodiment of the first to third aspects, in the first positive electrode active material, A is selected from one or more elements of Fe, Ti, V, Ni, Co and Mg. By selecting the doping elements within the above range, it is beneficial to enhancing the doping effect. On the one hand, the lattice change rate is further reduced, thereby inhibiting the dissolution of manganese and reducing the consumption of the electrolyte solution and active lithium. On the other hand, it also facilitates reducing the surface oxygen activity and decreasing the interfacial side reactions between the first positive electrode active material and the electrolyte solution, thereby improving the cycling performance and high-temperature storage performance of the secondary battery.

In some embodiment of the first to third aspects, in the first positive electrode active material, R is selected from one element of B, Si, N and S. By selecting doping elements within the above range, the rate performance and electrical conductivity of the secondary battery can be further improved, thereby improving the gram capacity, cycling performance and high-temperature performance of the secondary battery.

In some embodiments of the first to third aspects, in the first positive electrode active material, the ratio of y to 1−y is selected from 1:10 to 1:1, optionally 1:4 to 1:1. Here, y represents the sum of the stoichiometric numbers of element A doped at the position of Mn. When the above conditions are satisfied, the energy density, cycling performance and rate performance of the secondary battery are further improved.

In some embodiments of the first to third aspects, in the first positive electrode active material, the ratio of z to 1−z is selected from 1:9 to 1:999, optionally 1:499 to 1:249. Here, z represents the sum of the stoichiometric numbers of element R doped at the position of P. When the above conditions are satisfied, the energy density, cycling performance and rate performance of the secondary battery are further improved.

In some embodiments of the first to third aspects, in the first positive electrode active material, the interplanar spacing of the crystalline pyrophosphate in the first cladding layer is in the range of nm, and the angle of the crystal orientation (111) is in the range of 18.00°-32.00°; and the interplanar spacing of the crystalline phosphate in the secondary cladding layer is in the range of 0.244 to 0.425 nm, and the angle of the crystal orientation (111) is in the range of 20.00°-37.00°.

The first cladding layer and the second cladding layer in the first positive electrode active material of the present application are both formed of a crystalline substance. Crystalline pyrophosphate and crystalline phosphate within the above-mentioned ranges of interplanar spacing and angle can more effectively inhibit the lattice change rate and Mn dissolution of lithium manganese phosphate during the process of lithium intercalation and deintercalation, thereby improving the high temperature cycling performance, cycling stability and high temperature storage performance of the secondary battery. The crystalline pyrophosphate and crystalline phosphate in the cladding layers can be characterized by conventional technical means in the art, or characterized by, for example, transmission electron microscopy (TEM). Under TEM, the inner core and the cladding layer can be distinguished by measuring the interplanar spacing.

The specific test method for the interplanar spacing and angle of crystalline pyrophosphate and crystalline phosphate in the cladding layers may include the following steps:

A certain amount of the coated first positive electrode active material sample powder is charged in a test tube, and a solvent such as alcohol is injected into the test tube, and then sufficiently stirred to disperse the powder. Then an appropriate amount of the solution is taken by a clean disposable plastic pipette and dropped on a 300-mesh copper screen. At this time, some of the powder will remain on the copper screen. The copper screen with the sample is transferred to a TEM sample cavity and tested, to obtain an original TEM image which is saved.

The original image obtained from the TEM test is opened in the diffraction software, and receives Fourier transform to obtain a diffraction pattern. A distance from a diffraction spot to a center position in the diffraction pattern is measured to obtain the interplanar spacing, and the angle is calculated according to the Bragg equation.

A difference ex ists between the interplanar spacing ranges of crystalline pyrophosphate and crystalline phosphate, which can be directly determined from the values of the interplanar spacing.

In some embodiments of the first to third aspects, in the first positive electrode active material, the carbon in the third cladding layer is a mixture of SP2 hybridized carbon and SP3 hybridized carbon. Optionally, the molar ratio of the SP2 hybridized carbon to SP3 hybridized carbon is any value within the range of 0.1-10, and optionally any value within the range of 2.0-3.0.

In some embodiments of the first to third aspects, the molar ratio of SP2 hybridized carbon to SP3 hybridized carbon may be about 0.1, about 0.2, about 0.3, about 0.4, about 0.5, about 0.6, about 0.7, about 0.8, about 0.9, about 1, about 2, about 3, about 4, about 5, about 6, about 7, about 8, about 9, or about 10, or within any range defined by any value above.

In the present application, "about" before a numerical value indicates a range, indicating a range of ±10% of the numerical value.

By selecting the state of carbon in the carbon cladding layer, the overall electrical performance of the secondary battery can be improved. Specifically, by using a mixture of SP2 hybridized carbon and SP3 hybridized carbon and defining the ratio of SP2 hybridized carbon to SP3 hybridized carbon within a certain range, the following situations can be avoided: if the carbon in the cladding layer is in absolutely amorphous SP3 state, the conductivity is poor; and If the carbon is in absolutely graphitized SP2 state, although the conductivity is good, there are few channels of lithium ions, which is not conducive to the intercalation and deintercalation of lithium. In addition, defining the molar ratio of SP2 hybridized carbon to SP3 hybridized carbon within the above range can not only achieve good electrical conductivity, but also ensure the channels of lithium ions, so it is beneficial to the realization of the function of the secondary battery and its cycling performance.

The mixing ratio of the SP2 hybridized and SP3 hybridized carbon in the third cladding layer can be controlled by sintering conditions such as sintering temperature and sintering time. For example, in the case of using sucrose as a carbon source to prepare the third cladding layer, after sucrose is cracked at a high temperature, it is deposited on the second cladding layer at a high temperature, to form a cladding layer of SP3 and SP2 hybridized carbon. The ratio of SP2 hybridized carbon and SP3 hybridized carbon can be adjusted by selecting high-temperature cracking conditions and sintering conditions.

The structure and characteristics of the carbon in the third cladding layer can be determined by Raman spectroscopy. The specific test method comprises: splitting the spectrum of the Raman test, to obtain Id/Ig (wherein Id is the peak intensity of SP3 hybridized carbon, and Ig is the peak intensity of SP2 hybridized carbon), thereby confirming the molar ratio of the two.

In some embodiments of the first to third aspects, the coating amount of the first cladding layer is greater than 0 and less than or equal to 6 wt %, optionally greater than 0 and less than or equal to 5.5 wt %, and more optionally greater than 0 and less than or equal to 2 wt %, based on the weight of the inner core; and/or

- the coating amount of the second cladding layer is greater than 0 and less than or equal to 6 wt %, optionally greater than 0 and less than or equal to 5.5 wt %, and more optionally 2-4 wt %, based on the weight of the inner core; and/or
- the coating amount of the third cladding layer is greater than 0 and less than or equal to 6 wt %, optionally greater than 0 and less than or equal to 5.5 wt %, and more optionally greater than 0 and less than or equal to 2 wt %, based on the weight of the inner core.

In the present application, the coating amount of each layer is not zero.

In the first positive electrode active material with a core-shell structure of the present application, the coating amounts of the three cladding layers are preferably within the above ranges, so that the inner core can be sufficiently coated, and the kinetic performance and safety performance of the secondary battery can be further improved without compromising the gram capacity of the positive electrode activity material.

For the first cladding layer, if the coating amount is within the above range, the following situations can be avoided: if the coating amount is too small, the thickness of the cladding layer is thin, so the migration of transition metals may be not effectively hindered; and if the amount is too large, the cladding layer is too thick, so the migration of $Li^+$ is affected, thereby affecting the rate performance of the material.

For the second cladding layer, if the coating amount is within the above range, the following situations can be avoided: if the coating amount is too large, the plateau voltage of the whole material may be affected; and if the coating amount is too small, sufficient coating cannot be achieved.

For the third cladding layer, the carbon cladding mainly serves to enhance the electron transport between particles. However, since the structure also contains a large amount of amorphous carbon, the density of carbon is low. Therefore, if the coating amount is too high, the compacted density of the electrode sheet is affected.

In some embodiments of the first to third aspects, in the first positive electrode active material, the thickness of the first cladding layer is 1-10 nm.

In some embodiments of the first to third aspects, the thickness of the first cladding layer may be about 2 nm, about 3 nm, about 4 nm, about 5 nm, about 6 nm, about 7 nm, about 8 nm, about 9 nm, or about 10 nm, or within any range defined by any value above.

In the present application, when the thickness of the first cladding layer is in the range of 1-10 nm, the possible adverse effects on the kinetic performance of the material caused when the thickness is too large, and the inability to effectively hinder the migration of transition metal ions caused when the thickness is too small can be avoided.

In some embodiments of the first to third aspects, in the first positive electrode active material, the thickness of the second cladding layer is 2-15 nm.

In some embodiments of the first to third aspects, the thickness of the second cladding layer may be about 2 nm, about 3 nm, about 4 nm, about 5 nm, about 6 nm, about 7 nm, about 8 nm, about 9 nm, about 10 nm, about 11 nm, about 12 nm, about 13 nm, about 14 nm, about 15 nm, or within any range defined by any value above.

In the present application, when the thickness of the second cladding layer is in the range of 2-nm, the surface structure of the second cladding layer is stable, and the side reaction with the electrolyte solution is less, so the interfacial side reactions can be effectively reduced, thereby improving the high-temperature performance of secondary batteries.

In some embodiments of the first to third aspects, in the first positive electrode active material, the thickness of the third cladding layer is 2-25 nm.

In some embodiments of the first to third aspects, the thickness of the third cladding layer may be about 2 nm, about 3 nm, about 4 nm, about 5 nm, about 6 nm, about 7 nm, about 8 nm, about 9 nm, about 10 nm, about 11 nm, about 12 nm, about 13 nm, about 14 nm, about 15 nm, about 16 nm, about 17 nm, about 18 nm, about 19 nm, about 20 nm, about 21 nm, about 22 nm, about 23 nm, about 24 nm, about 25 nm, or within any range defined by any value above.

In the present application, when the thickness of the third cladding layer is in the range of 2-25 nm, the electrical conductivity performance of the material can be improved and the compacted density of the electrode sheet prepared with the first positive electrode active material can be improved.

The thickness of the cladding layer is mainly tested by FIB. The specific method may include the following steps: randomly selecting a single particle from the first positive electrode active material powder to be tested, cutting a thin slice with a thickness of about 100 nm from a middle position of or near the middle position of the selected particle, testing the slice by TEM, determining the thickness of the cladding layer, and averaging the measurements of 3-5 positions.

In some embodiments of the first to third aspects, in the first positive electrode active material, based on the weight of the first positive electrode active material, the content of element manganese is in the range of 10 wt % to 35 wt %, optionally in the range of 15 wt % to 30 wt %, more optionally in the range of 17 wt % to 20 wt %.

In the present application, in the case where manganese is contained only in the inner core of the first positive electrode active material, the content of manganese may correspond to the content in the inner core.

In the first positive electrode active material with a core-shell structure of the present application, when the content of element manganese is within the above range, the deterioration of the structure stability, the decrease in density of the material, and other problems that may be caused if the content of element manganese is too large can be avoided to improve the cycling performance, storage performance, compacted density and other performances of the secondary battery; and the problems such as low voltage plateau that may be caused if the content of manganese is too small can be avoided, thereby improving the energy density of the secondary battery.

In some embodiments of the first to third aspects, in the first positive electrode active material, based on the weight of the first positive electrode active material, the content of element phosphorus is in the range of 12 wt % to 25 wt %, optionally in the range of 15 wt % to 20 wt %.

In the first positive electrode active material with a core-shell structure of the present application, when the content of element phosphorus is within the above range, the following situations can be effectively avoided: if the content of element phosphorus is too large, a potential too strong covalent nature of P—O affects the electrical conduction of small polarons, thereby affecting the electrical conductivity of the material; and if the content of element phosphorus is too small, the stability of the lattice structure of the inner core, the pyrophosphate in the first cladding layer and/or the phosphate in the second cladding layer may be caused to decrease, thereby affecting the overall stability of the material.

In some embodiments of the first to third aspects, in the first positive electrode active material, based on the weight of the first positive electrode active material, the weight ratio of element manganese to element phosphorus is in the range of 0.90-1.25, optionally 0.95-1.20.

In the first positive electrode active material with a core-shell structure of the present application, the weight ratio of element manganese to element phosphorus is within the above range, which can effectively avoid the following situations: if the weight ratio is too large, it means that excessive element manganese ex ists, and the manganese dissolution increases, affecting the stability and gram capacity of the first positive electrode active material, and thus affecting the cycling performance and storage performance of the secondary battery; and if the weight ratio is too small, it means that excessive element phosphorus ex ists, and impurity phases tend to be formed, which will reduce the discharge voltage plateau of the material, thereby reducing the energy density of the secondary battery.

The measurement of elements manganese and phosphorus can be carried out by conventional technical means in the art. In particular, the contents of element manganese and element phosphorus are determined as follows: the material is dissolved in dilute hydrochloric acid (with a concentration of 10-30%), the contents of various elements in the solution are tested by ICP, and then the content of element manganese is measured and calculated, to get its weight percentage.

In some embodiments of the first to third aspects, the lattice change rate of the first positive electrode active material before and after complete and intercalation and deintercalation of lithium is 4% or less, optionally 3.8% or less, and more optionally 2.0-3.8%.

The intercalation and deintercalation process of lithium manganese phosphate ($LiMnPO_4$) is a two-phase reaction. The interfacial stress between the two phases is determined by the lattice change rate before and after lithium intercalation and deintercalation. The smaller the lattice change rate is, the smaller the interfacial stress and the easier the $Li^+$ transport will be. Therefore, reducing the lattice change rate of the inner core facilitates the increase of the $Li^+$ transport capability, thereby improving the rate performance of the secondary batteries. The first positive electrode active material with a core-shell structure of the present application can achieve a lattice change rate of less than 4% before and after lithium intercalation and deintercalation. Therefore, the use of the first positive electrode active material can improve the rate performance of the secondary battery. The lattice change rate can be measured by methods known in the art, such as X-ray diffraction spectroscopy (XRD).

In some embodiments of the first to third aspects, the Li/Mn antisite defect concentration of the first positive electrode active material with a core-shell structure is 4% or less, optionally 2.2% or less, and more optionally 1.5-2.2%.

The Li/Mn antisite defect of the present application refers to the exchange of the positions of $Li^+$ and $Mn^{2+}$ in the lattice of $LiMnPO_4$. Correspondingly, the concentration of Li/Mn antisite defect refers to the percentage of $Li^+$ that exchanges with $Mn^{2+}$ relative to the total amount of $Li^+$. In the present application, the concentration of Li/Mn antisite defect can be measured, for example, in accordance with JIS K 0131-1996.

The first positive electrode active material with a core-shell structure of the present application can achieve the above-mentioned low concentration of Li/Mn antisite defect. Although the mechanism is not yet clear, the inventors of the present application speculate that since $Li^+$ and $Mn^{2+}$ will exchange positions in the lattice of $LiMnPO_4$, and the $Li^+$ transport channel is a one-dimensional channel, $Mn^{2+}$ is difficult to migrate in the $Li^+$ channel, thereby hindering the transport of Lit Therefore, the first positive electrode active material with a core-shell structure of the present application has a low concentration of Li/Mn antisite defect within the above range, so $Mn^{2+}$ can be prevented from hindering the transport of $Li^+$, and the gram capacity and rate performance of the first positive electrode activity material can be improved.

In some embodiments of the first to third aspects, the compacted density of the first positive electrode active material at 3T is 2.2 g/cm$^3$ or more, optionally 2.2 g/cm$^3$ or more and 2.8 g/cm$^3$ or less. The higher the compacted density is, the greater the weight of the active material per unit volume will be. Therefore, increasing the compacted density is beneficial to increasing the volumetric energy density of the battery cell. The compacted density can be measured according to GB/T 24533-2009.

In some embodiments of the first to third aspects, the surface oxygen valence of the first positive electrode active material is −1.90 or less, and optionally −1.90 to −1.98.

The stable valence of oxygen is −2. The closer the valence is to −2, the stronger the electron-gaining ability will be, that is, the stronger the oxidizing ability will be. Usually, the surface valence is below −1.7. In the present application, by defining the surface oxygen valence of the first positive electrode active material in the above-mentioned range, the interfacial side reactions between the first positive electrode material and the electrolyte solution can be reduced, thereby improving the cycling performance and gas generation upon high-temperature storage of the battery cell.

The surface oxygen valence can be measured by methods known in the art, such as by electron energy loss spectroscopy (EELS).

In some embodiments of the first to third aspects, in the second positive electrode active material, the ratios of d, (1−d−e) and e in $LiNi_dCo_eMn_{(1-d-e)}O_2$ and $LiNi_dCo_eAl_{(1-d-e)}O_2$ are each independently 5:2:3 or 3:1:1 or 8:1:1. Thus, the energy density of the secondary battery can be further improved.

In some embodiments of the first to third aspects, the sum of the mass of the first positive electrode active material and the second positive electrode active material accounts for 88%-98.7% of the mass of the positive electrode sheet. It further ensures that the secondary battery has excellent rate performance, kinetic performance, cycling performance and low-temperature performance, as well as high energy density.

In some embodiments of the first to third aspects, the average particle size of the primary particles of the first positive electrode active material is in the range of 50-500 nm, and the volume median particle size Dv50 is in the range of 200-300 nm. Since the particles will agglomerate, the practically measured secondary particle size after agglomeration may be 500-40000 nm. The size of the first positive electrode active material particles affects the processing of the material and the compacted density performance of the electrode sheet. By selecting primary particles having an average particle size within the above range, the following situations can be avoided: if the average particle size of the primary particles of the first positive electrode active material is too small, it may cause agglomeration of the particles and difficulty in dispersion, and more binder is needed, causing poor brittleness of the electrode sheet; and if the average particle size of the primary particles of the first positive electrode active material is too large, it may cause larger gap between the particles and reduced compacted density.

Through the above solution, the lattice change rate of lithium manganese phosphate and the dissolution of Mn in the process of lithium intercalation and deintercalation can be effectively suppressed, thereby improving the high temperature cycling stability and high temperature storage performance of the secondary battery.

In the present application, the median particle size Dv50 refers to a corresponding particle size when the cumulative volume distribution percentage of the material reaches 50%. In the present application, the median particle size Dv50 of the material can be determined by laser diffraction particle size analysis. For example, it is determined by using a laser particle size analyzer (such as Malvern Master Size 3000) with reference to the standard GB/T 19077-2016.

Through process control (for example, adequate mixing and grinding of materials from various sources), it can ensure that each element is uniformly distributed in the crystal lattice without aggregation. The positions of main characteristic peaks in the XRD pattern of lithium manganese phosphate doped with elements A and R are consistent with those of undoped $LiMnPO_4$, indicating that no impurity phases are introduced in the doping process. Therefore, the improvement of the inner core performance is mainly attributed to elemental doping, instead of impurity phases. After preparing the first positive electrode active material of the present application, the inventors of the present application cut the middle region of the prepared first positive electrode active material particles by focused ion beam (FIB for short), conduct testing by transmission electron microscopy (TEM for short) and energy-dispersive X-ray spectroscopy (EDS for short), and find that all elements are evenly distributed without aggregation.

In some embodiments of the first to third aspects, the positive electrode current collector can be a metal foil or a composite current collector. For example, an aluminum foil can be used as the metal foil. The composite current collector may include a high molecular material substrate layer and a metal layer formed on at least one surface of the high molecular material substrate layer. The composite current collector can be formed by forming a metal material (aluminum, aluminum alloy, nickel, nickel alloy, titanium, titanium alloy, silver and silver alloy, etc.) on a high molecular material substrate (such as polypropylene (PP), polyethylene terephthalate (PET), polybutylene terephthalate (PBT), polystyrene (PS), and polyethylene (PE)).

In some embodiments of the first to third aspects, the positive electrode film layer may further comprise other positive electrode active materials known in the art for batteries. As an example, the positive electrode active material may include at least one of the following materials: lithium-containing phosphate with an olivine structure, lithium transition metal oxide, and their respective modified compounds. However, the present application is not limited to these materials, and other conventional materials useful as positive electrode active materials for batteries can also be used. These positive electrode active materials may be used alone or in combinations of two or more thereof. Among others, examples of lithium transition metal oxides may include, but are not limited to, at least one of lithium-nickel oxide (such as $LiNiO_2$), lithium-manganese oxide (such as $LiMnO_2$, $LiMn_2O_4$), lithium-nickel-cobalt oxide, lithium-manganese-cobalt oxide, lithium-nickel-manganese oxide and modified compounds thereof. Examples of the lithium-containing phosphate with an olivine structure may include, but are not limited to, at least one of lithium iron phosphate (such as $LiFePO_4$ (also abbreviated as LFP)), lithium iron phosphate-carbon composite, lithium manganese phosphate (such as $LiMnPO_4$), lithium manganese phosphate-carbon composite, lithium manganese iron phosphate, and lithium manganese iron phosphate-carbon composite.

In some embodiments of the first to third aspects, the positive electrode film layer further optionally includes a binder. As an example, the binder may include at least one of polyvinylidene fluoride (PVDF), polytetrafluoroethylene (PTFE), vinylidene fluoride-tetrafluoroethylene-propylene terpolymer, vinylidene fluoride-hexafluoropropylene-tetrafluoroethylene terpolymer, tetrafluoroethylene-hexafluoropropylene copolymer, and fluorinated acrylate resin.

In some embodiments of the first to third aspects, the positive electrode film layer further optionally includes a conductive agent. As an example, the conductive agent may include at least one of superconducting carbon, acetylene black, carbon black, Ketjen black, carbon dots, carbon nanotubes, graphene, and carbon nanofibers.

In the first aspect to third aspect, provided is a method for preparing a positive electrode active material, comprising the following steps:

a step of providing an inner core material, wherein the inner core has a chemical formula of $Li_{1+x}Mn_{1-y}A_yP_{1-z}R_zO_4$, where x is any value in the range of −0.100-0.100, y is any value in the range of 0.001-0.500, z is any value in the range of 0.001-0.100, A is one or more elements selected from Zn, Al, Na, K, Mg, Mo, W, Ti, V, Zr, Fe, Ni, Co, Ga, Sn, Sb, Nb and Ge, and optionally one or more elements selected from Fe, Ti, V, Ni, Co and Mg, and R is one or more elements selected from B, Si, N and S, and optionally, R is an element selected from B, Si, N and S; and a coating step, comprising: respectively providing a suspension of $Li_aMP_2O_7$ and/or $M_b(P_2O_7)_c$ and $XPO_4$, adding the inner core material to the suspension, mixing, and sintering to obtain a first positive electrode active material, where 0≤a≤2, 1≤b≤4, 1≤c≤6, and the values of a, b, and c satisfy such a condition that crystalline pyrophosphate $Li_aMP_2O_7$ or $M_b(P_2O_7)_c$ remains electrical neutrality; M is each independently one or more elements selected from Fe, Ni, Mg, Co, Cu, Zn, Ti, Ag, Zr, Nb or Al; and X is one or more elements selected from Li, Fe, Ni, Mg, Co, Cu, Zn, Ti, Ag, Zr, Nb or Al;

wherein the first positive electrode active material has a core-shell structure which includes an inner core, a first cladding layer coating the inner core, a second cladding layer coating the first cladding layer and a third cladding layer coating the second cladding layer, wherein the first cladding layer comprises crystalline pyrophosphate $Li_aMP_2O_7$ and/or $M_b(P_2O_7)_c$, the second cladding layer comprises crystalline phosphate $XPO_4$, and the third cladding layer is carbon.

In some embodiments of the first to third aspects, the step of providing an inner core material comprises:

step (1): mixing a manganese source, a dopant of element A and an acid in a container with stirring to obtain manganese salt particles doped with element A; and step (2): mixing the manganese salt particles doped with element A with a lithium source, a phosphorus source and a dopant of element R in a solvent to obtain a slurry, and sintering under an inert gas atmosphere to obtain an inner core doped with element A and element R, wherein the inner core doped with element A and element R is $Li_{1+x}Mn_{1-y}A_yP_{1-z}R_zO_4$, in which x is any value in the range of −0.100-0.100; y is any value in the range of 0.001-0.500; z is any value in the range of 0.001-0.100; A is one or more elements selected from Zn, Al, Na, K, Mg, Mo, W, Ti, V, Zr, Fe, Ni, Co, Ga, Sn, Sb, Nb and Ge, and optionally one or more elements selected from Fe, Ti, V, Ni, Co and Mg; and R is one or more elements selected from B, Si, N and S, and optionally, R is one element selected from B, Si, N and S.

The preparation method of the present application has no particular limitation on the source of the material, and the source of a certain element may include one or more of an elementary substance, a sulfate, a halide, a nitrate, an organic acid salt, an oxide or a hydroxide of the element, provided that the purpose of the preparation method of the present application can be achieved with the source.

In some embodiments of the first to third aspects, in the step of providing the inner core material, the dopant of element A is one or more of a simple substance, a carbonate, a sulfate, a chloride, a nitrate, an organic acid salt, an oxide, and a hydroxide of one or more elements selected from Zn, Al, Na, K, Mg, Mo, W, Ti, V, Zr, Fe, Ni, Co, Ga, Sn, Sb, Nb and Ge.

In some embodiments of the first to third aspects, in the step of providing the inner core material, the dopant of the element R is one or more of inorganic acids, meta-acids, organic acids, sulfates, chloride salts, nitrates, organic acid salts, oxides and hydroxides of one or more elements selected from B, Si, N and S.

In some embodiments of the first to third aspects, in the step of providing the inner core material, the manganese source may be a manganese-containing substance known in the art that can be used to prepare lithium manganese phosphate. For example, the manganese source may be one or more selected from elemental manganese, manganese dioxide, manganese phosphate, manganese oxalate, and manganese carbonate.

In some embodiments of the first to third aspects, in the step of providing the inner core material, the acid may be one or more selected from inorganic acids such as hydrochloric acid, sulfuric acid, nitric acid, phosphoric acid, silicic acid, metasilicic acid, and organic acids such as oxalic acid. In some embodiments, the acid is a dilute organic acid with a concentration of 60 wt % or less.

In some embodiments of the first to third aspects, in the step of providing the inner core material, the lithium source may be a lithium-containing substance known in the art that can be used to prepare lithium manganese phosphate. For example, the lithium source is one or more selected from lithium carbonate, lithium hydroxide, lithium phosphate, and lithium dihydrogen phosphate.

In some embodiments of the first to third aspects, in the step of providing the inner core material, the phosphorus source may be a phosphorus-containing substance known in the art that can be used to prepare lithium manganese phosphate. For example, the phosphorus source is one or more selected from diammonium hydrogen phosphate, ammonium dihydrogen phosphate, ammonium phosphate and phosphoric acid.

In some optional embodiments of the first to third aspects, in the step of providing the inner core material, after the manganese source, the dopant of element A and the acid react in a solvent to obtain a suspension of a manganese salt doped with element A, the suspension is filtered, oven dried and sanded to obtain element A doped manganese salt particles with a particle size of 50-200 nm.

In some optional embodiments of the first to third aspects, in the step of providing the inner core material, the slurry in step (2) is dried to obtain a powder, and then the powder is sintered to obtain an inner core doped with element A and element R.

In some embodiments of the first to third aspects, the mixing in step (1) is carried out at a temperature of 20-120° C., and optionally 40-120° C.; and/or the stirring in step (1) is carried out at 400-700 rpm for 1-9 h, and optionally 3-7 h.

Optionally, the reaction temperature in step (1) can be about 30° C., about 50° C., about 60° C., about 70° C., about 80° C., about 90° C., about 100° C., about 110° C. or about 120° C.; in step (1), the stirring is carried out for about 2 h, about 3 h, about 4 h, about 5 h, about 6 h, about 7 h, about 8 h or about 9 h; optionally, the reaction temperature and stirring time in step (1) can be within any range defined by the above-mentioned arbitrary values.

In some embodiments of the first to third aspects, the mixing in step (2) is carried out at a temperature of 20-120° C., and optionally 40-120° C. for 1-12 h. Optionally, the reaction temperature in step (2) can be about 30° C., about 50° C., about 60° C., about 70° C., about 80° C., about 90° C., about 100° C., about 110° C. or about 120° C. In step (2), the mixing is carried out for about 2 h, about 3 h, about 4 h, about 5 h, about 6 h, about 7 h, about 8 h, about 9 h, about 10 h, about 11 h or about 12 h. Optionally, the reaction temperature and mixing time in step (2) can be within any range defined by the above-mentioned arbitrary values.

When the temperature and time during the preparation of the inner core particles are within the above-mentioned ranges, the prepared inner core and the positive electrode active material obtained therefrom have fewer lattice defects, which is beneficial to inhibiting the dissolution of manganese and reducing the side reactions at the interface between the positive electrode active material and the electrolyte solution, thereby improving the cycling performance and safety performance of the secondary battery.

In some embodiments of the first to third aspects, in the step of providing the inner core material, in the process of preparing the dilute acid manganese salt particles doped with element A and element R, the pH of the solution is controlled at 3.5-6, optionally the pH of the solution is controlled at 4-6, and more optionally, the pH of the solution is controlled at 4-5. It should be noted that in the present application, the pH of the resulting mixture can be adjusted by methods commonly used in the art, for example, by adding an acid or a base.

In some embodiments of the first to third aspects, in step (2), the molar ratio of the manganese salt particles to the lithium source and the phosphorus source is 1:0.5-2.1:0.5-2.1, and optionally, the molar ratio of the manganese salt particles doped with element A to the lithium source and the phosphorus source is about 1:1:1.

In some embodiments of the first to third aspects, in the step of providing the inner core material, the sintering in the process of preparing the lithium manganese phosphate doped with element A and element R comprises: sintering at 600-950° C. for 4-10 h under an inert gas atmosphere or a mixed atmosphere of an inert gas and hydrogen; optionally, the sintering may be sintering at about 650° C., about 700° C., about 750° C., about 800° C., about 850° C., or about 900° C. for about 2 h, about 3 h, about 4 h, about 5 h, about 6 h, about 7 h, about 8 h, about 9 h or about 10 h; and optionally, the sintering temperature and sintering time can be within any range defined by any of the above-mentioned values. In the process of preparing lithium manganese phosphate doped with elements A and R, if the sintering temperature is too low and the sintering time is too short, the crystallinity of the inner core will be low, affecting the overall performance; if the sintering temperature is too high, impurity phases are prone to appear in the inner core of the material, affecting the overall performance; and if the sintering time is too long, the particle size of the inner core particles of the material becomes larger, affecting the gram capacity, compacted density and rate performance.

In some embodiments of the first to third aspects, in the step of providing the inner core material, the protective atmosphere is a mixed gas of 70-90 vol % of nitrogen and 10-30 vol % of hydrogen.

In some embodiments of the first to third aspects, the coating step comprises:

a first coating step, comprising: dissolving a source of element M, a phosphorus source, an acid and optionally a lithium source in a solvent to obtain a first cladding layer suspension; mixing the inner core obtained in the inner core step and the first cladding layer suspension obtained in the first coating step fully, drying and then sintering to obtain a material coated with a first cladding layer;

a second coating step, comprising: dissolving a source of element X, a phosphorus source and an acid in a solvent to obtain a second cladding layer suspension; mixing the material coated with the first cladding layer obtained in the first coating step with the second cladding layer suspension obtained in the second coating step fully, drying, and then sintering to obtain a material coated with two cladding layers; and a third coating step, comprising: fully dissolving a carbon source in a solvent, to obtain a third cladding layer solution; then adding the material coated with two cladding layers obtained in the second coating step into the third cladding layer solution, mixing uniformly, drying, and then sintering to obtain a material coated with three cladding layers, that is, the positive electrode active material.

In some embodiments of the first to third aspects, in the coating step, the source of element M is one or more of an elementary substance, a carbonate, a sulfate, a chloride, a nitrate, an organic acid salt, an oxide, and a hydroxide of one or more elements selected from Fe, Ni, Mg, Co, Cu, Zn, Ti, Ag, Zr, Nb or Al.

In some embodiments of the first to third aspects, in the coating step, the source of element X is one or more of an elementary substance, a carbonate, a sulfate, a chloride, a nitrate, an organic acid salt, an oxide, and a hydroxide of one or more elements selected from Li, Fe, Ni, Mg, Co, Cu, Zn, Ti, Ag, Zr, Nb or Al.

The amounts of respective sources of elements A, R, M, and X depend on the target doping amounts, and the ratio of the amounts of the lithium source, the manganese source, and the phosphorus source conforms to the stoichiometric ratio.

As an example, the carbon source is one or more selected from starch, sucrose, glucose, polyvinyl alcohol, polyethylene glycol, and citric acid.

In some embodiments of the first to third aspects, in the first coating step, the solution in which the source of element M, the phosphorus source and the acid and optionally the lithium source are dissolved is controlled to have a pH of 3.5-6.5, then stirred and allowed to react for 1-5 h; and then the solution is heated to 50-120° C. and maintained at this temperature for 2-10 h, and/or, the sintering is carried out at 650-800° C. for 2-6 h.

In some embodiments of the first to third aspects, in the first coating step, the reaction proceeds sufficiently. Optionally, in the first coating step, the reaction is carried out for about 1.5 h, about 2 h, about 3 h, about 4 h, about 4.5 h, or about 5 h. Optionally, in the first coating step, the reaction time of the reaction may be within any range defined any of the above-mentioned values.

In some embodiments of the first to third aspects, in the first coating step, the solution is controlled to have a pH of 4-6. Optionally, in the first coating step, the solution is heated to about about 60° C., about 70° C., about 80° C., about 90° C., about 100° C., about 110° C., or about 120° C., and maintained at this temperature for about 2 h, about 3 h, about 4 h, about 5 h, about 6 h, about 7 h, about 8 h, about 9 h, or about 10 h. Optionally, in the first coating step, the elevated temperature and holding time of the temperature can be within any range defined by any of the above-mentioned values.

In some embodiments of the first to third aspects, in the first coating step, the sintering may be carried out at about 650° C., about 700° C., about 750° C., or about 800° C. for about 2 h, about 3 h, about 4 h, about 5 h or about 6 h. Optionally, the sintering temperature and sintering time can be within any range defined by any of the above-mentioned values.

In the first coating step, by controlling the sintering temperature and time within the above ranges, the following situations can be avoided: when the sintering temperature in the first coating step is too low and the sintering time is too short, the crystallinity of the first cladding layer is caused to be low and there are many amorphous substances, which will reduce the effect of inhibiting metal dissolution, thereby affecting the cycling performance and high-temperature storage performance of the secondary battery; and when the sintering temperature is too high, impurity phases are caused to appear in the cladding layer, which will also affect the effect of inhibiting metal dissolution, thereby affecting the cycling performance and high-temperature storage performance of the secondary battery; and if the sintering time is too long, the thickness of the first cladding layer will increase, affecting the migration of Lit, and thus affecting the gram capacity and rate performance of the material.

In some embodiments of the first to third aspects, in the second coating step, the source of element X, the phosphorus source and the acid are dissolved in a solvent, stirred and allowed to react for 1-10 h, and then the solution is heated to 60-150° C., and maintained at this temperature for 2-10 h, and/or, the sintering is carried out at 500-700° C. for 6-10 h.

Optionally, in the second coating step, the reaction proceeds sufficiently. Optionally, in the second coating step, the reaction is carried out for about 1.5 h, about 2 h, about 3 h, about 4 h, about 4.5 h, about 5 h, about 6 h, about 7 h, about 8 h, about 9 h, or about 10 h. Optionally, in the second coating step, the reaction time of the reaction may be within any range defined any of the above-mentioned values.

Optionally, in the second coating step, the solution is heated to about 65° C., about 70° C., about about 90° C., about 100° C., about 110° C., about 120° C., about 130° C., about 140° C., or about 150° C., and maintained at this temperature for about 2 h, about 3 h, about 4 h, about 5 h, about 6 h, about 7 h, about 8 h, about 9 h, or about 10 h. Optionally, in the second coating step, the elevated temperature and holding time of the temperature can be within any range defined by any of the above-mentioned values.

In the step of providing the inner core material and the first coating step and the second coating step, before sintering, that is, in the preparation of the chemically reacted inner core material (steps (1)-(2)) and in the preparation of the first cladding layer suspension and the second cladding layer suspension, by selecting appropriate reaction temperature and reaction time as described above, the following situations can be avoided: when the reaction temperature is too low, the reaction fails or the reaction rate is slow; when the temperature is too high, the product is decomposed or forms a heterophase; when the reaction time is too long, the particle size of the product is larger, which may increase the time and difficulty of the subsequent process; and when the reaction time is too short, the reaction is incomplete, and few product is obtained.

Optionally, in the second coating step, the sintering may be carried out at about 550° C., about 600° C., or about 700° C. for about 6 h, about 7 h, about 8 h, about 9 h or about 10 h. Optionally, the sintering temperature and sintering time can be within any range defined by any of the above-mentioned values.

In the second coating step, by controlling the sintering temperature and time within the above ranges, the following situations can be avoided: when the sintering temperature in the second coating step is too low and the sintering time is too short, the crystallinity of the second cladding layer is caused to be low, and there are more amorphous substances, which reduces the effect of reducing the surface reactivity of the material, thereby affecting the cycling performance and high-temperature storage performance of the secondary battery; when the sintering temperature is too high, impurity phases are caused to appear in the second cladding layer, which will also affect the effect of reducing the surface reactivity of the material, thereby affecting the cycling performance and high-temperature storage performance of the secondary battery; when the sintering time is too long, the thickness of the second cladding layer will increase, affecting the voltage plateau of the material, thereby reducing the energy density of the material, etc.

In some embodiments of the first to third aspects, the sintering in the third coating step is performed at 700-800° C. for 6-10 h. Optionally, in the third coating step, the sintering may be sintering at about 700° C., about 750° C., or about 800° C. for about 6 h, about 7 h, about 8 h, about 9 h or about 10 h. Optionally, the sintering temperature and sintering time can be within any range defined by any of the above-mentioned values.

In the third coating step, by controlling the sintering temperature and time within the above ranges, the following situations can be avoided: when the sintering temperature in the third coating step is too low, the third cladding layer may be caused to have a low degree of graphitization, affecting the electrical conductivity, and thus affecting the gram capacity of the material; when the sintering temperature is too high, the third cladding layer may be caused to have a too high degree of graphitization, affecting the transport of $Li^+$ and thus affecting the gram capacity of the material; when the sintering time is too short, the cladding layer is caused to be too thin, affecting the electrical conductivity, and thus affecting the gram capacity of the material; and when the sintering time is too long, the cladding layer is caused to be too thick, affecting the compacted density of the material, etc.

In the above-mentioned first coating step, second coating step and third coating step, the drying is performed at a drying temperature of 100° C. to 200° C., optionally 110° C. to 190° C., and more optionally 120° C. to 180° C., even more optionally at 120° C. to 170° C., and most optionally 120° C. to 160° C., and the drying time is 3-9 h, optionally 4-8 h, more optionally 5-7 h, and most optionally about 6 h.

A secondary battery prepared with the first positive electrode active material prepared by the method for preparing a first positive electrode active material of the present application has a reduced dissolution of Mn and doping element at the position of Mn after cycling, and has improved high-temperature stability, high-temperature cycling performance and rate performance. Furthermore, the raw materials are widely available, the cost is low, and the process is simple, which promote the industrialization.

[Negative Electrode Sheet]

The negative electrode sheet includes a negative electrode current collector and a negative electrode film layer arranged on at least one surface of the negative electrode current collector, wherein the negative electrode film layer includes a negative electrode active material.

As an example, the negative electrode current collector has two opposite surfaces in its own thickness direction, and the negative electrode film layer is provided on either one or both of the two opposite surfaces of the negative electrode current collector.

In some embodiments, the negative electrode current collector can be a metal foil or a composite current collector. For example, a copper foil can be used as the metal foil. The composite current collector may include a high molecular material substrate layer and a metal layer formed on at least one surface of the high molecular material substrate. The composite current collector can be formed by forming a metal material (copper, copper alloy, nickel, nickel alloy, titanium, titanium alloy, silver and silver alloy, etc.) on a high molecular material substrate (such as polypropylene (PP), polyethylene terephthalate (PET), polybutylene terephthalate (PBT), polystyrene (PS), polyethylene (PE)).

In some embodiments, the negative electrode active material may be a negative electrode active material for batteries well known in the art. As an example, the negative electrode active material may include at least one of artificial graphite, natural graphite, soft carbon, hard carbon, a silicon-based material, a tin-based material, lithium titanate, and the like. The silicon-based material may be selected from at least one of monolithic silicon, silicon-oxygen compound, silicon-carbon composite, silicon-nitrogen composite, and silicon alloy. The tin-based material may be selected from at least one of monolithic tin, tin-oxygen compound, and tin alloy. However, the present application is not limited to these materials, and other conventional materials useful as negative electrode active materials for batteries can also be used. These negative electrode active materials may be used alone or in combination of two or more thereof.

In some embodiments, the negative electrode film layer further optionally comprises a binder. As an example, the binder may be selected from at least one of styrene butadiene rubber (SBR), polyacrylic acid (PAA), sodium polyacrylate (PAAS), polyacrylamide (PAM), polyvinyl alcohol (PVA), sodium alginate (SA), polymethacrylic acid (PMAA) and carboxymethyl chitosan (CMCS).

In some embodiments, the negative electrode film layer further optionally comprises a conductive agent. As an example, the conductive agent may be selected from at least one of superconducting carbon, acetylene black, carbon black, Ketjen black, carbon dot, carbon nanotube, graphene, and carbon nanofiber.

In some embodiments, the negative electrode film layer may further optionally comprise other auxiliaries, for example, a thickener (e.g., sodium carboxymethyl cellulose (CMC-Na)) and the like.

In some embodiments, the negative electrode sheet can be prepared by dispersing the components for preparing the negative electrode sheet, for example, the negative electrode active material, the conductive agent, the binder and any other components in a solvent (for example, deionized water) to form a negative electrode slurry; and coating the negative electrode slurry on a negative electrode current collector, followed by oven drying, cold pressing and other procedures, to obtain the negative electrode sheet.

[Electrolyte]

The electrolyte serves to conduct ions between the positive electrode sheet and the negative electrode sheet. The type of the electrolyte is not particularly limited in the present application, and can be selected according to requirements. For example, the electrolyte may be in a liquid state, a gel state, or an all-solid state.

In some embodiments, the electrolyte is in a liquid state, and includes an electrolyte salt and a solvent.

In some embodiments, the electrolyte salt may be selected from at least one of lithium hexafluorophosphate, lithium tetrafluoroborate, lithium perchlorate, lithium hexafluoroarsenate, lithium bis(fluorosulfonyl)imide, lithium bis(trifluoromethanesulfonyl)imide, lithium trifluoromethanesulfonate, lithium difluorophosphate, lithium difluoro(oxalato)borate, lithium bis(oxalate)borate, lithium difluoro bis(oxalato)phosphate, and lithium tetrafluoro(oxalato) phosphate.

In some embodiments, the solvent may be selected from at least one of ethylene carbonate, propylene carbonate, ethyl methyl carbonate, diethyl carbonate, dimethyl carbonate, dipropyl carbonate, methyl propyl carbonate, ethyl propyl carbonate, butylene carbonate, fluoroethylene carbonate, methyl formate, methyl acetate, ethyl acetate, propyl acetate, methyl propionate, ethyl propionate, propyl propionate, methyl butyrate, ethyl butyrate, 1,4-butyrolactone, sulfolane, methylsulfonylmethane, ethyl methyl sulfone, and ethylsulfonylethane.

In some embodiments, the electrolyte solution further optionally comprises an additive. As an example, the additive may include a negative electrode film-forming additive, a positive electrode film-forming additive, and also an additive capable of improving certain properties of the battery, such as an additive for improving the overcharge performance of the battery, and an additive for improving the high-temperature or low-temperature performance of the battery.

[Separator]

In some embodiments, the secondary battery also comprises a separator. The type of the separator is not particularly limited in the present application, and any well-known separator with a porous structure having good chemical stability and mechanical stability may be selected.

In some embodiments, the material of the separator may be selected from at least one of glass fiber, non-woven cloth, polyethylene, polypropylene, and polyvinylidene fluoride. The separator may be a single-layer film or a multi-layer composite film, and is not particularly limited. When the separator is a multi-layer composite film, the material of each layer may be the same or different, which is not particularly limited.

In some embodiments, the positive electrode sheet, the negative electrode sheet, and the separator can be made into an electrode assembly by a winding process or a stacking process.

In some embodiments, the secondary battery may include an outer package. The outer package can be used to encapsulate the above-mentioned electrode assembly and electrolyte.

In some embodiments, the outer package of the secondary battery may be a hard case, such as a hard plastic case, an aluminum case, a steel case, and the like. The outer package of the secondary battery may also be a soft pack, such as a bag-type soft pack. The material of the soft pack may be a plastic, and examples of the plastic include polypropylene, polybutylene terephthalate and polybutylene succinate, etc.

Figure 2:
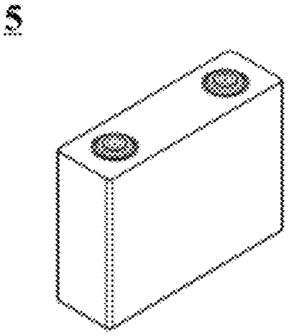
FIG. 2 is a schematic diagram of a secondary battery according to an embodiment of the present application.

The present application has no particular limitation on the shape of the secondary battery, which can be cylindrical, square or any other shape. For example, FIG. 2 shows an example of a secondary battery 5 having a square structure.

Figure 3:
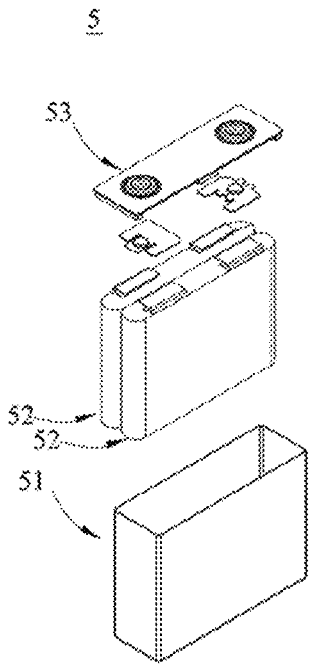
FIG. 3 is an exploded view of the secondary battery according to an embodiment of the present application shown in FIG. 2.

In some embodiments, referring to FIG. 3, the outer package may include a case 51 and a cover plate 53. Here, the case 51 can include a bottom plate and a side plate connected to the bottom plate, with the bottom plate and the side plate enclosing to form an accommodating cavity. The case 51 has an opening in communication with the accommodating cavity, and the cover plate 53 can cover the opening to close the accommodating cavity. The positive electrode sheet, the negative electrode sheet, and the separator may be formed into an electrode assembly 52 by a winding process or a stacking process. The electrode assembly 52 is encapsulated within the accommodating cavity. The electrolyte solution impregnates the electrode assembly 52. The number of electrode assemblies 52 comprised in the secondary battery 5 may be one or more, which can be selected by those skilled in the art according to specific actual requirements.

In some embodiments, the secondary batteries may be assembled into a battery module, and the number of the secondary batteries included in the battery module may be one or more, and the specific number may be selected by those skilled in the art according to the application and capacity of the battery module.

Figure 4:
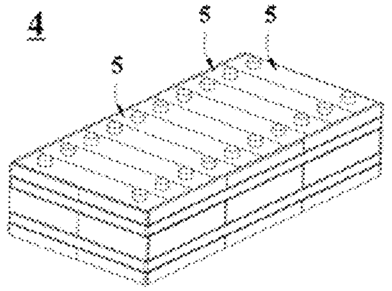
FIG. 4 is a schematic diagram of a battery module according to an embodiment of the present application.

FIG. 4 shows a battery module 4 as an example. Referring to FIG. 4, in the battery module 4, multiple secondary batteries 5 may be sequentially arranged along a length direction of the battery module 4. Of course, they can be arranged in any other way. The plurality of secondary batteries 5 may further be fixed by fasteners.

Optionally, the battery module 4 can further include a case having an accommodating space, in which the plurality of secondary batteries 5 are accommodated.

In some embodiments, the battery module may further be assembled into a battery pack, the number of battery module contained in the battery pack may be one or more, and the specific number can be selected by those skilled in the art according to the use and capacity of the battery pack.

Figure 5:
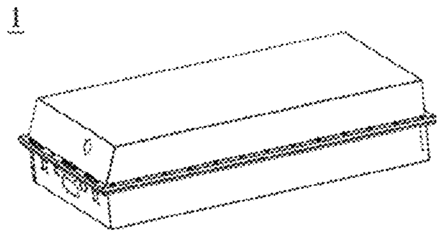
FIG. 5 is a schematic diagram of a battery pack according to an embodiment of the present application.
Figure 6:
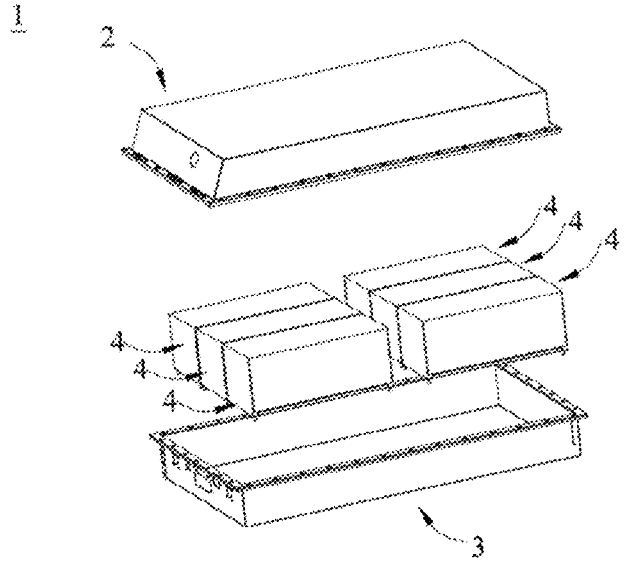
FIG. 6 is an exploded view of the battery pack according to an embodiment of the present application shown in FIG. 5.

FIGS. 5 and 6 show a battery pack 1 as an example. Referring to FIGS. 5 and 6, the battery pack 1 may include a battery box and multiple battery modules 4 disposed in the battery box. The battery box includes an upper box body 2 and a lower box body 3, where the upper box body 2 can cover the lower box body 3 and forms an enclosed space for accommodating the battery module 4. The plurality of battery modules 4 may be arranged in the battery box in any manner.

In addition, the present application further provides an electrical apparatus comprising at least one of the secondary battery, the battery module, or the battery pack provided in the present application. The secondary battery, the battery module, or the battery pack can be used as a power source for the electrical apparatus, and can also be used as an energy storage unit for the electrical apparatus. The electrical apparatus may include, but is not limited to, a mobile device (such as a mobile phone, and a laptop, etc.), an electric vehicle (such as an all-electric vehicle, a hybrid electric vehicle, a plug-in hybrid electric vehicle, an electric bicycle, an electric scooter, an electric golf cart, and an electric truck, etc.), an electric train, a ship, a satellite, an energy storage system, etc.

For the electrical apparatus, the secondary battery, the battery module, or the battery pack can be selected according to its use requirements.

Figure 7:
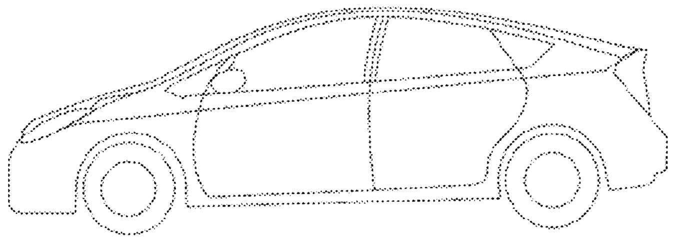
FIG. 7 is a schematic view of an electrical apparatus using a secondary battery as a power source according to an embodiment of the present application.
Figure 8:
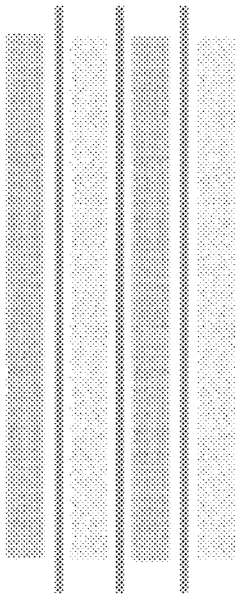
FIG. 8 is a schematic structural view of a battery prepared using a positive electrode sheet P1 of the present application.
Figure 9:
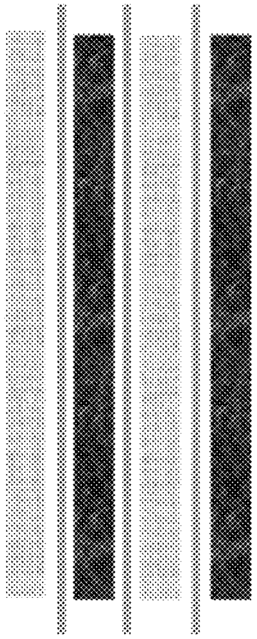
FIG. 9 is a schematic structural view of a battery prepared using a positive electrode sheet P2 of the present application.
Figure 10:
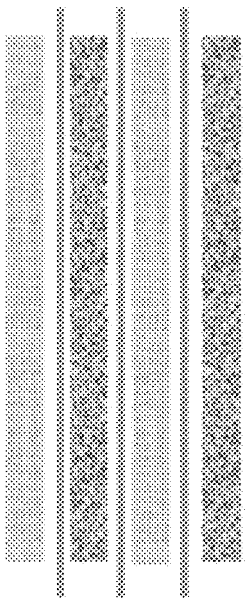
FIG. 10 is a schematic structural view of a battery prepared using a positive electrode sheet P3 of the present application.
Figure 11:
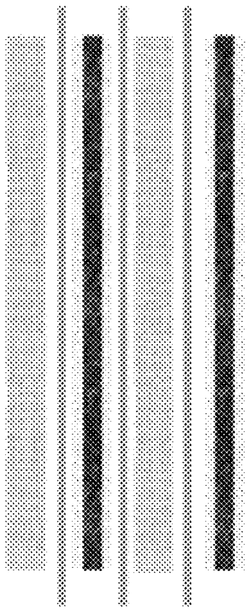
FIG. 11 is a schematic structural view of a battery prepared using a positive electrode sheet P8 of the present application.
Figure 12:
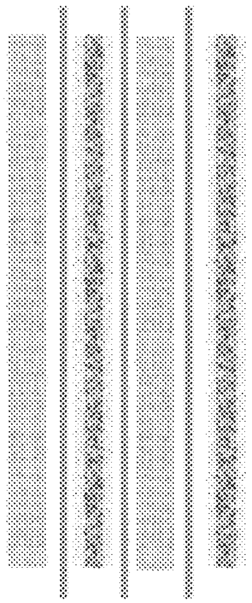
FIG. 12 is a schematic structural view of a battery prepared using a positive electrode sheet P10 of the present application.
Figure 13:
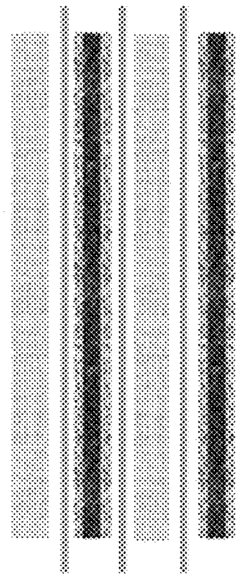
FIG. 13 is a schematic structural view of a battery prepared using a positive electrode sheet P11 of the present application.
Figure 14:
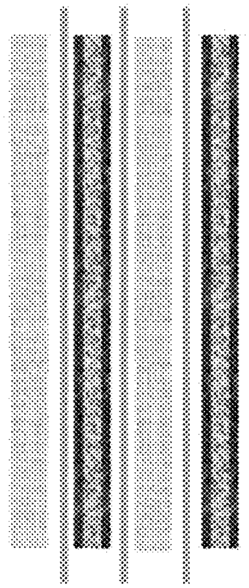
FIG. 14 is a schematic structural view of a battery prepared using a positive electrode sheet P12 of the present application.
Figure 15:
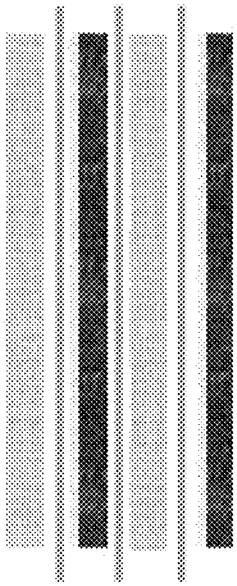
FIG. 15 is a schematic structural view of a battery prepared using a positive electrode sheet P17 of the present application.
Figure 16:
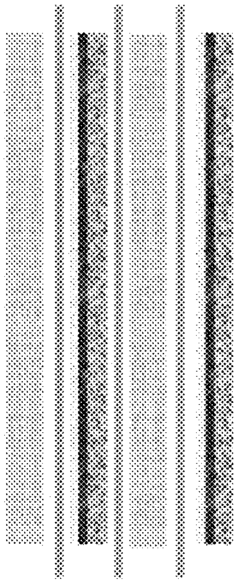
FIG. 16 is a schematic structural view of a battery prepared using a positive electrode sheet P18 of the present application.
Figure 17:
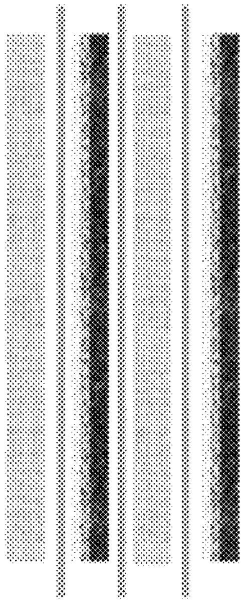
FIG. 17 is a schematic structural view of a battery prepared using a positive electrode sheet P23 of the present application.
Figure 18:
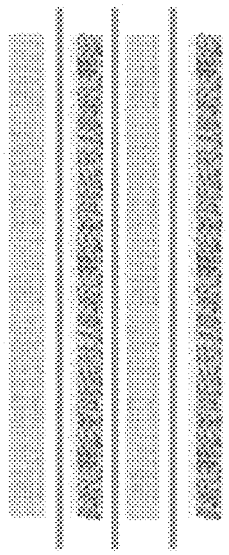
FIG. 18 is a schematic structural view of a battery prepared using a positive electrode sheet P24 of the present application.
Figure 19:
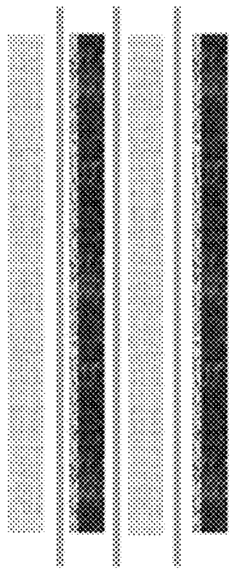
FIG. 19 is a schematic structural view of a battery prepared using a positive electrode sheet P26 of the present application.
Figure 20:
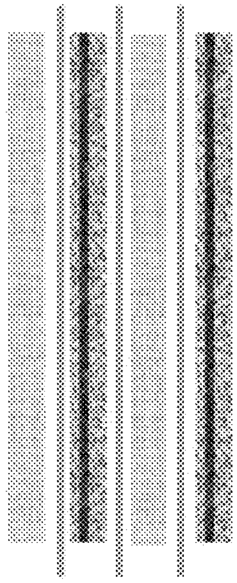
FIG. 20 is a schematic structural view of a battery prepared using a positive electrode sheet P27 of the present application.

FIG. 7 shows a electrical apparatus as an example. The electrical apparatus is an all-electric vehicle, a hybrid electric vehicle, or a plug-in hybrid electric vehicle, etc. In order to meet the requirements of the electrical apparatus for high power and high energy density of secondary batteries, a battery pack or a battery module may be used.

Preparation Embodiments

Preparation Embodiments of the present application will be described hereinafter. The preparation Embodiments described below are exemplary and only used to explain the present application, and are not to be construed as limiting the present application. Where specific techniques or conditions are not specified in the preparation Embodiments, the techniques or conditions described in the literatures of the art or the product specifications are followed. All of the used agents or instruments which are not specified with the manufacturer are conventional commercially-available products.

The raw material sources involved in the preparation Embodiments of the present application are as follows:

| Name | Chemical formula | Manufacturer | Specification |
|---|---|---|---|
| Manganese carbonate | $MnCO_3$ | Shandong West Asia Chemical Industry Co., Ltd. | 1 Kg |
| Lithium carbonate | $Li_2CO_3$ | Shandong West Asia Chemical Industry Co., Ltd. | 1 Kg |
| Magnesium carbonate | $MgCO_3$ | Shandong West Asia Chemical Industry Co., Ltd. | 1 Kg |
| Zinc carbonate | $ZnCO_3$ | Wuhan Xinru Chemical Co., Ltd. | 25 Kg |
| Ferrous Carbonate | $FeCO_3$ | Xi'an Lanzhiguang Fine Materials Co., Ltd. | 1 Kg |
| Nickel sulfate | $NiCO_3$ | Shandong West Asia Chemical Industry Co., Ltd. | 1 Kg |
| Titanium sulfate | $Ti(SO_4)_2$ | Shandong West Asia Chemical Industry Co., Ltd. | 1 Kg |
| Cobalt sulfate | $CoSO_4$ | Xiamen Zhixin Chemical Co., Ltd. | 500 g |
| Vanadium dichloride | $VCl_2$ | Shanghai Jinjinle Industrial Co., Ltd. | 1 Kg |
| Oxalic acid dihydrate | $C_2H_2O_4.2(H_2O)$ | Shanghai Jinjinle Industrial Co., Ltd. | 1 Kg |
| Ammonium dihydrogen phosphate | $NH_4H_2PO_4$ | Shanghai Chengshao Biotechnology Co., Ltd. | 500 g |
| Sucrose | $C_{12}H_{22}O_{11}$ | Shanghai Yuanye BioTechnology Co., Ltd | 100 g |
| Dilute sulfuric acid | $H_2SO_4$ | Shenzhen Hisian Biotechnology Co., Ltd. | Mass fraction 60% |
| Dilute nitric acid | $HNO_3$ | Anhui Lingtian Fine Chemical Co., Ltd. | Mass fraction 60% |
| Metasilicic acid | $H_2SiO_3$ | Shanghai Yuanye BioTechnology Co., Ltd | 100 g, mass fraction 99.8% |

Preparation of Positive Electrode Active Material and Slurry Thereof

Preparation Embodiment 1

Step S1: Preparation of Fe, Co, V and S Co-Doped Manganese Oxalate 689.6 g of manganese carbonate, 455.27 g of ferrous carbonate, 4.65 g of cobalt sulfate, and 4.87 g of vanadium dichloride were added to a mixer and mixed thoroughly for 6 h. Then, the resulting mixture was transferred into a reactor, 5 L of deionized water and 1260.6 g of oxalic acid dihydrate were added, the mixture was heated to 80° C., sufficiently stirred at 500 rpm for 6 h, and well mixed until the reaction ended and no air bubbles were generated, to obtain a Fe, Co, and V co-doped manganese oxalate suspension. Then the suspension was filtered, oven dried at 120° C., and then sanded to obtain manganese oxalate particles with a particle size of 100 nm.

Step S2: Preparation of Inner Core $Li_{0.997}Mn_{0.60}Fe_{0.393}V_{0.004}Co_{0.003}P_{0.997}S_{0.003}O_4$ 1793.1 g of manganese oxalate prepared in (1), 368.3 g of lithium carbonate, 1146.6 g of ammonium dihydrogen phosphate and 4.9 g of dilute sulfuric acid were added to 20 L of deionized water, sufficiently stirred, uniformly mixed and allowed to react at 80° C. for 10 h, to obtain a slurry. The slurry was transferred to a spray dryer for spray drying and granulation, and dried at a temperature of 250° C. to obtain a powder. Under a protective atmosphere (90% nitrogen and 10% hydrogen), the powder was sintered in a roller kiln at 700° C. for 4 h to obtain the inner core material. Inductively coupled plasma emission spectroscopy (ICP) was used to detect the element contents of the inner core material, and the chemical formula of the inner core as shown above was obtained.

Step S3: Preparation of First Cladding Layer Suspension

Preparation of a $Li_2FeP_2O_7$ solution: 7.4 g of lithium carbonate, 11.6 g of ferrous carbonate, 23.0 g of ammonium dihydrogen phosphate and 12.6 g of oxalic acid dihydrate were dissolved in 500 mL of deionized water, adjusted to pH of 5, then stirred and allowed to react at room temperature for 2 h to obtain a solution. Then the solution was heated to 80° C. and maintained at this temperature for 4 h to obtain a first cladding layer suspension.

Step S4: Coating of the First Cladding Layer 1571.9 g of the doped lithium manganese phosphate inner core material obtained in step S2 was added to the first cladding layer suspension obtained in step S3 (the content of the cladding substance was 15.7 g), and sufficiently stirred and mixed for 6 h. After mixing evenly, the mixture was transferred to and dried in an oven at 120° C. for 6 h, and then sintered at 650° C. for 6 h to obtain a pyrophosphate-coated material.

Step S5: Preparation of Second Cladding Layer Suspension 3.7 g of lithium carbonate, 11.6 g of ferrous carbonate, 11.5 g of ammonium dihydrogen phosphate, and 12.6 g of oxalic acid dihydrate were dissolved in 1500 mL of deionized water, and then stirred and allowed to react for 6 h to obtain a solution. Then, the solution was heated to 120° C. and maintained at this temperature for 6 h to obtain a second cladding layer suspension.

Step S6: Coating of the Second Cladding Layer 1586.8 g of the pyrophosphate-coated material obtained in step S4 was added to the second cladding layer suspension obtained in step S5 (the content of the cladding substance was 47.1 g), sufficiently stirred and mixed for 6 h. After mixing well, it was transferred to and dried in an oven at 120° C. for 6 h, and then sintered at 700° C. for 8 h to obtain a material with two cladding layers.

Step S7: Preparation of Third Cladding Layer Aqueous Solution 37.3 g of sucrose was dissolved in 500 g of deionized water, and then stirred and fully dissolved to obtain an aqueous solution of sucrose.

Step S8: Coating of the Third Cladding Layer 1633.9 g of the material with two cladding layers obtained in step S6 was added to the sucrose solution obtained in step S7, stirred and mixed together for 6 h. After mixing uniformly, it was transferred to and dried in an oven at 150° C. for 6 h, and then sintered at 700° C. for 10 h to obtain a material with three cladding layers.

Preparation Embodiments 2 to 42 and Comparative Embodiments 1 to 17

The positive electrode active materials of Preparation Embodiments 2 to 42 and Comparative Embodiments 1 to 17 were prepared by a method similar to that of Preparation Embodiment 1, and the differences in the preparation of the positive electrode active materials are shown in Tables 1-6.

Among them, Comparative Embodiments 1-2, 4-10 and 12 did not have the first cladding layer, so there were no steps S3-S4; Comparative Embodiments 1-11 did not have the second cladding layer, so there were no steps S5-S6.

TABLE 1

Preparation of Fe, Co, V and S co-doped manganese oxalate and preparation of the inner core (steps S1-S2)

| No. | Inner core chemical formula* | Raw materials used in step S1 | Raw materials used in step S2 |
|---|---|---|---|
| Comparative Embodiment 1 and Comparative Embodiment 13 | $LiMnPO_4$ | Manganese carbonate, 1149.3 g; water, 5 L; oxalic acid dihydrate, 1260.6 g; | Manganese oxalate dihydrate obtained in step S1 (based on $C_2O_4Mn•2H_2O$), 1789.6 g; lithium carbonate, 369.4 g; ammonium dihydrogen phosphate, 1150.1 g; water, 20 L |
| Comparative Embodiment 2 | $LiMn_{0.60}Fe_{0.40}PO_4$ | Manganese carbonate, 689.6 g; ferrous carbonate, 463.4 g; water, 5 L; oxalic acid dihydrate, 1260.6 g; | Ferromanganese oxalate dihydrate obtained in step S1 (based on $C_2O_4Mn_{0.60}Fe_{0.40}•2H_2O$), 1793.2 g; lithium carbonate, 369.4 g; ammonium dihydrogen phosphate, 1150.1 g; water, 20 L |
| Comparative Embodiment 3 | $LiMn_{0.80}Fe_{0.20}PO_4$ | Manganese carbonate, 919.4 g; ferrous carbonate, 231.7 g; water, 5 L; oxalic acid dihydrate, 1260.6 g | Ferromanganese oxalate dihydrate obtained in step S1 (based on $C_2O_4Mn_{0.80}Fe_{0.20}•2H_2O$), 1791.4 g; lithium carbonate, 369.4 g; ammonium dihydrogen phosphate, 1150.1 g; water, 20 L |
| Comparative Embodiment 4 | $LiMn_{0.70}Fe_{0.295}V_{0.005}PO_4$ | Manganese carbonate, 804.5 g; ferrous carbonate, 341.8 g; vanadium dichloride, 6.1 g; water, 5 L; oxalic acid dihydrate, 1260.6 g; | Manganese iron vanadium oxalate dihydrate obtained in step S1 (based on $C_2O_4Mn_{0.70}Fe_{0.295}V_{0.005}•2H_2O$), 1792.0 g; lithium carbonate, 369.4 g; ammonium dihydrogen phosphate, 1150.1 g; water, 20 L |
| Comparative Embodiment 5 and Comparative Embodiment 15 | $LiMn_{0.60}Fe_{0.395}Mg_{0.005}PO_4$ | Manganese carbonate, 689.6 g; ferrous carbonate, 457.6 g; magnesium carbonate, 4.2 g; water, 5 L; oxalic acid dihydrate, 1260.6 g; | Manganese iron magnesium oxalate dihydrate obtained in step S1 (based on $C_2O_4Mn_{0.60}Fe_{0.395}Mg_{0.005}•2H_2O$), 1791.6 g; lithium carbonate, 369.4 g; ammonium dihydrogen phosphate, 1150.1 g; water, 20 L |
| Comparative Embodiment 6 | $LiMn_{0.60}Fe_{0.35}Ni_{0.05}PO_4$ | Manganese carbonate, 689.6 g; ferrous carbonate, 405.4 g; nickel carbonate, 59.3 g; water, 5 L; oxalic acid dihydrate, 1260.6 g; | Manganese iron nickel oxalate dihydrate obtained in step S1 (based on $C_2O_4Mn_{0.60}Fe_{0.35}Ni_{0.05}•2H_2O$), 1794.6 g; lithium carbonate, 369.4 g; ammonium dihydrogen phosphate, 1150.1 g; water, 20 L |
| Comparative Embodiment 7 and Comparative Embodiment 9 | $LiMn_{0.60}Fe_{0.395}V_{0.002}Ni_{0.003}PO_4$ | Manganese carbonate, 689.6 g; ferrous carbonate, 457.6 g; vanadium dichloride, 2.4 g; nickel carbonate, 3.6 g; water, 5 L; oxalic acid | Manganese iron vanadium nickel oxalate dihydrate obtained in step S1 (based on $C_2O_4Mn_{0.60}Fe_{0.395}V_{0.002}Ni_{0.003}•2H_2O$), 1793.2 g; lithium carbonate, |

TABLE 1-continued

| Preparation of Fe, Co, V and S co-doped manganese oxalate and preparation of the inner core (steps S1-S2) | | | |
|---|---|---|---|
| No. | Inner core chemical formula* | Raw materials used in step S1 | Raw materials used in step S2 |
| | | dihydrate, 1260.6 g | 369.4 g; ammonium dihydrogen phosphate, 1150.1 g; water, 20 L |
| Comparative Embodiment 8 | $LiMn_{0.60}Fe_{0.395}V_{0.002}Mg_{0.003}PO_4$ | Manganese carbonate, 689.6 g; ferrous carbonate, 457.6 g; vanadium dichloride, 2.4 g; magnesium carbonate, 2.53 g; water, 5 L; oxalic acid dihydrate, 1260.6 g | Manganese iron vanadium magnesium oxalate dihydrate obtained in step S1 (based on $C_2O_4Mn_{0.60}Fe_{0.395}V_{0.002}Mg_{0.003}•2H_2O$), 1792.1 g; lithium carbonate, 369.4 g; ammonium dihydrogen phosphate, 1150.1 g; water, 20 L |
| Comparative Embodiments 10-12, Comparative Embodiments 16-17 and Preparation Embodiments 1-10 | $Li_{0.997}Mn_{0.60}Fe_{0.393}V_{0.004}Co_{0.003}P_{0.997}S_{0.003}O_4$ | Manganese carbonate, 689.6 g; ferrous carbonate, 455.3 g; cobalt sulfate, 4.7 g; vanadium dichloride, 4.9 g; water, 5 L; oxalic acid dihydrate, 1260.6 g; | Manganese iron vanadium cobalt oxalate dihydrate obtained in step S1 (based on $C_2O_4Mn_{0.60}Fe_{0.393}V_{0.004}Co_{0.003}•2H_2O$), 1793.1 g; lithium carbonate, 368.3 g; ammonium dihydrogen phosphate, 1146.6 g; dilute sulfuric acid, 4.9 g; water, 20 L |
| Comparative Embodiment 14 | $Li_{1.2}MnP_{0.8}Si_{0.2}O_4$ | Manganese carbonate, 1149.3 g; water, 5 L; oxalic acid dihydrate, 1260.6 g; | Manganese oxalate dihydrate obtained in step S1 (based on $C_2O_4Mn•2H_2O$), 1789.6 g; lithium carbonate, 443.3 g; ammonium dihydrogen phosphate, 920.1 g; metasilicic acid, 156.2 g; water, 20 L |
| Preparation Embodiment 11 | $Li_{1.001}Mn_{0.60}Fe_{0.393}V_{0.004}Co_{0.003}P_{0.999}Si_{0.001}O_4$ | Manganese carbonate, 689.6 g; ferrous carbonate, 455.3 g; cobalt sulfate, 4.7 g; vanadium dichloride, 4.9 g; water, 5 L; oxalic acid dihydrate, 1260.6 g; | Manganese iron vanadium cobalt oxalate dihydrate obtained in step S1 (based on $C_2O_4Mn_{0.60}Fe_{0.393}V_{0.004}Co_{0.003}•2H_2O$), 1793.1 g; lithium carbonate, 369.8 g; ammonium dihydrogen phosphate, 1148.9 g; metasilicic acid, 0.8 g; water, 20 L |
| Preparation Embodiment 12 | $LiMn_{0.60}Fe_{0.393}V_{0.004}Co_{0.003}P_{0.998}N_{0.002}O_4$ | Manganese carbonate, 689.6 g; ferrous carbonate, 455.3 g; cobalt sulfate, 4.7 g; vanadium dichloride, 4.9 g; water, 5 L; oxalic acid dihydrate, 1260.6 g; | Manganese iron vanadium cobalt oxalate dihydrate obtained in step S1 (based on $C_2O_4Mn_{0.60}Fe_{0.393}V_{0.004}Co_{0.003}•2H_2O$), 1793.1 g; lithium carbonate, 369.4 g; ammonium dihydrogen phosphate, 1147.8 g; dilute nitric acid, 2.7 g; water, 20 L |
| Preparation Embodiment 13 | $Li_{0.995}Mn_{0.65}Fe_{0.341}V_{0.004}Co_{0.005}P_{0.995}S_{0.005}O_4$ | Manganese carbonate, 747.1 g; ferrous carbonate, 395.1 g; cobalt sulfate, 7.8 g; vanadium dichloride, 4.9 g; water, 5 L; oxalic acid dihydrate, 1260.6 g; | Manganese iron vanadium cobalt oxalate dihydrate obtained in step S1 (based on $C_2O_4Mn_{0.65}Fe_{0.341}V_{0.004}Co_{0.005}•2H_2O$), 1792.7 g; lithium carbonate, 367.6 g; ammonium dihydrogen phosphate, 1144.3 g; dilute sulfuric acid, 8.2 g; water, 20 L |
| Preparation Embodiment 14 | $Li_{1.002}Mn_{0.70}Fe_{0.293}V_{0.004}Co_{0.003}P_{0.998}Si_{0.002}O_4$ | Manganese carbonate, 804.6 g; ferrous carbonate, 339.5 g; cobalt sulfate, 4.7 g; vanadium dichloride, 4.9 g; water, 5 L; oxalic acid dihydrate, 1260.6 g; | Manganese iron vanadium cobalt oxalate dihydrate obtained in step S1 (based on $C_2O_4Mn_{0.70}Fe_{0.293}V_{0.004}Co_{0.003}•2H_2O$), 1792.2 g; lithium carbonate, 370.2 g; 1147.8; metasilicic acid, 1.6 g; water, 20 L |
| Preparation Embodiments 15, 17 | $LiMn_{0.60}Fe_{0.393}V_{0.004}Co_{0.003}P_{0.999}N_{0.001}O_4$ | Manganese carbonate, 689.6 g; ferrous carbonate, 455.3 g; cobalt sulfate, 4.7 g; vanadium dichloride, 4.9 g; water, 5 L; oxalic acid dihydrate, 1260.6 g; | Manganese iron vanadium cobalt oxalate dihydrate obtained in step S1 (based on $C_2O_4Mn_{0.60}Fe_{0.393}V_{0.004}Co_{0.003}•2H_2O$), 1793.1 g; lithium carbonate, 369.4 g; ammonium dihydrogen phosphate, 1148.9 g; dilute nitric acid, 1.4 g; water, 20 L |
| Preparation Embodiment 16 | $Li_{0.997}Mn_{0.60}Fe_{0.393}V_{0.004}Co_{0.003}P_{0.997}S_{0.003}O_4$ | Manganese carbonate, 689.6 g; ferrous carbonate, 455.3 g; cobalt sulfate, 4.7 g; vanadium dichloride, 4.9 g; water, 5 L; oxalic acid dihydrate, 1260.6 g; | Manganese iron vanadium cobalt oxalate dihydrate obtained in step S1 (based on $C_2O_4Mn_{0.60}Fe_{0.393}V_{0.004}Co_{0.003}•2H_2O$), 1793.1 g; lithium carbonate, 368.7 g; ammonium dihydrogen phosphate, 1146.6 g; dilute sulfuric acid, 4.9 g; water, 20 L |
| Preparation Embodiment 18 | $LiMn_{0.60}Fe_{0.393}V_{0.004}Mg_{0.003}P_{0.995}N_{0.005}O_4$ | Manganese carbonate, 689.6 g; ferrous carbonate, 455.3 g; magnesium carbonate, 2.5 g; | Manganese iron vanadium magnesium oxalate dihydrate obtained in step S1 (based on |

TABLE 1-continued

| Preparation of Fe, Co, V and S co-doped manganese oxalate and preparation of the inner core (steps S1-S2) | | | |
|---|---|---|---|
| No. | Inner core chemical formula* | Raw materials used in step S1 | Raw materials used in step S2 |
| | | vanadium dichloride, 4.9 g; water, 5 L; oxalic acid dihydrate, 1260.6 g; | $C_2O_4Mn_{0.60}Fe_{0.393}V_{0.004}Mg_{0.003}$•$2H_2O$), 1791.1 g; lithium carbonate, 369.4 g; ammonium dihydrogen phosphate, 1144.3 g; dilute nitric acid, 7.0 g; water, 20 L |
| Preparation Embodiment 19 | $Li_{0.999}Mn_{0.60}Fe_{0.393}V_{0.004}Mg_{0.003}P_{0.999}S_{0.001}O_4$ | Manganese carbonate, 689.6 g; ferrous carbonate, 455.3 g; magnesium carbonate, 2.5 g; vanadium dichloride, 4.9 g; water, 5 L; oxalic acid dihydrate, 1260.6 g; | Manganese iron vanadium magnesium oxalate dihydrate obtained in step S1 (based on $C_2O_4Mn_{0.60}Fe_{0.393}V_{0.004}Mg_{0.003}$•$2H_2O$), 1791.1 g; lithium carbonate, 369.0 g; ammonium dihydrogen phosphate, 1148.9 g; dilute sulfuric acid, 1.6 g; water, 20 L |
| Preparation Embodiment 20 | $Li_{0.998}Mn_{0.60}Fe_{0.393}V_{0.004}Ni_{0.003}P_{0.998}S_{0.002}O_4$ | Manganese carbonate, 689.6 g; ferrous carbonate, 455.3 g; nickel carbonate, 3.6 g; vanadium dichloride, 4.9 g; water, 5 L; oxalic acid dihydrate, 1260.6 g; | Manganese iron vanadium nickel oxalate dihydrate obtained in step S1 (based on $C_2O_4Mn_{0.60}Fe_{0.393}V_{0.004}Ni_{0.003}$•$2H_2O$), 1792.2 g; lithium carbonate, 368.7 g; ammonium dihydrogen phosphate, 1147.8 g; dilute sulfuric acid, 3.2 g; water, 20 L |
| Preparation Embodiments 21-24 | $Li_{1.001}Mn_{0.60}Fe_{0.393}V_{0.004}Ni_{0.003}P_{0.999}Si_{0.001}O_4$ | Manganese carbonate, 689.6 g; ferrous carbonate, 455.3 g; nickel carbonate, 3.6 g; vanadium dichloride, 4.9 g; water, 5 L; oxalic acid dihydrate, 1260.6 g; | Manganese iron vanadium nickel oxalate dihydrate obtained in step S1 (based on $C_2O_4Mn_{0.60}Fe_{0.393}V_{0.004}Ni_{0.003}$•$2H_2O$), 1793.1 g; lithium carbonate, 369.8 g; ammonium dihydrogen phosphate, 1148.9 g; metasilicic acid, 0.8 g; water, 20 L |
| Preparation Embodiment 25 | $Li_{1.001}Mn_{0.50}Fe_{0.493}V_{0.004}Ni_{0.003}P_{0.999}Si_{0.001}O_4$ | Manganese carbonate, 574.7 g; ferrous carbonate, 571.2 g; nickel carbonate, 3.6 g; vanadium dichloride, 4.9 g; water, 5 L; oxalic acid dihydrate, 1260.6 g; | Manganese iron vanadium nickel oxalate dihydrate obtained in step S1 (based on $C_2O_4Mn_{0.50}Fe_{0.493}V_{0.004}Ni_{0.003}$•$2H_2O$), 1794.0 g; lithium carbonate, 369.8 g; ammonium dihydrogen phosphate, 1148.9 g; metasilicic acid, 0.8 g; water, 20 L |
| Preparation Embodiment 26 | $Li_{1.001}Mn_{0.999}Fe_{0.001}P_{0.999}Si_{0.001}O_4$ | Manganese carbonate, 1148.2 g; ferrous carbonate, 1.2 g; water, 5 L; oxalic acid dihydrate, 1260.6 g | Ferromanganese oxalate dihydrate obtained in step S1 (based on $C_2O_4Mn_{0.999}Fe_{0.001}$•$2H_2O$), 1789.6 g; lithium carbonate, 369.8 g; ammonium dihydrogen phosphate, 1148.9 g; metasilicic acid, 0.8 g; water, 20 L |
| Preparation Embodiment 27 | $LiMn_{0.60}Fe_{0.393}V_{0.004}Ni_{0.003}P_{0.9}N_{0.100}O_4$ | Manganese carbonate, 689.6 g; ferrous carbonate, 455.3 g; nickel carbonate, 3.6 g; vanadium dichloride, 4.9 g; water, 5 L; oxalic acid dihydrate, 1260.6 g; | Manganese iron vanadium nickel oxalate dihydrate obtained in step S1 (based on $C_2O_4Mn_{0.60}Fe_{0.393}V_{0.004}Ni_{0.003}$•$2H_2O$), 1793.1 g; lithium carbonate, 369.4 g; ammonium dihydrogen phosphate, 1035.1 g; dilute nitric acid, 140.0 g; water, 20 L |
| Preparation Embodiment 28 | $Li_{1.001}Mn_{0.40}Fe_{0.593}V_{0.004}Ni_{0.003}P_{0.999}Si_{0.001}O_4$ | Manganese carbonate, 459.7 g; ferrous carbonate, 686.9 g; vanadium dichloride, 4.8 g; nickel carbonate, 3.6 g; water, 5 L; oxalic acid dihydrate, 1260.6 g | Manganese iron vanadium nickel oxalate dihydrate obtained in step S1 (based on $C_2O_4Mn_{0.40}Fe_{0.593}V_{0.004}Ni_{0.003}$•$2H_2O$), 1794.9 g; lithium carbonate, 369.8 g; ammonium dihydrogen phosphate, 1148.9 g; metasilicic acid, 0.8 g; water, 20 L |
| Preparation Embodiment 29 | $Li_{1.001}Mn_{0.40}Fe_{0.393}V_{0.204}Ni_{0.003}P_{0.999}Si_{0.001}O_4$ | Manganese carbonate, 459.7 g; ferrous carbonate, 455.2 g; vanadium dichloride, 248.6 g; nickel carbonate, 3.6 g; water, 5 L; oxalic acid dihydrate, 1260.6 g | Manganese iron vanadium nickel oxalate dihydrate obtained in Step S1 (based on $C_2O_4Mn_{0.40}Fe_{0.393}V_{0.204}Ni_{0.003}$•$2H_2O$), 1785.1 g; lithium carbonate, 369.8 g; ammonium dihydrogen phosphate, 1148.9 g; metasilicic acid, 0.8 g; water, 20 L |

*For the determination method, please refer to the "Performance Test of Positive Electrode Active Materials" section below.

TABLE 2

| Preparation of first cladding layer suspension (step S3) | | |
|---|---|---|
| No. | Cladding material of first cladding layer* | Preparation of first cladding layer suspension |
| Comparative Embodiments 3 and 16 | Amorphous $Li_2FeP_2O_7$ | 7.4 g lithium carbonate; 11.6 g ferrous carbonate; 23.0 g ammonium dihydrogen phosphate; 12.6 g oxalic acid dihydrate; pH controlled at 5 |
| Comparative Embodiments11, 13-15, 17 and Prepareation Embodiments 1-14, 19, 21-29 | Crystalline $Li_2FeP_2O_7$ | 7.4 g lithium carbonate; 11.6 g ferrous carbonate; 23.0 g ammonium dihydrogen phosphate; 12.6 g oxalic acid dihydrate; pH controlled at 5 |
| Preparation Embodiments 15-16 | Crystalline $Al_4(P_2O_7)_3$ | 53.3 g aluminum chloride; 34.5 g ammonium dihydrogen phosphate; 18.9 g oxalic acid dihydrate; pH controlled at 4 |
| Preparation Embodiments 17-18, 20 | Crystalline $Li_2NiP_2O_7$ | 7.4 g lithium carbonate; 11.9 g nickel carbonate; 23.0 g ammonium dihydrogen phosphate; 12.6 g oxalic acid dihydrate; pH controlled at 5 |
| Preparation Embodiment 30 | $Li_2MgP_2O_7$ | 7.4 g lithium carbonate; 8.4 g magnesium carbonate, 23.0 g ammonium dihydrogen phosphate, 12.6 g oxalic acid dihydrate |
| Preparation Embodiment 31 | $Li_2CoP_2O_7$ | 7.4 g lithium carbonate, 15.5 g cobalt sulfate; 23.0 g ammonium dihydrogen phosphate; 12.6 g oxalic acid dihydrate |
| Preparation Embodiment 32 | $Li_2CuP_2O_7$ | 7.4 g lithium carbonate, 16.0 g copper sulfate, 23.0 g ammonium dihydrogen phosphate, 12.6 g oxalic acid dihydrate |
| Preparation Embodiment 33 | $Li_2ZnP_2O_7$ | 7.4 g lithium carbonate, 12.5 g zinc carbonate, 23.0 g ammonium dihydrogen phosphate, 12.6 g oxalic acid dihydrate |
| Preparation Embodiment 34 | $TiP_2O_7$ | 24.0 g titanium sulfate, 23.0 g ammonium dihydrogen phosphate, 12.6 g oxalic acid dihydrate |
| Preparation Embodiment 35 | $Ag_4P_2O_7$ | 67.9 g silver nitrate, 23.0 g ammonium dihydrogen phosphate and 25.2 g oxalic acid dihydrate |
| Preparation Embodiment 36 | $ZrP_2O_7$ | 56.6 g zirconium sulfate, 23.0 g ammonium dihydrogen phosphate and 25.2 g oxalic acid dihydrate |

*For the determination method, please refer to the "Performance Test of Positive Electrode Active Materials" section below.

TABLE 3

| Coating of the first cladding layer (step S4) | | | | | | | |
|---|---|---|---|---|---|---|---|
| | Cladding material and | | Step S4: Coating of the first cladding layer | | | | |
| No. | amount of first cladding layer* (based on inner core weight) | Amount of inner core added in step S4 | Amount of corresponding cladding material in the first cladding layer suspension | Mixing time (h) | Oven drying temperature (° C.) | Sintering temperature (° C.) | Sintering time (h) |
| Comparative Embodiment 3 | 2% amorphous $Li_2FeP_2O_7$ | 1570.4 g | 31.4 g | 6 | 120 | 500 | 4 |
| Comparative Embodiment 11 | 1% crystalline $Li_2FeP_2O_7$ | 1571.1 g | 15.7 g | 6 | 120 | 650 | 6 |
| Comparative Embodiment 13 | 2% crystalline $Li_2FeP_2O_7$ | 1568.5 g | 31.4 g | 6 | 120 | 650 | 6 |
| Comparative Embodiment 14 | 2% crystalline $Li_2FeP_2O_7$ | 1562.8 g | 31.2 g | 6 | 120 | 650 | 6 |
| Comparative Embodiment 15 | 2% crystalline $Li_2FeP_2O_7$ | 1570.6 g | 31.4 g | 6 | 120 | 650 | 6 |
| Comparative Embodiment 16 | 2% amorphous $Li_2FeP_2O_7$ | 1571.1 g | 31.4 g | 6 | 120 | 500 | 4 |
| Comparative Embodiment 17 | 2% crystalline $Li_2FeP_2O_7$ | 1571.1 g | 31.4 g | 6 | 120 | 650 | 6 |
| Preparation Embodiments 1-4, 8-10 | 1% $Li_2FeP_2O_7$ | 1571.9 g | 15.7 g | 6 | 120 | 650 | 6 |
| Preparation Embodiment 5 | 2% $Li_2FeP_2O_7$ | 1571.9 g | 31.4 g | 6 | 120 | 650 | 6 |
| Preparation Embodiment 6 | 3% $Li_2FeP_2O_7$ | 1571.1 g | 47.1 g | 6 | 120 | 650 | 6 |
| Preparation Embodiment 7 | 5% $Li_2FeP_2O_7$ | 1571.9 g | 78.6 g | 6 | 120 | 650 | 6 |
| Preparation Embodiment 11 | 1% $Li_2FeP_2O_7$ | 1572.1 g | 15.7 g | 6 | 120 | 650 | 6 |
| Preparation Embodiment 12 | 1% $Li_2FeP_2O_7$ | 1571.7 g | 15.7 g | 6 | 120 | 650 | 6 |
| Preparation Embodiment 13 | 2% $Li_2FeP_2O_7$ | 1571.4 g | 31.4 g | 6 | 120 | 650 | 6 |
| Preparation Embodiment 14 | 2.5% $Li_2FeP_2O_7$ | 1571.9 g | 39.3 g | 6 | 120 | 650 | 6 |
| Preparation Embodiment 15 | 2% $Al_4(P_2O_7)_3$ | 1571.9 g | 31.4 g | 6 | 120 | 680 | 8 |
| Preparation Embodiment 16 | 3% $Al_4(P_2O_7)_3$ | 1571.9 g | 47.2 g | 6 | 120 | 680 | 8 |
| Preparation Embodiment 17 | 1.5% $Li_2NiP_2O_7$ | 1571.9 g | 23.6 g | 6 | 120 | 630 | 6 |
| Preparation Embodiment 18 | 1% $Li_2NiP_2O_7$ | 1570.1 g | 15.7 g | 6 | 120 | 630 | 6 |
| Preparation Embodiment 19 | 2% $Li_2FeP_2O_7$ | 1571.0 g | 31.4 g | 6 | 120 | 650 | 6 |
| Preparation Embodiment 20 | 1% Li2NiP2O7 | 1571.9 g | 15.7 g | 6 | 120 | 630 | 6 |
| Preparation Embodiments 21, 23, 24 | 2% $Li_2FeP_2O_7$ | 1572.1 g | 31.4 g | 6 | 120 | 650 | 6 |
| Preparation Embodiment 22 | 5.50% $Li_2FeP_2O_7$ | 1572.1 g | 86.5 g | 6 | 120 | 650 | 6 |
| Preparation Embodiment 25 | 1% $Li_2FeP_2O_7$ | 1573.0 g | 15.7 g | 6 | 120 | 650 | 6 |
| Preparation Embodiment 26 | 1% $Li_2FeP_2O_7$ | 1568.6 g | 15.7 g | 6 | 120 | 650 | 6 |
| Preparation Embodiment 27 | 1% $Li_2FeP_2O_7$ | 1569.2 g | 15.7 g | 6 | 120 | 650 | 6 |
| Preparation Embodiment 28 | 2% crystalline $Li_2FeP_2O_7$ | 1573.9 g | 31.4 g | 6 | 120 | 650 | 6 |
| Preparation Embodiment 29 | 2% crystalline $Li_2FeP_2O_7$ | 1564.1 g | 31.2 g | 6 | 120 | 650 | 6 |

*For the determination method, please refer to the “Performance Test of Positive Electrode Active Materials” section below.

TABLE 4

| Preparation of second cladding layer suspension (step S5) | | |
|---|---|---|
| No. | Second cladding layer material* | Step S5: Preparation of second cladding layer suspension |
| Comparative Embodiment 12, Preparation Embodiments 1-14, 18-19, 25-27 | Crystalline $LiFePO_4$ | 3.7 g lithium carbonate; 11.6 g ferrous carbonate; 11.5 g ammonium dihydrogen phosphate; 12.6 g oxalic acid dihydrate |
| Comparative Embodiments 13-16; Preparation Embodiments 15, 17, 20, 21-24, 28-29 | Crystalline $LiCoPO_4$ | 3.7 g lithium carbonate; 15.5 g cobalt sulfate; 11.5 g ammonium dihydrogen phosphate; 12.6 g oxalic acid dihydrate |
| Comparative Embodiment 17 | Amorphous $LiCoPO_4$ | 3.7 g lithium carbonate; 15.5 g cobalt sulfate; 11.5 g ammonium dihydrogen phosphate; 12.6 g oxalic acid dihydrate |
| Preparation Embodiment 16 | Crystalline $LiNiPO_4$ | 3.7 g lithium carbonate; 11.9 g nickel carbonate; 11.5 g ammonium dihydrogen phosphate; 12.6 g oxalic acid dihydrate |
| Preparation Embodiment 37 | Cu3(PO4)2 | 48.0 g copper sulfate, 23.0 g ammonium dihydrogen phosphate, 37.8 g oxalic acid dihydrate |
| Preparation Embodiment 38 | Zn3(PO4)2 | 37.6 g zinc carbonate, 23.0 g ammonium dihydrogen phosphate, 37.8 g oxalic acid dihydrate |
| Preparation Embodiment 39 | Ti3(PO4)4 | 72.0 g titanium sulfate, 46.0 g ammonium dihydrogen phosphate, 75.6 g oxalic acid dihydrate |
| Preparation Embodiment 40 | Ag3PO4 | 50.9 g silver nitrate; 11.5 g ammonium dihydrogen phosphate, 18.9 g oxalic acid dihydrate |
| Preparation Embodiment 41 | Zr3(PO4)4 | 85.0 g zirconium sulfate; 46.0 g ammonium dihydrogen phosphate; 37.8 g oxalic acid dihydrate |
| Preparation Embodiment 42 | AlPO4 | 13.3 g aluminum chloride, 11.5 g ammonium dihydrogen phosphate, 18.9 g oxalic acid dihydrate |

*For the determination method, please refer to the "Performance Test of Positive Electrode Active Materials" section below.

TABLE 5

| Coating of the second cladding layer (step S6) | | | | | | | |
|---|---|---|---|---|---|---|---|
| | | | Step S6: Coating of the second cladding layer | | | | |
| No. | Second cladding layer material and its amount (based on inner core weight)* | The amount of the material coated with pyrophosphate added in step S6 (the amount of the inner core added in Comparative Embodiment 12) (g) | Amount of corresponding cladding material in the second cladding layer suspension (g) | Mixing time (h) | Oven drying temperature (° C.) | Sintering temperature (° C.) | Sintering time (h) |
| Comparative Embodiment 12 | 3% $LiFePO_4$ | 1571.1 | 47.1 | 6 | 120 | 700 | 8 |
| Comparative Embodiment 13 | 4% $LiCoPO_4$ | 1599.9 | 62.7 | 6 | 120 | 750 | 8 |
| Comparative Embodiment 14 | 4% $LiCoPO_4$ | 1594.0 | 62.5 | 6 | 120 | 750 | 8 |
| Comparative Embodiment 15 | 4% $LiCoPO_4$ | 1602.0 | 62.8 | 6 | 120 | 750 | 8 |
| Comparative Embodiment 16 | 4% $LiCoPO_4$ | 1602.5 | 62.8 | 6 | 120 | 750 | 8 |
| Comparative Embodiment 17 | 4% amorphous $LiCoPO_4$ | 1602.5 | 62.8 | 6 | 120 | 650 | 8 |
| Preparation Embodiments 1-4 | 3% $LiFePO_4$ | 1586.8 | 47.1 | 6 | 120 | 700 | 8 |
| Preparation Embodiment 5 | 3% $LiFePO_4$ | 1602.5 | 47.1 | 6 | 120 | 700 | 8 |
| Preparation Embodiment 6 | 3% $LiFePO_4$ | 1618.2 | 47.1 | 6 | 120 | 700 | 8 |
| Preparation Embodiment 7 | 3% $LiFePO_4$ | 1649.6 | 47.1 | 6 | 120 | 700 | 8 |
| Preparation Embodiment 8 | 1% $LiFePO_4$ | 1586.8 | 15.7 | 6 | 120 | 700 | 8 |
| Preparation Embodiment 9 | 4% $LiFePO_4$ | 1586.8 | 62.8 | 6 | 120 | 700 | 8 |
| Preparation Embodiment 10 | 5% $LiFePO_4$ | 1586.8 | 78.6 | 6 | 120 | 700 | 8 |
| Preparation Embodiment 11 | 2.50% $LiFePO_4$ | 1587.8 | 39.3 | 6 | 120 | 700 | 8 |
| Preparation Embodiment 12 | 3% $LiFePO_4$ | 1587.4 | 47.2 | 6 | 120 | 700 | 8 |
| Preparation Embodiment 13 | 2% $LiFePO_4$ | 1602.8 | 31.4 | 6 | 120 | 700 | 8 |
| Preparation Embodiment 14 | 3.50% $LiFePO_4$ | 1610.5 | 55.0 | 6 | 120 | 700 | 8 |
| Preparation Embodiment 15 | 2.5% $LiCoPO_4$ | 1603.3 | 39.3 | 6 | 120 | 750 | 8 |
| Preparation Embodiment 16 | 3% $LiNiPO_4$ | 1619.0 | 47.2 | 6 | 120 | 680 | 8 |
| Preparation Embodiment 17 | 2.5% $LiCoPO_4$ | 1595.5 | 39.3 | 6 | 120 | 750 | 8 |
| Preparation Embodiment 18 | 3% $LiFePO_4$ | 1585.9 | 47.1 | 6 | 120 | 700 | 8 |
| Preparation Embodiment 19 | 4% $LiFePO_4$ | 1602.4 | 62.8 | 6 | 120 | 700 | 8 |
| Preparation Embodiment 20 | 3% $LiCoPO_4$ | 1587.7 | 47.2 | 6 | 120 | 750 | 8 |
| Preparation Embodiment 21 | 4% $LiCoPO_4$ | 1603.5 | 62.9 | 6 | 120 | 750 | 8 |
| Preparation Embodiment 22 | 4% $LiCoPO_4$ | 1658.6 | 62.9 | 6 | 120 | 750 | 8 |
| Preparation Embodiment 23 | 5.50% $LiCoPO_4$ | 1603.5 | 86.5 | 6 | 120 | 750 | 8 |
| Preparation Embodiment 24 | 4% $LiCoPO_4$ | 1603.5 | 62.9 | 6 | 120 | 750 | 8 |
| Preparation Embodiment 25 | 3% $LiFePO_4$ | 1588.7 | 47.2 | 6 | 120 | 700 | 8 |
| Preparation Embodiment 26 | 3% $LiFePO_4$ | 1584.3 | 47.1 | 6 | 120 | 700 | 8 |
| Preparation Embodiment 27 | 3% $LiFePO_4$ | 1584.9 | 47.1 | 6 | 120 | 700 | 8 |
| Preparation Embodiment 28 | 4% $LiCoPO_4$ | 1605.4 | 63.0 | 6 | 120 | 750 | 8 |
| Preparation Embodiment 29 | 4% $LiCoPO_4$ | 1605.4 | 63.0 | 6 | 120 | 750 | 8 |

*For the determination method, please refer to the "Performance Test of Positive Electrode Active Materials" section below.

TABLE 6

| No. | Third cladding layer* | Molar ratio of SP2 to SP3* | Coating of the third cladding layer (step S8): The amount of material with two cladding layers added in step S8 (the amount of the inner core added in Comparative Embodiments 1-2 and 4-10, and the mount of material with the first cladding layer added in Comparative Embodiment 11) (g) | Step S8: Coating of the third cladding layer: Amount of sucrose (g) | Mixing time (h) | Oven drying temperature (° C.) | Sintering temperature (° C.) | Sintering time (h) |
|---|---|---|---|---|---|---|---|---|
| Comparative Embodiment 1 | 1% carbon | 2.5 | 1568.5 | 37.3 | 6 | 150 | 650 | 8 |
| Comparative Embodiment 2 | 2% carbon | 2.8 | 1572.2 | 74.7 | 6 | 150 | 680 | 8 |
| Comparative Embodiment 3 | 2% carbon | 2.7 | 1601.8 | 74.6 | 6 | 150 | 680 | 7 |
| Comparative Embodiment 4 | 1% carbon | 2.4 | 1571.0 | 37.3 | 6 | 150 | 630 | 8 |
| Comparative Embodiment 5 | 1.5% carbon | 2.6 | 1570.6 | 56.0 | 6 | 150 | 650 | 7 |
| Comparative Embodiment 6 | 2.5% carbon | 2.8 | 1573.6 | 93.4 | 6 | 150 | 680 | 8 |
| Comparative Embodiment 7 | 1% carbon | 2.7 | 1572.2 | 37.3 | 6 | 150 | 680 | 7 |
| Comparative Embodiment 8 | 1.5% carbon | 2.9 | 1571.1 | 56.0 | 6 | 150 | 680 | 10 |
| Comparative Embodiment 9 | 1% carbon | 2.2 | 1572.2 | 37.3 | 6 | 150 | 600 | 8 |
| Comparative Embodiment 10 | 1% carbon | 2.4 | 1571.1 | 37.3 | 6 | 150 | 630 | 8 |
| Comparative Embodiment 11 | 1% carbon | 2.3 | 1586.8 | 37.3 | 6 | 150 | 620 | 8 |
| Comparative Embodiment 12 | 1% carbon | 2.1 | 1618.2 | 37.3 | 6 | 150 | 600 | 6 |
| Comparative Embodiment 13 | 1% carbon | 2 | 1662.6 | 37.3 | 6 | 120 | 600 | 6 |
| Comparative Embodiment 14 | 1% carbon | 1.8 | 1656.5 | 37.1 | 6 | 120 | 600 | 6 |
| Comparative Embodiment 15 | 1% carbon | 1.7 | 1664.8 | 37.3 | 6 | 100 | 600 | 6 |
| Comparative Embodiment 16 | 1% carbon | 3.1 | 1665.4 | 37.3 | 6 | 150 | 700 | 10 |
| Comparative Embodiment 17 | 1% carbon | 3.5 | 1665.4 | 37.3 | 6 | 150 | 750 | 10 |
| Preparation Embodiment 1 | 1% carbon | 2.2 | 1633.9 | 37.3 | 6 | 150 | 700 | 10 |
| Preparation Embodiment 2 | 3% carbon | 2.3 | 1633.9 | 111.9 | 6 | 150 | 600 | 9 |
| Preparation Embodiment 3 | 4% carbon | 2.1 | 1633.9 | 149.2 | 6 | 150 | 600 | 6 |
| Preparation Embodiment 4 | 5% carbon | 2.4 | 1633.9 | 186.5 | 6 | 150 | 630 | 8 |
| Preparation Embodiment 5 | 1% carbon | 2.5 | 1649.6 | 37.3 | 6 | 150 | 650 | 8 |
| Preparation Embodiment 6 | 1% carbon | 2.5 | 1665.3 | 37.3 | 6 | 150 | 650 | 8 |
| Preparation Embodiment 7 | 1% carbon | 2.4 | 1696.7 | 37.3 | 6 | 150 | 630 | 8 |
| Preparation Embodiment 8 | 1% carbon | 2.3 | 1602.5 | 37.3 | 6 | 150 | 600 | 9 |
| Preparation Embodiment 9 | 1% carbon | 2.2 | 1649.6 | 37.3 | 6 | 150 | 600 | 8 |
| Preparation Embodiment 10 | 1% carbon | 2.2 | 1665.3 | 37.3 | 6 | 150 | 600 | 9 |
| Preparation Embodiment 11 | 1.5% carbon | 2.3 | 1629.0 | 56.1 | 6 | 150 | 600 | 9 |
| Preparation Embodiment 12 | 2% carbon | 2.4 | 1634.6 | 74.7 | 6 | 150 | 630 | 8 |
| Preparation Embodiment 13 | 2% carbon | 2.5 | 1634.2 | 74.6 | 6 | 150 | 650 | 8 |
| Preparation Embodiment 14 | 2.5% carbon | 2.7 | 1665.5 | 93.3 | 6 | 150 | 680 | 7 |
| Preparation Embodiment 15 | 2% carbon | 2.8 | 1642.6 | 74.7 | 6 | 150 | 680 | 8 |
| Preparation Embodiment 16 | 1% carbon | 2.7 | 1666.2 | 37.3 | 6 | 150 | 680 | 7 |
| Preparation Embodiment 17 | 1.5% carbon | 2.3 | 1634.8 | 56.0 | 6 | 150 | 600 | 9 |
| Preparation Embodiment 18 | 1% carbon | 2.6 | 1633.0 | 37.3 | 6 | 150 | 650 | 7 |
| Preparation Embodiment 19 | 1.5% carbon | 2.4 | 1665.2 | 56.0 | 6 | 150 | 630 | 8 |
| Preparation Embodiment 20 | 1.5% carbon | 2.2 | 1634.8 | 56.0 | 6 | 150 | 600 | 9 |
| Preparation Embodiment 21 | 1% carbon | 2.2 | 1666.4 | 37.3 | 6 | 150 | 600 | 9 |
| Preparation Embodiment 22 | 1% carbon | 2.3 | 1721.4 | 37.3 | 6 | 150 | 600 | 9 |
| Preparation Embodiment 23 | 1% carbon | 2.4 | 1690.0 | 37.3 | 6 | 150 | 630 | 8 |
| Preparation Embodiment 24 | 5.5% carbon | 2.6 | 1666.4 | 205.4 | 6 | 150 | 650 | 7 |
| Preparation Embodiment 25 | 1% carbon | 2.4 | 1635.9 | 37.4 | 6 | 150 | 630 | 8 |

TABLE 6-continued

| Coating of the third cladding layer (step S8) | | | | | | | | |
|---|---|---|---|---|---|---|---|---|
| | | | The amount of material with two cladding layers added in step S8 (the amount of the inner core added in Comparative Embodiments 1-2 and 4-10, and the mount of material with the first cladding layer added in Comparative Embodiment 11) (g) | Step S8: Coating of the third cladding layer | | | | |
| No. | Third cladding layer* | Molar ratio of SP2 to SP3* | | Amount of sucrose (g) | Mixing time (h) | Oven drying temperature (° C.) | Sintering temperature (° C.) | Sintering time (h) |
| Preparation Embodiment 26 | 1% carbon | 2.3 | 1631.3 | 37.3 | 6 | 150 | 600 | 9 |
| Preparation Embodiment 27 | 1.5% carbon | 2.1 | 1631.9 | 55.9 | 6 | 150 | 600 | 6 |
| Preparation Embodiment 28 | 1% carbon | 0.07 | 1668.3 | 37.4 | 6 | 80 | 600 | 6 |
| Preparation Embodiment 29 | 1% carbon | 13 | 1668.3 | 37.4 | 6 | 150 | 850 | 10 |

*For the determination method, please refer to the “Performance Test of Positive Electrode Active Materials” section below.

Preparation Embodiment 43

Lithium nickel cobalt manganese oxide $LiNi_{0.5}Co_{0.2}Mn_{0.3}O_2$ was used as the positive electrode active material.

Preparation Embodiment 44

The positive electrode active materials of Preparation Embodiment 1 and Preparation Embodiment 43 were mixed according to a mass ratio of 1:1.

Preparation Embodiment 45

Lithium nickel cobalt manganese oxide $LiNi_{0.33}Co_{0.33}Mn_{0.34}O_2$ was used as the positive electrode active material.

Preparation Embodiment 46

Lithium nickel cobalt manganese oxide $LiNi_{0.8}Co_{0.1}Mn_{0.1}O_2$ was used as the positive electrode active material.

Preparation Embodiment 47

Lithium nickel cobalt aluminum oxide $LiNi_{0.33}Co_{0.33}Al_{0.34}O_2$ was used as the positive electrode active material.

Preparation Embodiment 48

Lithium nickel cobalt aluminum oxide $LiNi_{0.5}Co_{0.2}Al_{0.3}O_2$ was used as the positive electrode active material.

Preparation Embodiment 49

Lithium nickel cobalt aluminum oxide $LiNi_{0.8}Co_{0.1}Al_{0.1}O_2$ was used as the positive electrode active material.

Preparation Embodiment 50

Lithium cobalt oxide $LiCoO_2$ was used as the positive electrode active material.

Preparation Embodiment 51

The positive electrode active materials of Preparation Embodiment 1 and Preparation Embodiment 45 were mixed according to a mass ratio of 1:1 for use as the positive electrode active material.

Preparation Embodiment 52

The positive electrode active materials of Preparation Embodiment 1 and Preparation Embodiment 46 were mixed according to a mass ratio of 1:1 for use as the positive electrode active material.

Preparation Embodiment 53

The positive electrode active materials of Preparation Embodiment 1 and Preparation Embodiment 47 were mixed according to a mass ratio of 1:1 for use as the positive electrode active material.

Preparation Embodiment 54

The positive electrode active materials of Preparation Embodiment 1 and Preparation Embodiment 48 were mixed according to a mass ratio of 1:1 for use as the positive electrode active material.

Preparation Embodiment 55

The positive electrode active materials of Preparation Embodiment 1 and Preparation Embodiment 49 were mixed according to a mass ratio of 1:1 for use as the positive electrode active material.

Preparation Embodiment 56

The positive electrode active materials of Preparation Embodiment 1 and Preparation Embodiment 50 were mixed according to a mass ratio of 1:1 for use as the positive electrode active material.

Preparation Embodiments 57 to 69

The positive electrode active materials of Preparation Embodiments 57 to 69 were prepared by a method similar to that of Preparation Embodiment 1, and the differences in the preparation of the positive electrode active materials are shown in Tables 7-8.

TABLE 7

Investigation of the first cladding layer material (Preparation Embodiments 57-63)

| No. | Cladding material of first cladding layer | Preparation of cladding layer suspension |
|---|---|---|
| Preparation Embodiment 57 | $Li_2MgP_2O_7$ | 7.4 g of lithium carbonate, 8.4 g of magnesium carbonate, 23.0 g of ammonium dihydrogen phosphate and 12.6 g of oxalic acid dihydrate were dissolved in 500 mL of deionized water, with pH controlled at 5, then the mixture was stirred and allowed to react for 2 h to obtain a solution. Then the solution was heated to 80° C. and maintained at this temperature for 4 h to obtain a suspension. |
| Preparation Embodiment 58 | $Li_2CoP_2O_7$ | 7.4 g of lithium carbonate, 15.5 g of cobalt sulfate, 23.0 g of ammonium dihydrogen phosphate and 12.6 g of oxalic acid dihydrate were dissolved in 500 mL of deionized water, with pH controlled at 5, then the mixture was stirred and allowed to react for 2 h to obtain a |

TABLE 7-continued

| Investigation of the first cladding layer material (Preparation Embodiments 57-63) | | |
|---|---|---|
| No. | Cladding material of first cladding layer | Preparation of cladding layer suspension |
| | | solution. Then the solution was heated to 80° C. and maintained at this temperature for 4 h to obtain a suspension. |
| Preparation Embodiment 59 | $Li_2CuP_2O_7$ | 7.4 g of lithium carbonate, 16.0 g of copper sulfate, 23.0 g of ammonium dihydrogen phosphate and 12.6 g of oxalic acid dihydrate were dissolved in 500 mL of deionized water, with pH controlled at 5, then the mixture was stirred and allowed to react for 2 h to obtain a solution. Then the solution was heated to 80° C. and maintained at this temperature for 4 h to obtain a suspension. |
| Preparation Embodiment 60 | $Li_2ZnP_2O_7$ | 7.4 g of lithium carbonate, 12.5 g of zinc carbonate, 23.0 g of ammonium dihydrogen phosphate and 12.6 g of oxalic acid dihydrate were dissolved in 500 mL of deionized water, with pH controlled at 5, then the mixture was stirred and allowed to react for 2 h to obtain a solution. Then the solution was heated to 80° C. and maintained at this temperature for 4 h to obtain a suspension. |
| Preparation Embodiment 61 | $TiP_2O_7$ | 24.0 g of titanium sulfate, 23.0 g of ammonium dihydrogen phosphate and 12.6 g of oxalic acid dihydrate were dissolved in 500 mL of deionized water, with pH controlled at 5, then the mixture was stirred and allowed to react for 2 h to obtain a solution. Then the solution was heated to 80° C. and maintained at this temperature for 4 h to obtain a suspension. |
| Preparation Embodiment 62 | $Ag_4P_2O_7$ | 67.9 g of silver nitrate, 23.0 g of ammonium dihydrogen phosphate and 25.2 g of oxalic acid dihydrate were dissolved in 500 mL of deionized water, with pH controlled at 5, then the mixture was stirred and allowed to react for 2 h to obtain a solution. Then the solution was heated to 80° C. and maintained at this temperature for 4 h to obtain a suspension. |
| Preparation Embodiment 63 | $ZrP_2O_7$ | 56.6 g of zirconium sulfate, 23.0 g of ammonium dihydrogen phosphate and 25.2 g of oxalic acid dihydrate were dissolved in 500 mL of deionized water, with pH controlled at 5, then the mixture was stirred and allowed to react for 2 h to obtain a solution. Then the solution was heated to 80° C. and maintained at this temperature for 4 h to obtain a suspension. |

TABLE 8

| Investigation of the second cladding layer material (Preparation Embodiments 64-69) | | |
|---|---|---|
| No. | Second cladding layer crystalline material | Preparation of cladding layer suspension |
| Preparation Embodiment 64 | $Cu_3(PO_4)_2$ | 48.0 g of copper sulfate, 23.0 g of ammonium dihydrogen phosphate and 37.8 g of oxalic acid dihydrate were dissolved in 1500 mL of deionized water, and then stirred and allowed to react sufficiently for 6 h to obtain a solution. Then the solution was heated to 120° C. and maintained at this temperature for 6 h to obtain a suspension. |
| Preparation Embodiment 65 | $Zn_3(PO_4)_2$ | 37.6 g of zinc carbonate, 23.0 g of ammonium dihydrogen phosphate and 37.8 g of oxalic acid dihydrate were dissolved in 1500 mL of deionized water, and then stirred and allowed to react sufficiently for 6 h to obtain a solution. Then the solution was heated to 120° C. and maintained at this temperature for 6 h to obtain a suspension. |
| Preparation Embodiment 66 | $Ti_3(PO_4)_4$ | 72.0 g of titanium sulfate, 46.0 g of ammonium dihydrogen phosphate and 75.6 g of oxalic acid dihydrate were dissolved in 1500 mL of deionized water, and then stirred |

TABLE 8-continued

| Investigation of the second cladding layer material (Preparation Embodiments 64-69) | | |
|---|---|---|
| No. | Second cladding layer crystalline material | Preparation of cladding layer suspension |
| | | and allowed to react sufficiently for 6 h to obtain a solution. Then the solution was heated to 120° C. and maintained at this temperature for 6 h to obtain a suspension. |
| Preparation Embodiment 67 | $Ag_3PO_4$ | 50.9 g of silver nitrate, 11.5 g of ammonium dihydrogen phosphate and 18.9 g of oxalic acid dihydrate were dissolved in 1500 mL of deionized water, and then stirred and allowed to react sufficiently for 6 h to obtain a solution. Then the solution was heated to 120° C. and maintained at this temperature for 6 h to obtain a suspension. |
| Preparation Embodiment 68 | $Zr_3(PO_4)_4$ | 85.0 g of zirconium sulfate, 46.0 g of ammonium dihydrogen phosphate and 37.8 g of oxalic acid dihydrate were dissolved in 1500 mL of deionized water, and then stirred and allowed to react sufficiently for 6 h to obtain a solution. Then the solution was heated to 120° C. and maintained at this temperature for 6 h to obtain a suspension. |
| Preparation Embodiment 69 | $AlPO_4$ | 13.3 g of aluminum chloride, 11.5 g of ammonium dihydrogen phosphate and 18.9 g of oxalic acid dihydrate were dissolved in 1500 mL of deionized water, and then stirred and allowed to react sufficiently for 6 h to obtain a solution. Then the solution was heated to 120° C. and maintained at this temperature for 6 h to obtain a suspension. |

The prepared positive electrode active material, the conductive agent superconducting carbon black (Super-P) and the binder polyvinylidene fluoride (PVDF) were added to N-methyl pyrrolidone (NMP) according to a weight ratio of 92:2.5:5.5, well stirred and mixed to obtain a 60% w/w slurry of positive electrode active material.

Preparation of Positive Electrode Sheet

Embodiment 1

The slurry of the positive electrode active material in Preparation Embodiment 1 was evenly coated on both sides of the aluminum foil of the current collector with a coating amount of 0.019 g/cm$^2$, dried under vacuum at a high temperature of 100-120° C. for 14 h, and compacted by a roller press to obtain a positive electrode sheet P1.

Embodiment 2

The slurry of the positive electrode active material in Preparation Embodiment 43 was evenly coated on both sides of the aluminum foil of the current collector with a coating amount of 0.019 g/cm$^2$, dried under vacuum at a high temperature of 100-120° C. for 14 h, and compacted by a roller press to obtain a positive electrode sheet P2.

Embodiment 3

The slurry of the positive electrode active material of Preparation Embodiment 1 was uniformly coated on one side of the aluminum foil with a coating amount of 0.019 g/cm$^2$, and the slurry of the positive electrode active material of Preparation Embodiment 43 was evenly coated on the other side of the aluminum foil with a coating amount of 0.2 g/cm$^2$, dried under vacuum at a high temperature of 100-120° C. for 14 h, and compacted with a roller press to obtain a positive electrode sheet P3.

Embodiment 4

The slurry of the positive electrode active material of Preparation Embodiment 44 was uniformly coated on both sides of the aluminum foil of the current collector with a coating amount of 0.019 g/cm$^2$, and the others were the same as in Embodiment 3 to obtain a positive electrode sheet P4.

Embodiment 5

The slurry of the positive electrode active material of Preparation Embodiment 1 was uniformly coated on one side of the aluminum foil with a coating amount of 0.019 g/cm$^2$, and the slurry of the positive electrode active material of Preparation Embodiment 44 was evenly coated on the other side of the aluminum foil with a coating amount of 0.019 g/cm2, and the others were the same as in Embodiment 3 to obtain a positive electrode sheet P5.

Embodiment 6

The slurry of the positive electrode active material of Preparation Embodiment 43 was uniformly coated on one side of the aluminum foil with a coating amount of 0.019 g/cm$^2$, and the slurry of the positive electrode active material of Preparation Embodiment 44 was evenly coated on the other side of the aluminum foil with a coating amount of 0.019 g/cm$^2$, and the others were the same as in Embodiment 3 to obtain a positive electrode sheet P6.

Embodiment 7

Both sides of the aluminum foil were sequentially coated with the slurry of the positive electrode active material of Preparation Embodiment 1 and the slurry of the positive electrode active material of Preparation Embodiment 43, and the coating amount of each layer of slurry was 0.010 g/cm$^2$, then the system was dried under vacuum at a high temperature of 100-120° C. for 14 h, and compacted with a roller press to obtain a positive electrode sheet P7.

Embodiment 8

Both sides of the aluminum foil were sequentially coated with the slurry of the positive electrode active material of Preparation Embodiment 43 and the slurry of the positive electrode active material of Preparation Embodiment 1, the coating amount of each layer of slurry was g/cm$^2$, and the others were the same as in Embodiment 7 to obtain a positive electrode sheet P8.

Embodiment 9

Both sides of the aluminum foil were sequentially coated with the slurry of the positive electrode active material of Preparation Embodiment 1 and the slurry of the positive electrode active material of Preparation Embodiment 44, the coating amount of each layer of slurry was g/cm$^2$, and the others were the same as in Embodiment 7 to obtain a positive electrode sheet P9.

Embodiment 10

Both sides of the aluminum foil were sequentially coated with the slurry of the positive electrode active material of Preparation Embodiment 44 and the slurry of the positive electrode active material of Preparation Embodiment 1, the coating amount of each layer of slurry was 0.010 g/cm$^2$, and the others were the same as in Embodiment 7 to obtain a positive electrode sheet P10.

Embodiment 11

Both sides of the aluminum foil were sequentially coated with the slurry of the positive electrode active material of Preparation Embodiment 43 and the slurry of the positive electrode active material of Preparation Embodiment 44, the coating amount of each layer of slurry was g/cm$^2$, and the others were the same as in Embodiment 7 to obtain a positive electrode sheet P11.

Embodiment 12

Both sides of the aluminum foil were sequentially coated with the slurry of the positive electrode active material of Preparation Embodiment 44 and the slurry of the positive electrode active material of Preparation Embodiment 43, the coating amount of each layer of slurry was g/cm$^2$, and the others were the same as in Embodiment 7 to obtain a positive electrode sheet P12.

Embodiment 13

On the A side of the aluminum foil, the slurry of the positive electrode active material of Preparation Embodiment 1 and the slurry of the positive electrode active material of Preparation Embodiment 43 were sequentially coated, and the coating amount of each layer of slurry was 0.010 g/cm$^2$; on the B side of the aluminum foil, the slurry of the positive electrode active material of Preparation Embodiment 1 was coated, and the coating amount of the slurry was 0.020 g/cm$^2$; then, they system was dried under vacuum at a high temperature of 100-120° C. for 14 h, and compacted by a roller press to obtain a positive electrode sheet P13.

Embodiment 14

On the A side of the aluminum foil, the slurry of the positive electrode active material of Preparation Embodiment 1 and the slurry of the positive electrode active material of Preparation Embodiment 43 were sequentially coated, and the coating amount of each layer of slurry was 0.010 g/cm$^2$; on the B side of the aluminum foil, the slurry of the positive electrode active material of Preparation Embodiment 43 was coated, and the coating amount of the slurry was 0.020 g/cm$^2$, the others were the same as in Embodiment 13, to obtain a positive electrode sheet P14.

Embodiment 15

On the A side of the aluminum foil, the slurry of the positive electrode active material of Preparation Embodiment 1 and the slurry of the positive electrode active material of Preparation Embodiment 43 were sequentially coated, and the coating amount of each layer of slurry was 0.010 g/cm$^2$; on the B side of the aluminum foil, the slurry of the positive electrode active material of Preparation Embodiment 44 was coated, and the coating amount of the slurry was 0.020 g/cm$^2$, the others were the same as in Embodiment 13, to obtain a positive electrode sheet P15.

Embodiment 16

On the A side of the aluminum foil, the slurry of the positive electrode active material of Preparation Embodiment 43 and the slurry of the positive electrode active material of Preparation Embodiment 1 were sequentially coated, and the coating amount of each layer of slurry was 0.010 g/cm$^2$; on the B side of the aluminum foil, the slurry of the positive electrode active material of Preparation Embodiment 1 was coated, and the coating amount of the slurry was 0.020 g/cm$^2$, the others were the same as in Embodiment 13, to obtain a positive electrode sheet P16.

Embodiment 17

On the A side of the aluminum foil, the slurry of the positive electrode active material of Preparation Embodiment 43 and the slurry of the positive electrode active material of Preparation Embodiment 1 were sequentially coated, and the coating amount of each layer of slurry was 0.010 g/cm$^2$; on the B side of the aluminum foil, the slurry of the positive electrode active material of Preparation Embodiment 43 was coated, and the coating amount of the slurry was 0.020 g/cm$^2$, the others were the same as in Embodiment 13, to obtain a positive electrode sheet P17.

Embodiment 18

On the A side of the aluminum foil, the slurry of the positive electrode active material of Preparation Embodiment 43 and the slurry of the positive electrode active material of Preparation Embodiment 1 were sequentially coated, and the coating amount of each layer of slurry was 0.010 g/cm$^2$; on the B side of the aluminum foil, the slurry of the positive electrode active material of Preparation Embodiment 44 was coated, and the coating amount of the slurry was 0.020 g/cm$^2$, the others were the same as in Embodiment 13, to obtain a positive electrode sheet P18.

Embodiment 19

On the A side of the aluminum foil, the slurry of the positive electrode active material of Preparation Embodiment 1 and the slurry of the positive electrode active material of Preparation Embodiment 44 were sequentially coated, and the coating amount of each layer of slurry was 0.010 g/cm$^2$; on the B side of the aluminum foil, the slurry of the positive electrode active material of Preparation Embodiment 1 was coated, and the coating amount of the slurry was 0.020 g/cm$^2$, the others were the same as in Embodiment 13, to obtain a positive electrode sheet P19.

Embodiment 20

On the A side of the aluminum foil, the slurry of the positive electrode active material of Preparation Embodiment 1 and the slurry of the positive electrode active material of Preparation Embodiment 44 were sequentially coated, and the coating amount of each layer of slurry was 0.010 g/cm$^2$; on the B side of the aluminum foil, the slurry of the positive electrode active material of Preparation Embodiment 43 was coated, and the coating amount of the slurry was 0.020 g/cm$^2$, the others were the same as in Embodiment 13, to obtain a positive electrode sheet P20.

Embodiment 21

On the A side of the aluminum foil, the slurry of the positive electrode active material of Preparation Embodiment 1 and the slurry of the positive electrode active material of Preparation Embodiment 44 were sequentially coated, and the coating amount of each layer of slurry was 0.010 g/cm$^2$; on the B side of the aluminum foil, the slurry of the positive electrode active material of Preparation Embodiment 44 was coated, and the coating amount of the slurry was 0.020 g/cm$^2$, the others were the same as in Embodiment 13, to obtain a positive electrode sheet P21.

Embodiment 22

On the A side of the aluminum foil, the slurry of the positive electrode active material of Preparation Embodiment 44 and the slurry of the positive electrode active material of Preparation Embodiment 1 were sequentially coated, and the coating amount of each layer of slurry was 0.010 g/cm$^2$; on the B side of the aluminum foil, the slurry of the positive electrode active material of Preparation Embodiment 1 was coated, and the coating amount of the slurry was 0.020 g/cm$^2$, the others were the same as in Embodiment 13, to obtain a positive electrode sheet P22.

Embodiment 23

On the A side of the aluminum foil, the slurry of the positive electrode active material of Preparation Embodiment 44 and the slurry of the positive electrode active material of Preparation Embodiment 1 were sequentially coated, and the coating amount of each layer of slurry was 0.010 g/cm$^2$; on the B side of the aluminum foil, the slurry of the positive electrode active material of Preparation Embodiment 43 was coated, and the coating amount of the slurry was 0.020 g/cm$^2$, the others were the same as in Embodiment 13, to obtain a positive electrode sheet P23.

Embodiment 24

On the A side of the aluminum foil, the slurry of the positive electrode active material of Preparation Embodiment 44 and the slurry of the positive electrode active material of Preparation Embodiment 1 were sequentially coated, and the coating amount of each layer of slurry was 0.010 g/cm$^2$; on the B side of the aluminum foil, the slurry of the positive electrode active material of Preparation Embodiment 44 was coated, and the coating amount of the slurry was 0.020 g/cm$^2$, the others were the same as in Embodiment 13, to obtain a positive electrode sheet P24.

Embodiment 25

On the A side of the aluminum foil, the slurry of the positive electrode active material of Preparation Embodiment 43 and the slurry of the positive electrode active material of Preparation Embodiment 44 were sequentially coated, and the coating amount of each layer of slurry was 0.010 g/cm$^2$; on the B side of the aluminum foil, the slurry of the positive electrode active material of Preparation Embodiment 1 was coated, and the coating amount of the slurry was 0.020 g/cm$^2$, the others were the same as in Embodiment 13, to obtain a positive electrode sheet P25.

Embodiment 26

On the A side of the aluminum foil, the slurry of the positive electrode active material of Preparation Embodiment 43 and the slurry of the positive electrode active material of Preparation Embodiment 44 were sequentially coated, and the coating amount of each layer of slurry was 0.010 g/cm$^2$; on the B side of the aluminum foil, the slurry of the positive electrode active material of Preparation Embodiment 43 was coated, and the coating amount of the slurry was 0.020 g/cm$^2$, the others were the same as in Embodiment 13, to obtain a positive electrode sheet P26.

Embodiment 27

On the A side of the aluminum foil, the slurry of the positive electrode active material of Preparation Embodiment 43 and the slurry of the positive electrode active material of Preparation Embodiment 44 were sequentially coated, and the coating amount of each layer of slurry was 0.010 g/cm$^2$; on the B side of the aluminum foil, the slurry of the positive electrode active material of Preparation Embodiment 44 was coated, and the coating amount of the slurry was 0.020 g/cm$^2$, the others were the same as in Embodiment 13, to obtain a positive electrode sheet P27.

Embodiment 28

On the A side of the aluminum foil, the slurry of the positive electrode active material of Preparation Embodiment 44 and the slurry of the positive electrode active material of Preparation Embodiment 43 were sequentially coated, and the coating amount of each layer of slurry was 0.010 g/cm$^2$; on the B side of the aluminum foil, the slurry of the positive electrode active material of Preparation Embodiment 1 was coated, and the coating amount of the slurry was 0.020 g/cm$^2$, the others were the same as in Embodiment 13, to obtain a positive electrode sheet P28.

Embodiment 29

On the A side of the aluminum foil, the slurry of the positive electrode active material of Preparation Embodiment 44 and the slurry of the positive electrode active material of Preparation Embodiment 43 were sequentially coated, and the coating amount of each layer of slurry was 0.010 g/cm$^2$; on the B side of the aluminum foil, the slurry of the positive electrode active material of Preparation Embodiment 43 was coated, and the coating amount of the slurry was 0.020 g/$cm^2$, the others were the same as in Embodiment 13, to obtain a positive electrode sheet P29.

Embodiment 30

On the A side of the aluminum foil, the slurry of the positive electrode active material of Preparation Embodiment 44 and the slurry of the positive electrode active material of Preparation Embodiment 43 were sequentially coated, and the coating amount of each layer of slurry was 0.010 g/$cm^2$; on the B side of the aluminum foil, the slurry of the positive electrode active material of Preparation Embodiment 44 was coated, and the coating amount of the slurry was 0.020 g/$cm^2$, the others were the same as in Embodiment 13, to obtain a positive electrode sheet P30.

Embodiment 31

The slurry of the positive electrode active material in Preparation Embodiment 45 was evenly coated on both sides of the aluminum foil of the current collector with a coating amount of 0.019 g/$cm^2$, dried under vacuum at a high temperature of 100-120° C. for 14 h, and compacted by a roller press to obtain a positive electrode sheet P31.

Embodiment 32

The slurry of the positive electrode active material in Preparation Embodiment 46 was evenly coated on both sides of the aluminum foil of the current collector with a coating amount of 0.019 g/$cm^2$, dried under vacuum at a high temperature of 100-120° C. for 14 h, and compacted by a roller press to obtain a positive electrode sheet P32.

Embodiment 33

The slurry of the positive electrode active material in Preparation Embodiment 47 was evenly coated on both sides of the aluminum foil of the current collector with a coating amount of 0.019 g/$cm^2$, dried under vacuum at a high temperature of 100-120° C. for 14 h, and compacted by a roller press to obtain a positive electrode sheet P33.

Embodiment 34

The slurry of the positive electrode active material in Preparation Embodiment 48 was evenly coated on both sides of the aluminum foil of the current collector with a coating amount of 0.019 g/$cm^2$, dried under vacuum at a high temperature of 100-120° C. for 14 h, and compacted by a roller press to obtain a positive electrode sheet P34.

Embodiment 35

The slurry of the positive electrode active material in Preparation Embodiment 49 was evenly coated on both sides of the aluminum foil of the current collector with a coating amount of 0.019 g/$cm^2$, dried under vacuum at a high temperature of 100-120° C. for 14 h, and compacted by a roller press to obtain a positive electrode sheet P35.

Embodiment 36

The slurry of the positive electrode active material in Preparation Embodiment 50 was evenly coated on both sides of the aluminum foil of the current collector with a coating amount of 0.019 g/$cm^2$, dried under vacuum at a high temperature of 100-120° C. for 14 h, and compacted by a roller press to obtain a positive electrode sheet P36.

Embodiment 37

The slurry of the positive electrode active material of Preparation Embodiment 51 was uniformly coated on both sides of the aluminum foil of the current collector with a coating amount of 0.019 g/$cm^2$, and the others were the same as in Embodiment 3 to obtain a positive electrode sheet P37.

Embodiment 38

The slurry of the positive electrode active material of Preparation Embodiment 52 was uniformly coated on both sides of the aluminum foil of the current collector with a coating amount of 0.019 g/$cm^2$, and the others were the same as in Embodiment 3 to obtain a positive electrode sheet P38.

Embodiment 39

The slurry of the positive electrode active material of Preparation Embodiment 53 was uniformly coated on both sides of the aluminum foil of the current collector with a coating amount of 0.019 g/$cm^2$, and the others were the same as in Embodiment 3 to obtain a positive electrode sheet P39.

Embodiment 40

The slurry of the positive electrode active material of Preparation Embodiment 54 was uniformly coated on both sides of the aluminum foil of the current collector with a coating amount of 0.019 g/$cm^2$, and the others were the same as in Embodiment 3 to obtain a positive electrode sheet P40.

Embodiment 41

The slurry of the positive electrode active material of Preparation Embodiment 54 was uniformly coated on both sides of the aluminum foil of the current collector with a coating amount of 0.019 g/$cm^2$, and the others were the same as in Embodiment 3 to obtain a positive electrode sheet P41.

Embodiment 42

The slurry of the positive electrode active material of Preparation Embodiment 55 was uniformly coated on both sides of the aluminum foil of the current collector with a coating amount of 0.019 g/$cm^2$, and the others were the same as in Embodiment 3 to obtain a positive 5 electrode sheet P42.

The parameters of the above positive electrode sheets are shown in Table 9.

TABLE 9

Positive electrode sheet parameters

| Positive electrode sheet | The number of positive electrode film layers on the A side of the aluminum foil | Positive electrode active material on the A side of the aluminum foil | The number of positive electrode film layers on the B side of the aluminum foil | Positive electrode active material on the B side of the aluminum foil | Thickness of the positive electrode sheet (mm) | Density of the positive electrode sheet ($g/cm^3$) | Mass content of the first positive electrode active material in the positive electrode active material # | Mass content of the second positive electrode active material in the positive electrode active material # |
|---|---|---|---|---|---|---|---|---|
| Positive electrode sheet P1 | 1 | Preparation Embodiment 1 | 1 | Preparation Embodiment 1 | 0.168 | 2.50 | 100% | — |
| Positive electrode sheet P2 | 1 | Preparation Embodiment 43 | 1 | Preparation Embodiment 43 | 0.138 | 3.10 | — | 100% |
| Positive electrode sheet P3 | 1 | Preparation Embodiment 1 | 1 | Preparation Embodiment 43 | 0.169 | 2.50 | 50% | 50% |
| Positive electrode sheet P4 | 1 | Preparation Embodiment 44 | 1 | Preparation Embodiment 44 | 0.151 | 2.80 | 50% | 50% |
| Positive electrode sheet P5 | 1 | Preparation Embodiment 1 | 1 | Preparation Embodiment 44 | 0.168 | 2.50 | 75% | 25% |
| Positive electrode sheet P6 | 1 | Preparation Embodiment 43 | 1 | Preparation Embodiment 44 | 0.145 | 2.95 | 25% | 75% |
| Positive electrode sheet P7 | 2 | Layer 1*: Preparation Embodiment 1 Layer 2*: Preparation Embodiment 43 | 2 | Layer 1 Preparation Embodiment 1 Layer 2: Preparation Embodiment 43 | 0.169 | 2.50 | 50% | 50% |
| Positive electrode sheet P8 | 2 | Layer 1: Preparation Embodiment 43 Layer 2: Preparation Embodiment 1 | 2 | Layer 1 Preparation Embodiment 43 Layer 2: Preparation Embodiment 1 | 0.169 | 2.50 | 50% | 50% |
| Positive electrode sheet P9 | 2 | Layer 1: Preparation Embodiment 1 Layer 2: Preparation Embodiment 44 | 2 | Layer 1: Preparation Embodiment 1 Layer 2: Preparation Embodiment 44 | 0.168 | 2.50 | 75% | 25% |
| Positive electrode sheet P10 | 2 | Layer 1: Preparation Embodiment 44 Layer 2: Preparation Embodiment 1 | 2 | Layer 1: Preparation Embodiment 44 Layer 2: Preparation Embodiment 1 | 0.161 | 2.65 | 75% | 25% |
| Positive electrode sheet P11 | 2 | Layer 1: Preparation Embodiment 43 Layer 2: Preparation Embodiment 44 | 2 | Layer 1: Preparation Embodiment 43 Layer 2: Preparation Embodiment 44 | 0.145 | 2.95 | 25% | 75% |
| Positive electrode sheet P12 | 2 | Layer 1: Preparation Embodiment 44 Layer 2: Preparation Embodiment 43 | 2 | Layer 1: Preparation Embodiment 44 Layer 2: Preparation Embodiment 43 | 0.145 | 2.95 | 25% | 75% |
| Positive electrode sheet P13 | 2 | Layer 1: Preparation Embodiment 1 Layer 2: Preparation Embodiment 43 | 1 | Preparation Embodiment 1 | 0.168 | 2.50 | 75% | 25% |
| Positive electrode sheet P14 | 2 | Layer 1: Preparation Embodiment 1 Layer 2: | 1 | Preparation Embodiment 43 | 0.168 | 2.50 | 25% | 75% |

TABLE 9-continued

| Positive electrode sheet parameters | | | | | | | | |
|---|---|---|---|---|---|---|---|---|
| Positive electrode sheet | The number of positive electrode film layers on the A side of the aluminum foil | Positive electrode active material on the A side of the aluminum foil | The number of positive electrode film layers on the B side of the aluminum foil | Positive electrode active material on the B side of the aluminum foil | Thickness of the positive electrode sheet (mm) | Density of the positive electrode sheet (g/cm$^3$) | Mass content of the first positive electrode active material in the positive electrode active material # | Mass content of the second positive electrode active material in the positive electrode active material # |
| | | Preparation Embodiment 43 | | | | | | |
| Positive electrode sheet P15 | 2 | Layer 1: Preparation Embodiment 1 Layer 2: Preparation Embodiment 43 | 1 | Preparation Embodiment 44 | 0.169 | 2.50 | 50% | 50% |
| Positive electrode sheet P16 | 2 | Layer 1: Preparation Embodiment 43 Layer 2: Preparation Embodiment 1 | 1 | Preparation Embodiment 1 | 0.168 | 2.50 | 75% | 25% |
| Positive electrode sheet P17 | 2 | Layer 1: Preparation Embodiment 43 Layer 2: Preparation Embodiment 1 | 1 | Preparation Embodiment 43 | 0.145 | 2.95 | 25% | 75% |
| Positive electrode sheet P18 | 2 | Layer 1: Preparation Embodiment 43 Layer 2: Preparation Embodiment 1 | 1 | Preparation Embodiment 44 | 0.151 | 2.80 | 50% | 50% |
| Positive electrode sheet P19 | 2 | Layer 1: Preparation Embodiment 1 Layer 2: Preparation Embodiment 44 | 1 | Preparation Embodiment 1 | 0.168 | 2.50 | 87.5% | 12.5% |
| Positive electrode sheet P20 | 2 | Layer 1: Preparation Embodiment 1 Layer 2: Preparation Embodiment 44 | 1 | Preparation Embodiment 43 | 0.169 | 2.50 | 37.5% | 62.5% |
| Positive electrode sheet P21 | 2 | Layer 1: Preparation Embodiment 1 Layer 2: Preparation Embodiment 44 | 1 | Preparation Embodiment 44 | 0.168 | 2.50 | 62.5% | 37.5% |
| Positive electrode sheet P22 | 2 | Layer 1: Preparation Embodiment 44 Layer 2: Preparation Embodiment 1 | 1 | Preparation Embodiment 1 | 0.168 | 2.50 | 87.5% | 12.5% |
| Positive electrode sheet P23 | 2 | Layer 1: Preparation Embodiment 44 Layer 2: Preparation Embodiment 1 | 1 | Preparation Embodiment 43 | 0.148 | 2.88 | 37.5% | 62.5% |
| Positive electrode sheet P24 | 2 | Layer 1: Preparation Embodiment 44 Layer 2: Preparation Embodiment 1 | 1 | Preparation Embodiment 44 | 0.155 | 2.73 | 62.5% | 37.5% |
| Positive electrode | 2 | Layer 1: Preparation | 1 | Preparation Embodiment 1 | 0.168 | 2.50 | 62.5% | 37.5% |

TABLE 9-continued

Positive electrode sheet parameters

| Positive electrode sheet | The number of positive electrode film layers on the A side of the aluminum foil | Positive electrode active material on the A side of the aluminum foil | The number of positive electrode film layers on the B side of the aluminum foil | Positive electrode active material on the B side of the aluminum foil | Thickness of the positive electrode sheet (mm) | Density of the positive electrode sheet (g/cm$^3$) | Mass content of the first positive electrode active material in the positive electrode active material # | Mass content of the second positive electrode active material in the positive electrode active material # |
|---|---|---|---|---|---|---|---|---|
| sheet P25 | | Embodiment 43 Layer 2: Preparation Embodiment 44 | | | | | | |
| Positive electrode sheet P26 | 2 | Layer 1: Preparation Embodiment 43 Layer 2: Preparation Embodiment 44 | 1 | Preparation Embodiment 43 | 0.142 | 3.03 | 12.5% | 87.5% |
| Positive electrode sheet P27 | 2 | Layer 1: Preparation Embodiment 43 Layer 2: Preparation Embodiment 44 | 1 | Preparation Embodiment 44 | 0.148 | 2.88 | 37.5% | 62.5% |
| Positive electrode sheet P28 | 2 | Layer 1: Preparation Embodiment 44 Layer 2: Preparation Embodiment 43 | 1 | Preparation Embodiment 1 | 0.168 | 2.50 | 62.5% | 37.5% |
| Positive electrode sheet P29 | 2 | Layer 1: Preparation Embodiment 44 Layer 2: Preparation Embodiment 43 | 1 | Preparation Embodiment 43 | 0.142 | 3.03 | 12.5% | 87.5% |
| Positive electrode sheet P30 | 2 | Layer 1: Preparation Embodiment 44 Layer 2: Preparation Embodiment 43 | 1 | Preparation Embodiment 44 | 0.148 | 2.88 | 37.5% | 62.5% |
| Positive electrode sheet P31 | 1 | Preparation Embodiment 45 | 1 | Preparation Embodiment 45 | 0.138 | 3.10 | — | 100% |
| Positive electrode sheet P32 | 1 | Preparation Embodiment 46 | 1 | Preparation Embodiment 46 | 0.138 | 3.10 | — | 100% |
| Positive electrode sheet P33 | 1 | Preparation Embodiment 47 | 1 | Preparation Embodiment 47 | 0.138 | 3.10 | — | 100% |
| Positive electrode sheet P34 | 1 | Preparation Embodiment 48 | 1 | Preparation Embodiment 48 | 0.138 | 3.10 | — | 100% |
| Positive electrode sheet P35 | 1 | Preparation Embodiment 49 | 1 | Preparation Embodiment 49 | 0.138 | 3.10 | — | 100% |
| Positive electrode sheet P36 | 1 | Preparation Embodiment 50 | 1 | Preparation Embodiment 50 | 0.138 | 3.10 | — | 100% |
| Positive electrode sheet P37 | 1 | Preparation Embodiment 51 | 1 | Preparation Embodiment 51 | 0.151 | 2.80 | 50% | 50% |
| Positive electrode sheet P38 | 1 | Preparation Embodiment 52 | 1 | Preparation Embodiment 52 | 0.151 | 2.80 | 50% | 50% |
| Positive electrode sheet P39 | 1 | Preparation Embodiment 53 | 1 | Preparation Embodiment 53 | 0.151 | 2.80 | 50% | 50% |
| Positive electrode sheet P40 | 1 | Preparation Embodiment 54 | 1 | Preparation Embodiment 54 | 0.151 | 2.80 | 50% | 50% |

TABLE 9-continued

| Positive electrode sheet parameters | | | | | | | | | |
|---|---|---|---|---|---|---|---|---|---|
| Positive electrode sheet | The number of positive electrode film layers on the A side of the aluminum foil | Positive electrode active material on the A side of the aluminum foil | The number of positive electrode film layers on the B side of the aluminum foil | Positive electrode active material on the B side of the aluminum foil | Thickness of the positive electrode sheet (mm) | Density of the positive electrode sheet ($g/cm^3$) | Mass content of the first positive electrode active material in the positive electrode active material # | Mass content of the second positive electrode active material in the positive electrode active material # |
| Positive electrode sheet P41 | 1 | Preparation Embodiment 55 | 1 | Preparation Embodiment 55 | 0.151 | 2.80 | 50% | 50% |
| Positive electrode sheet P42 | 1 | Preparation Embodiment 56 | 1 | Preparation Embodiment 56 | 0.151 | 2.80 | 50% | 50% |

*Layer 1 refers to the layer in contact with the surface of the aluminum foil, and layer 2 refers to the layer provided on layer 1.

#: The first positive electrode active material is the positive electrode active material prepared in Preparation Embodiment 1, and the second positive electrode active material is the positive electrode active material of Preparation Embodiment 43, Preparation Embodiment 45, Preparation Embodiment 46, Preparation Embodiment 47, Preparation Embodiment 48, Preparation Embodiment 49 or Preparation Embodiment 50.

Preparation of Negative Electrode Sheet

The negative electrode active materials artificial graphite, conductive agent superconduction carbon black (Super-P), binder styrene-butadiene rubber (SBR), thickener sodium carboxymethyl cellulose (CMC-Na) in a mass ratio of 95%:1.5%:1.8%:1.7% were dissolved in deionized water, sufficiently stirred and mixed to obtain a negative electrode slurry with a viscosity of 3000 mPa·s and a solid content of 52%; the negative electrode slurry was coated on a 6 μm negative electrode current collector copper foil, then oven dried at 100° C. for 4 h, and rolled to obtain a negative electrode sheet with a compacted density of 1.75 $g/cm^3$.

Separator

A polypropylene film was used.

Preparation of Electrolyte Solution

Ethylene carbonate, dimethyl carbonate, and 1,2-propylene glycol carbonate were mixed in a volume ratio of 1:1:1, and then $LiPF_6$ was uniformly mixed in the above solution to obtain an electrolyte solution. In the electrolyte solution, the concentration of $LiPF_6$ is 1 mol/L.

Preparation of Full-Battery

Using the above-mentioned positive electrode sheet, according to the sequence of negative electrode sheet, separator, and positive electrode sheet, the bare battery core was formed by winding method, and the aluminum tab and copper tab were respectively punched out to obtain the bare battery cell; the copper and copper tabs, aluminum and aluminum tabs of two bare battery cells were welded onto the top cover of the battery, the bare battery cells were wrapped and insulated, put into an aluminum shell, and the top cover and the aluminum shell were welded together to form a dry battery cell; the dry battery cell was baked to remove water, then the electrolyte solution was injected, and the battery was subjected to formation and aging, correspondingly obtaining a full-battery. Among them, the battery structures made using the positive electrode sheets P1, P2, P3, P8, P10, P11, P12, P17, P18, P23, P24, P26, and P27 are as shown in FIGS. 8-20.

Preparation of Button Battery

The above-mentioned positive electrode sheet, negative electrode and electrolyte solution were assembled into a button-type battery (hereinafter also referred to as "button battery") in a button box.

I. Performance Test of Positive Electrode Active Material

1. Lattice Change Rate Test Method:

In a constant temperature environment of 25° C., a positive electrode active material sample was placed in an XRD (model Bruker D8 Discover), and the sample was tested at 1°/min. The test data was analyzed. With reference to a standard PDF card, the lattice constants a0, b0, c0, and v0 at the time were calculated (a0, b0, and c0 represent the lengths in all aspects of the unit cell, and v0 represents the unit cell volume, which can be obtained directly from the XRD refined results).

The positive electrode active material sample was prepared into a button battery by using the above-mentioned method for preparing a button battery. The button battery was charged at a small rate of 0.05 C until the current was reduced to 0.01 C. Then the positive electrode sheet in the button battery was removed and soaked in dimethyl carbonate (DMC) for 8 h. After oven drying, a powder was scraped off, and the particles with a particle size less than 500 nm were sieved. A sample was taken and its unit cell volume v1 was calculated in the same way as the fresh sample tested above. The lattice change rate (unit cell volume change rate) before and after complete intercalation and deintercalation of lithium was calculated by (v0−v1)/v0×100%.

2. Determination of Li/Mn Antisite Defect Concentration:

The Li/Mn antisite defect concentration was obtained by comparing the XRD results tested in the "Lattice change rate measurement method" with the PDF (Powder Diffraction File) card of a standard crystal. Specifically, the XRD results tested in the "Lattice change rate measurement method" were imported into the General Structural Analysis System (GSAS) software, and the refined results were automatically obtained, which included the occupancy of different atoms. The Li/Mn antisite defect concentration was obtained by reading the refined results.

3. Determination of Compacted Density 5 g of the above-prepared positive electrode active material powder was placed in a special compaction mold (CARVER (U.S.) mold, 13 mm), and then the mold was placed on a compacted density test instrument. A pressure of 3T was applied, the thickness of the powder under pressure (thickness after pressure relief) was read on the instrument, and the compacted density was calculated by ρ=m/v, where the area used was the standard small picture area of 1540.25 $mm^2$.

4. Determination of Capacity Rate of Constant-Current Charging at 3C

In a constant-temperature environment of 25° C., the fresh whole batteries prepared in the above preparation Embodiments and Comparative Embodiments were allowed to stand for 5 min, and discharged to 2.5V at 1/3 C. The battery was allowed to stand for 5 min, charged to 4.3V at 1/3 C, and then charged at a constant voltage of 4.3V until the current was less than or equal to 0.05 mA. After standing for 5 min, the charging capacity at this time was recorded as CO. The battery was discharged to 2.5V at 1/3 C, allowed to stand for 5 min, then charged to 4.3V at 3 C, and allowed to stand for 5 minutes. The charging capacity at this time was recorded as C1. The capacity rate of constant-current charging at 3C is C1/C0×100%.

The higher the capacity rate of constant-current charging at 3C is, the better the rate performance of the secondary battery will be.

5. Dissolution Test of Transition Metal Mn (and Fe Doped at the Position of Mn):

The whole batteries prepared with the positive electrode active materials in the above preparation Embodiments and Comparative Embodiments that were cycled at 45° C. until the capacity was attenuated to 80% were discharged to a cut-off voltage of 2.0V at a rate of 0.1 C. Then the battery was disassembled, the negative electrode sheet was removed, 30 circular pieces of unit area (1540.25 mm 2) were randomly taken from the negative electrode sheet, and the inductively coupled plasma emission spectrometry (ICP) was tested on Agilent ICP-OES730. The amounts of Fe (if Fe is doped at the position of Mn of the positive electrode active material) and Mn were calculated from the ICP results, thereby calculating the amount of Mn (and Fe doped at the position of Mn) dissolved out after cycling. The test standard was based on EPA-6010D-2014.

6. Determination of Surface Oxygen Valence g of the above-prepared positive electrode active material sample was prepared into a button battery according to the button battery preparation method described above. The button battery was charged at a small rate of 0.05 C until the current decreased to 0.01 C. Then the positive electrode sheet in the button battery was removed and soaked in DMC for 8 h. After oven drying, a powder was scraped off, and the particles with a particle size less than 500 nm were sieved. The obtained particles were measured by electron energy loss spectroscopy (EELS, the instrument used was Talos F200S) to obtain the energy loss near-edge structure (ELNES), which reflects the density of states and energy level distribution of elements. Based on the density of states and energy level distribution, the valence band density of states was integrated to calculate the number of electrons occupied, thereby deriving the valence of surface oxygen after charging.

7. Measurement of Elements Manganese and Phosphorus in Positive Electrode Active Materials:

5 g of the above-prepared positive electrode active material was dissolved in 100 ml of inverse aqua regia (concentrated hydrochloric acid: concentrated nitric acid=1:3) (concentration of concentrated hydrochloric acid: about 37%, concentration of concentrated nitric acid: about 65%), and ICP was used to test the content of each of the elements in the solution. The content of element manganese or element phosphorus was measured and converted (the amount of element manganese or element phosphorus/the amount of positive electrode active material*100%) to obtain its weight proportion.

8. Measurement Method of Initial Gram Capacity of Button Battery:

At 2.5-4.3 V, the button batteries prepared in the above preparation Embodiments and Comparative Embodiments were charged to 4.3V at 0.1 C, and then charged at a constant voltage of 4.3V until the current was less than or equal to 0.05 mA, left to stand for 5 min, and then discharged at 0.1 C to 2.0V. The discharge capacity at this time was the initial gram capacity, recorded as DO.

9. Battery Cell Expansion Test of Full-Battery Stored at 60° C. for 30 Days:

The full-battery prepared in each of the above preparation Embodiments and Comparative Embodiments was stored at 100% state of charge (SOC) at 60° C. The open circuit voltage (OCV) and AC internal resistance (IMP) of the battery cells were measured before, after and during storage to monitor SOC, and the battery cell volume was measured. The full-battery was taken out after every 48 h of storage, and the open circuit voltage (OCV) and internal resistance (IMP) were tested after standing for 1 h. The volume of the battery cell was measured by displacement of water after cooling to room temperature. In the displacement of water, the gravity $F_1$ of the battery cell was measured firstly with a balance that automatically performs unit conversion of the dial data. Then the battery cell was completely placed in deionized water (the density is known to be 1 g/$cm^3$). The gravity $F_2$ of the battery cell at this time was measured. The buoyancy Floating on the battery cell is $F_1$-$F_2$, and then according to Archimedes' principle $F_{floating}$=ρ×g×$V_{displacement}$, the battery cell volume $V=(F_1-F_2)/(ρ×g)$ was calculated.

From the OCV and IMP test results, it can be seen that the batteries of all the Embodiments always maintained a SOC of 99% or higher during the experiment till the end of storage.

After 30 days of storage, the battery cell volume was measured and the percentage increase in the battery cell volume after storage relative to the battery cell volume before storage was calculated.

10. Full-Battery Cycling Performance Test at 45° C.:

In a constant-temperature environment of 45° C., at 2.5-4.3V, the battery was charged to 4.3V at 1C, then charged at a constant voltage of 4.3V until the current was ≤0.05 mA. The battery was allowed to stand for 5 min, and then discharged at 1C to 2.5V. The capacity was recorded as $D_n$ (n=0, 1, 2, . . . ). The foregoing process was repeated until the capacity was faded to 80%, and the number of cycles at this time was recorded, which was the number of cycles corresponding to the 80% capacity retention rate at 45° C.

11. Interplanar Spacing and Angle Test:

1 g of the above prepared positive electrode active material powder was put into a 50 mL test tube, 10 mL of 75% (mass fraction) alcohol was injected into the test tube, and then the mixture was sufficiently stirred to disperse the powder for 30 min. Then an appropriate amount of the solution was taken by a clean disposable plastic pipette and dropped on a 300-mesh copper screen. At this time, some of the powder remained on the copper screen. The copper screen with the sample was transferred to a TEM (Tabs F200s G2) sample cavity and tested. An original TEM image was obtained and the original image format (xx.dm3) was saved.

The original image obtained from the TEM test was opened in the DigitalMicrograph software, and underwent Fourier transform (after clicking the operation, it would be automatically completed by the software) to obtain a diffraction pattern. The distance from a diffraction spot to the center position in the diffraction pattern was measured to obtain the interplanar spacing, and the angle was calculated according to the Bragg equation.

By comparing the obtained interplanar spacing and corresponding angle data with their standard values, the substances and crystalline states of different cladding layers can be identified.

12. Cladding Layer Thickness Test:

The thickness of the cladding layer was tested as follows: a thin slice with a thickness of about 100 nm by FIB from a middle part of single particles of the positive electrode active material prepared above was cut, and then the thin slice was tested by TEM to obtain an original TEM image. The original image format (xx.dm3) was saved.

The original image obtained from the above TEM test was opened in the DigitalMicrograph software, the cladding layer was identified according to the lattice spacing and angle information, and the thickness of the cladding layer was measured.

Thicknesses at three locations were measured on the selected particles and averaged.

13. Determination of Molar Ratio of SP2 Hybridized Carbon to SP3 Hybridized Carbon in the Third Cladding Layer:

This test was performed by Raman spectroscopy. The spectrum of the Raman test was split, to obtain Id/Ig, where Id is the peak intensity of SP3 hybridized carbon, and Ig is the peak intensity of SP2 hybridized carbon, thereby determining the molar ratio of the two.

14. Determination of the Chemical Formula of Inner Core and the Composition of Different Cladding Layers:

A spherical aberration electron microscope (ACSTEM) was used to characterize the internal microstructure and surface structure of the positive electrode active material with high spatial resolution, combined with three-dimensional reconstruction technology to obtain the chemical formula of the inner core of the positive electrode active material and the composition of different cladding layers.

The performance test results for the positive electrode active materials of the preparation Embodiments and Comparative Embodiments are shown in the table below.

TABLE 10

Performance of positive electrode active material powders in Preparation Embodiments 1-29 and Comparative Embodiments 1-17, and battery performance

| | Performance of positive electrode active material powder | | | | | | Battery performance | | |
|---|---|---|---|---|---|---|---|---|---|
| No. | Lattice change rate (%) | Li/Mn antisite defect concentration (%) | Compacted density (g/cm$^3$) | Surface oxygen valence | Capacity rate of constant-current charging at 3 C (%) | Dissolution of Mn and Fe after cycling (ppm) | Capacity of button battery at 0.1 C (mAh/g) | Battery cell expansion rate (%) after storage at 60° C. for 30 d | Cycle number for 80% of capacity retention rate (%) at 45° C. |
| Comparative Embodiment 1 | 11.4 | 5.2 | 1.5 | −1.55 | 50.1 | 2060 | 125.6 | 48.6 | 185 |
| Comparative Embodiment 2 | 10.6 | 3.3 | 1.67 | −1.51 | 54.9 | 1810 | 126.4 | 47.3 | 243 |
| Comparative Embodiment 3 | 10.8 | 3.4 | 1.64 | −1.64 | 52.1 | 1728 | 144.7 | 41.9 | 378 |
| Comparative Embodiment 4 | 4.3 | 2.8 | 1.69 | −1.82 | 56.3 | 1096 | 151.2 | 8.4 | 551 |
| Comparative Embodiment 5 | 2.8 | 2.5 | 1.65 | −1.85 | 58.2 | 31 | 148.4 | 7.5 | 668 |
| Comparative Embodiment 6 | 3.4 | 2.4 | 1.61 | −1.86 | 58.4 | 64 | 149.6 | 8.6 | 673 |
| Comparative Embodiment 7 | 4.5 | 2.4 | 1.73 | −1.83 | 59.2 | 85 | 148.6 | 8.3 | 669 |
| Comparative Embodiment 8 | 2.3 | 2.4 | 1.68 | −1.89 | 59.3 | 30 | 152.3 | 7.3 | 653 |
| Comparative Embodiment 9 | 2.3 | 2.4 | 1.75 | −1.89 | 59.8 | 30 | 152.3 | 7.3 | 672 |
| Comparative Embodiment 10 | 2.3 | 2.2 | 1.81 | −1.9 | 64.1 | 28 | 154.2 | 7.2 | 685 |
| Comparative Embodiment 11 | 2.3 | 2.2 | 1.92 | −1.92 | 65.4 | 12 | 154.3 | 5.4 | 985 |
| Comparative Embodiment 12 | 2.3 | 2.1 | 1.95 | −1.95 | 65.5 | 18 | 154.6 | 4.2 | 795 |
| Comparative Embodiment 13 | 11.4 | 5.2 | 1.63 | −1.96 | 52.4 | 56 | 130.2 | 5.4 | 562 |
| Comparative Embodiment 14 | 8.1 | 3.8 | 1.76 | −1.96 | 58.3 | 41 | 135.1 | 5.1 | 631 |
| Comparative Embodiment 15 | 2 | 1.8 | 2.13 | −1.96 | 61.3 | 8 | 154.3 | 3.7 | 1126 |
| Comparative Embodiment 16 | 2 | 1.9 | 1.95 | −1.96 | 60.5 | 18 | 152.7 | 4.5 | 1019 |
| Comparative Embodiment 17 | 2 | 1.9 | 1.9 | −1.89 | 60.4 | 24 | 152.4 | 5.1 | 897 |
| Preparation Embodiment 1 | 2.5 | 1.8 | 2.35 | −1.93 | 70.3 | 7 | 157.2 | 4.2 | 1128 |
| Preparation Embodiment 2 | 2.5 | 1.8 | 2.24 | −1.94 | 70.2 | 6 | 156.3 | 3.7 | 1253 |

TABLE 10-continued

Performance of positive electrode active material powders in Preparation Embodiments 1-29 and Comparative Embodiments 1-17, and battery performance

| No. | Performance of positive electrode active material powder: Lattice change rate (%) | Li/Mn antisite defect concentration (%) | Compacted density (g/cm$^3$) | Surface oxygen valence | Capacity rate of constant-current charging at 3 C (%) | Dissolution of Mn and Fe after cycling (ppm) | Battery performance: Capacity of button battery at 0.1 C (mAh/g) | Battery cell expansion rate (%) after storage at 60° C. for 30 d | Cycle number for 80% of capacity retention rate (%) at 45° C. |
|---|---|---|---|---|---|---|---|---|---|
| Preparation Embodiment 3 | 2.5 | 1.8 | 2.22 | −1.94 | 70.1 | 5 | 155.4 | 3.4 | 1374 |
| Preparation Embodiment 4 | 2.5 | 1.8 | 2.21 | −1.95 | 70.2 | 3 | 153.7 | 2.9 | 1406 |
| Preparation Embodiment 5 | 2.5 | 1.8 | 2.33 | −1.93 | 70.1 | 5 | 156.7 | 3.1 | 1501 |
| Preparation Embodiment 6 | 2.5 | 1.8 | 2.31 | −1.93 | 69.7 | 4 | 156.2 | 2.8 | 1576 |
| Preparation Embodiment 7 | 2.5 | 1.8 | 2.28 | −1.93 | 68.4 | 3 | 155.8 | 2.5 | 1647 |
| Preparation Embodiment 8 | 2.5 | 1.8 | 2.29 | −1.93 | 69.1 | 9 | 156.4 | 3.4 | 1058 |
| Preparation Embodiment 9 | 2.5 | 1.8 | 2.46 | −1.98 | 73.4 | 6 | 157.6 | 2.9 | 1286 |
| Preparation Embodiment 10 | 2.5 | 1.8 | 2.49 | −1.98 | 75.4 | 5 | 157.8 | 2.5 | 1486 |
| Preparation Embodiment 11 | 2.6 | 1.9 | 2.38 | −1.97 | 72.4 | 6 | 157.3 | 3.5 | 1026 |
| Preparation Embodiment 12 | 2.4 | 1.8 | 2.41 | −1.97 | 74.5 | 4 | 156.3 | 2.5 | 1136 |
| Preparation Embodiment 13 | 2.7 | 1.9 | 2.42 | −1.97 | 75.3 | 5 | 156.6 | 3.5 | 1207 |
| Preparation Embodiment 14 | 2.8 | 1.9 | 2.45 | −1.97 | 76.5 | 3 | 153.8 | 3.7 | 1308 |
| Preparation Embodiment 15 | 2.2 | 1.9 | 2.46 | −1.97 | 74.3 | 3 | 153.8 | 3.7 | 1109 |
| Preparation Embodiment 16 | 2.1 | 1.9 | 2.47 | −1.98 | 73.1 | 5 | 154.2 | 3.8 | 1132 |
| Preparation Embodiment 17 | 2.5 | 1.7 | 2.41 | −1.98 | 75.3 | 4 | 155.4 | 4.5 | 1258 |
| Preparation Embodiment 18 | 2.3 | 1.6 | 2.42 | −1.97 | 76.1 | 4 | 154.3 | 4.7 | 1378 |
| Preparation Embodiment 19 | 2.2 | 1.7 | 2.43 | −1.97 | 76.8 | 4 | 154.3 | 4.7 | 1328 |
| Preparation Embodiment 20 | 2.6 | 1.8 | 2.42 | −1.94 | 75.4 | 4 | 153.9 | 3.3 | 1458 |
| Preparation Embodiment 21 | 2.4 | 1.7 | 2.41 | −1.97 | 76.1 | 4 | 154.5 | 3.5 | 1327 |
| Preparation Embodiment 22 | 2.4 | 1.8 | 2.32 | −1.95 | 72.1 | 2 | 152.1 | 2.7 | 1556 |
| Preparation Embodiment 23 | 2.3 | 1.7 | 2.46 | −1.96 | 76.4 | 3 | 151.4 | 2.4 | 1645 |
| Preparation Embodiment 24 | 2.2 | 1.8 | 2.47 | −1.95 | 76.3 | 3 | 152.1 | 2.5 | 1548 |
| Preparation Embodiment 25 | 2.1 | 1.7 | 2.49 | −1.98 | 78.4 | 3 | 158.6 | 2.9 | 1538 |
| Preparation Embodiment 26 | 3.6 | 2.5 | 2.21 | −1.97 | 56.4 | 8 | 152.3 | 4.8 | 1017 |
| Preparation Embodiment 27 | 2.8 | 2.1 | 2.24 | −1.98 | 74.3 | 6 | 155.4 | 3.8 | 1126 |
| Preparation Embodiment 28 | 2.5 | 1.9 | 1.95 | −1.94 | 54.7 | 9 | 154.9 | 6.4 | 986 |
| Preparation Embodiment 29 | 2.4 | 1.8 | 1.98 | −1.95 | 68.4 | 7 | 155.6 | 4.5 | 1047 |

It can be seen from Table 10 that compared with the Comparative Embodiments, a smaller lattice change rate, a smaller Li/Mn antisite defect concentration, a larger compacted density, and a surface oxygen valence closer to −2, less Mn and Fe dissolution after cycling, and better battery performance, such as better high temperature storage performance and high temperature cycling performance are achieved in the preparation Embodiments.

TABLE 11

Thickness of each layer and weight ratio of elements manganese and phosphorus in positive electrode active materials prepared in Preparation Embodiments 1-14 and Comparative Embodiments 3-4, and 12

| No. | Inner core | First cladding layer | Second cladding layer | Third cladding layer | First cladding layer thickness (nm) | Second cladding layer thickness (nm) | Third cladding layer thickness (nm) | Content of element Mn (wt %) | Weight ratio of elements Mn and P |
|---|---|---|---|---|---|---|---|---|---|
| Comparative Embodiment 3 | $LiMn_{0.80}Fe_{0.20}PO_4$ | 2% amorphous $Li_2FeP_2O_7$ | — | 2% carbon | 4 | — | 10 | 26.1 | 1.383 |
| Comparative Embodiment 4 | $LiMn_{0.70}Fe_{0.295}V_{0.005}PO_4$ | — | — | 1% carbon | — | — | 5 | 24.3 | 1.241 |
| Comparative Embodiment 12 | $Li_{0.999}Mn_{0.60}Fe_{0.393}V_{0.004}Co_{0.003}P_{0.999}S_{0.001}O_4$ | — | 3% crystalline $LiFePO_4$ | 1% carbon | — | 7.5 | 5 | 19.6 | 1.034 |
| Preparation Embodiment 1 | $Li_{0.997}Mn_{0.60}Fe_{0.393}V_{0.004}Co_{0.003}P_{0.997}S_{0.003}O_4$ | 1% $Li_2FeP_2O_7$ | 3% $LiFePO_4$ | 1% carbon | 2 | 7.5 | 5 | 19.0 | 1.023 |
| Preparation Embodiment 2 | $Li_{0.997}Mn_{0.60}Fe_{0.393}V_{0.004}Co_{0.003}P_{0.997}S_{0.003}O_4$ | 1% $Li_2FeP_2O_7$ | 3% $LiFePO_4$ | 3% carbon | 2 | 7.5 | 15 | 18.3 | 1.023 |
| Preparation Embodiment 3 | $Li_{0.997}Mn_{0.60}Fe_{0.393}V_{0.004}Co_{0.003}P_{0.997}S_{0.003}O_4$ | 1% $Li_2FeP_2O_7$ | 3% $LiFePO_4$ | 4% carbon | 2 | 7.5 | 20 | 18.0 | 1.023 |
| Preparation Embodiment 4 | $Li_{0.997}Mn_{0.60}Fe_{0.393}V_{0.004}Co_{0.003}P_{0.997}S_{0.003}O_4$ | 1% $Li_2FeP_2O_7$ | 3% $LiFePO_4$ | 5% carbon | 2 | 7.5 | 25 | 17.9 | 1.023 |
| Preparation Embodiment 5 | $Li_{0.997}Mn_{0.60}Fe_{0.393}V_{0.004}Co_{0.003}P_{0.997}S_{0.003}O_4$ | 2% $Li_2FeP_2O_7$ | 3% $LiFePO_4$ | 1% carbon | 4 | 7.5 | 5 | 18.7 | 1.011 |
| Preparation Embodiment 6 | $Li_{0.997}Mn_{0.60}Fe_{0.393}V_{0.004}Co_{0.003}P_{0.997}S_{0.003}O_4$ | 3% $Li_2FeP_2O_7$ | 3% $LiFePO_4$ | 1% carbon | 6 | 7.5 | 5 | 18.3 | 0.999 |
| Preparation Embodiment 7 | $Li_{0.997}Mn_{0.60}Fe_{0.393}V_{0.004}Co_{0.003}P_{0.997}S_{0.003}O_4$ | 5% $Li_2FeP_2O_7$ | 3% $LiFePO_4$ | 1% carbon | 10 | 7.5 | 5 | 17.6 | 0.975 |
| Preparation Embodiment 8 | $Li_{0.997}Mn_{0.60}Fe_{0.393}V_{0.004}Co_{0.003}P_{0.997}S_{0.003}O_4$ | 1% $Li_2FeP_2O_7$ | 1% $LiFePO_4$ | 1% carbon | 2 | 2.5 | 5 | 19.8 | 1.043 |
| Preparation Embodiment 9 | $Li_{0.997}Mn_{0.60}Fe_{0.393}V_{0.004}Co_{0.003}P_{0.997}S_{0.003}O_4$ | 1% $Li_2FeP_2O_7$ | 4% $LiFePO_4$ | 1% carbon | 2 | 10 | 5 | 18.7 | 1.014 |
| Preparation Embodiment 10 | $Li_{0.997}Mn_{0.60}Fe_{0.393}V_{0.004}Co_{0.003}P_{0.997}S_{0.003}O_4$ | 1% $Li_2FeP_2O_7$ | 5% $LiFePO_4$ | 1% carbon | 2 | 12.5 | 5 | 18.4 | 1.004 |
| Preparation Embodiment 11 | $Li_{1.001}Mn_{0.60}Fe_{0.393}V_{0.004}Co_{0.003}P_{0.999}Si_{0.001}O_4$ | 1% $Li_2FeP_2O_7$ | 2.50% $LiFePO_4$ | 1.5% carbon | 2 | 6.3 | 7.5 | 19.0 | 1.026 |
| Preparation Embodiment 13 | $Li_{0.995}Mn_{0.65}Fe_{0.341}V_{0.004}Co_{0.005}P_{0.995}S_{0.005}O_4$ | 2% $Li_2FeP_2O_7$ | 2% $LiFePO_4$ | 2% carbon | 4 | 5 | 10 | 18.7 | 1.108 |
| Preparation Embodiment 14 | $Li_{1.002}Mn_{0.70}Fe_{0.293}V_{0.004}Co_{0.003}P_{0.998}Si_{0.002}O_4$ | 2.5% $Li_2FeP_2O_7$ | 3.50% $LiFePO_4$ | 2.5% carbon | 5 | 8.8 | 12.5 | 17.8 | 1.166 |

It can be seen from Table 11 that by doping at the positions of manganese and phosphorus of lithium manganese iron phosphate (containing 35% of manganese and about 20% of phosphorus) and three-layer cladding, the content of element manganese in the positive electrode active material and the weight ratio of elements manganese and phosphorus in the positive electrode active material are obviously reduced. In addition, by comparing Preparation Embodiments 1-14 with Comparative Embodiment 3, Comparative Embodiment 4, and Comparative Embodiment 12, it can be seen from table 11 that the reduction in the ratio of elements manganese and phosphorus in the positive electrode active material will lead to a decrease in the dissolution of manganese and iron and an improvement in the battery performance of the prepared secondary battery.

TABLE 12

Performance of positive electrode active material powder and battery performance in Preparation Embodiments 30-42

| Preparation Embodiment No. | Performance of positive electrode active material powder: Lattice change rate (%) | Li/Mn antisite defect concentration (%) | Compacted density (g/cm$^3$) | Surface oxygen valence | Capacity rate of constant - current charging at 3 C (%) | Dissolution of Mn and Fe after cycling (ppm) | Battery performance: Capacity of button battery at 0.1 C | Battery cell expansion rate (%) after storage at 60° C. for 30 d | Cycle number for 80% of capacity retention rate (%) at 45° C. |
|---|---|---|---|---|---|---|---|---|---|
| Preparation Embodiment 1 | 2.5 | 1.8 | 2.35 | −1.93 | 70.3 | 7 | 157.2 | 4.2 | 1128 |
| Preparation Embodiment 30 | 2.4 | 1.9 | 2.36 | −1.97 | 68.7 | 15 | 156.2 | 4.8 | 1018 |
| Preparation Embodiment 31 | 2.5 | 1.7 | 2.36 | −1.96 | 70.1 | 12 | 155.6 | 4.6 | 1087 |
| Preparation Embodiment 32 | 2.5 | 1.7 | 2.38 | −1.97 | 69.1 | 14 | 155.9 | 4.3 | 1054 |
| Preparation Embodiment 33 | 2.6 | 1.8 | 2.39 | −1.98 | 69.4 | 23 | 156.2 | 5.3 | 997 |
| Preparation Embodiment 34 | 2.6 | 1.9 | 2.34 | −1.96 | 71.3 | 16 | 156.4 | 4.6 | 1004 |
| Preparation Embodiment 35 | 2.4 | 1.7 | 2.36 | −1.94 | 70.9 | 11 | 157.5 | 5.1 | 1102 |
| Preparation Embodiment 36 | 2.5 | 1.9 | 2.33 | −1.92 | 71.6 | 14 | 155.8 | 5.4 | 1024 |
| Preparation Embodiment 37 | 2.5 | 1.7 | 2.34 | −1.92 | 68.4 | 18 | 156.1 | 4.9 | 1054 |
| Preparation Embodiment 38 | 2.4 | 1.9 | 2.33 | −1.95 | 67.5 | 27 | 154.7 | 5.9 | 954 |
| Preparation Embodiment 39 | 2.2 | 1.8 | 2.36 | −1.94 | 69.4 | 24 | 156.4 | 5.7 | 1017 |
| Preparation Embodiment 40 | 2.4 | 1.9 | 2.37 | −1.91 | 71.6 | 31 | 155.8 | 5.3 | 991 |
| Preparation Embodiment 41 | 2.6 | 1.9 | 2.38 | −1.94 | 70.8 | 27 | 154.8 | 5.1 | 975 |
| Preparation Embodiment 42 | 2.4 | 1.9 | 2.36 | −1.92 | 71.5 | 15 | 156.8 | 4.2 | 1154 |

As can be seen from Table 12, by using a first cladding layer and a second cladding layer containing other elements within the scope of the present application, positive electrode active materials with good performance were also obtained and good battery performances were achieved.

TABLE 13

| No. | Interplanar spacing and angle of the first cladding layer material and the second cladding layer material: Interplanar spacing of the first cladding layer material | Angle of crystal orientation (111) of the first cladding layer material | Interplanar spacing of the second cladding layer material | Angle of crystal orientation (111) of the second cladding layer material |
|---|---|---|---|---|
| Preparation Embodiment 1 | 0.303 | 29.496 | 0.348 | 25.562 |
| Preparation Embodiment 57 | 0.451 | 19.668 | 0.348 | 25.562 |
| Preparation Embodiment 58 | 0.297 | 30.846 | 0.348 | 25.562 |
| Preparation Embodiment 59 | 0.457 | 19.456 | 0.348 | 25.562 |
| Preparation Embodiment 60 | 0.437 | 20.257 | 0.348 | 25.562 |
| Preparation Embodiment 61 | 0.462 | 19.211 | 0.348 | 25.562 |
| Preparation Embodiment 62 | 0.450 | 19.735 | 0.348 | 25.562 |
| Preparation Embodiment 63 | 0.372 | 23.893 | 0.348 | 25.562 |
| Preparation Embodiment 64 | 0.303 | 29.496 | 0.374 | 23.789 |
| Preparation Embodiment 65 | 0.303 | 29.496 | 0.360 | 24.710 |
| Preparation Embodiment 66 | 0.303 | 29.496 | 0.350 | 25.428 |
| Preparation Embodiment 67 | 0.303 | 29.496 | 0.425 | 20.885 |
| Preparation Embodiment 68 | 0.303 | 29.496 | 0.356 | 24.993 |
| Preparation Embodiment 69 | 0.303 | 29.496 | 0.244 | 36.808 |

It can be seen from Table 13 that the interplanar spacing and angle of the first cladding layer and the second cladding layer of the present application are both within the scope of the present application.

II. Investigation of Influence of Sintering Method for the Cladding Layer on the Performance of the Positive Electrode Active Material The batteries in the preparation Embodiments and Comparative Embodiments in the table below were prepared similarly to that in Preparation Embodiment 1, except that the process parameters in the table below were used. The results are shown in Table 14 below.

TABLE 14

Influence of sintering temperature and sintering time on positive electrode active material in steps S4, S6 and S8 cell

| No. | Sintering temperature in S4 (° C.) | Sintering time in S4 (h) | Sintering temperature in S6 (° C.) | Sintering time in S6 (h) | Sintering temperature in S8 (° C.) | Sintering time in S8 (h) | Lattice change rate (%) | Li/Mn antisite defect concentration | Compacted density | Capacity rate of constant – current charging at 3 C (%) | Dissolution of Mn and Fe after cycling (ppm) | Surface oxygen valence | Capacity of button battery at 0.1 C (mAh/g) | Battery cell expansion rate after storage at 60° C. for 30 d (%) | Cycle number for 80% of capacity retention rate (%) at 45° C. |
|---|---|---|---|---|---|---|---|---|---|---|---|---|---|---|---|
| Preparation Embodiment 1 | 650 | 6 | 700 | 8 | 700 | 10 | 2.5 | 1.8 | 2.35 | 70.3 | 7 | −1.93 | 157.2 | 4.2 | 1128 |
| Preparation Embodiment II-1 | 750 | 4 | 600 | 6 | 700 | 6 | 3.0 | 2.4 | 2.24 | 64.2 | 12 | −1.95 | 154.2 | 6.4 | 894 |
| Preparation Embodiment II-2 | 800 | 4 | 600 | 6 | 700 | 6 | 3.1 | 2.4 | 2.21 | 67.3 | 12 | −1.95 | 153.2 | 6.2 | 904 |
| Preparation Embodiment II-3 | 700 | 2 | 600 | 6 | 700 | 6 | 2.9 | 2.3 | 2.20 | 62.3 | 15 | −1.96 | 151.1 | 5.8 | 846 |
| Preparation Embodiment II-4 | 700 | 3 | 600 | 6 | 700 | 6 | 2.7 | 2.1 | 2.23 | 64.3 | 14 | −1.96 | 152.8 | 5.4 | 908 |
| Preparation Embodiment II-5 | 700 | 4 | 500 | 6 | 700 | 6 | 2.5 | 1.8 | 2.31 | 62.4 | 28 | −1.95 | 153.1 | 4.7 | 798 |
| Preparation Embodiment II-6 | 700 | 4 | 700 | 6 | 700 | 6 | 2.5 | 1.8 | 2.34 | 63.5 | 14 | −1.96 | 154.3 | 5.1 | 867 |
| Preparation Embodiment II-7 Embodiment II-8 | 700 | 4 | 600 | 8 | 700 | 6 | 2.5 | 1.8 | 2.31 | 67.3 | 11 | −1.95 | 156.8 | 4.7 | 959 |
| Preparation Embodiment II-9 | 700 | 4 | 600 | 6 | 750 | 6 | 2.5 | 1.8 | 2.35 | 70.3 | 7 | −1.93 | 157.2 | 4.2 | 1128 |
| Preparation Embodiment II-10 | 700 | 4 | 600 | 6 | 800 | 6 | 2.5 | 1.8 | 2.35 | 70.1 | 7 | −1.93 | 156.3 | 4.4 | 1097 |
| Preparation Embodiment II-11 | 700 | 4 | 600 | 6 | 700 | 8 | 2.5 | 1.8 | 2.35 | 68.4 | 8 | −1.91 | 155.4 | 4.7 | 964 |
| Preparation Embodiment II-12 | 700 | 4 | 600 | 6 | 700 | 10 | 2.5 | 1.8 | 2.35 | 66.7 | 10 | −1.95 | 154.7 | 5 | 897 |
| Comparative Embodiment II-1 | 600 | 3 | 600 | 8 | 750 | 8 | 4.8 | 5.3 | 2.28 | 54.1 | 86 | −1.90 | 140.7 | 10.6 | 615 |
| Comparative Embodiment II-2 | 850 | 3 | 600 | 8 | 750 | 8 | 5.3 | 4.7 | 2.38 | 57.2 | 84 | −1.91 | 145.3 | 9.0 | 684 |
| Comparative Embodiment II-3 | 750 | 1.5 | 600 | 8 | 750 | 8 | 4.7 | 4.5 | 2.25 | 53.1 | 87 | −1.91 | 141.9 | 8.8 | 691 |
| Comparative Embodiment II-4 | 750 | 4.5 | 600 | 8 | 750 | 8 | 4.1 | 4.0 | 2.31 | 58.1 | 79 | −1.92 | 140.1 | 8.1 | 711 |
| Comparative Embodiment II-5 | 750 | 3 | 450 | 8 | 750 | 8 | 4.8 | 4.6 | 2.28 | 52.1 | 78 | −1.90 | 141.2 | 8.7 | 601 |
| Comparative Embodiment II-6 | 750 | 3 | 750 | 8 | 750 | 8 | 3.9 | 4.8 | 2.35 | 49.7 | 78 | −1.95 | 142.4 | 8.8 | 604 |
| Comparative Embodiment II-7 | 750 | 3 | 600 | 5.5 | 750 | 8 | 4.4 | 4.2 | 2.24 | 45.4 | 81 | −1.93 | 142.9 | 8.8 | 614 |

TABLE 14-continued

Influence of sintering temperature and sintering time on positive electrode active material in steps S4, S6 and S8 cell

| No. | Sintering temperature in S4 (° C.) | Sintering time in S4 (h) | Sintering temperature in S6 (° C.) | Sintering time in S6 (h) | Sintering temperature in S8 (° C.) | Sintering time in S8 (h) | Lattice change rate (%) | Li/Mn antisite defect concentration | Compacted density | Capacity rate of constant - current charging at 3 C (%) | Dissolution of Mn and Fe after cycling (ppm) | Surface oxygen valence | Capacity of button battery at 0.1 C (mAh/g) | Battery cell expansion rate after storage at 60° C. for 30 d (%) | Cycle number for 80% of capacity retention rate (%) at 45° C. |
|---|---|---|---|---|---|---|---|---|---|---|---|---|---|---|---|
| Comparative Embodiment II-8 | 750 | 3 | 600 | 10.5 | 750 | 00 | 4.1 | 3.9 | 2.34 | 49.1 | 79 | −1.92 | 141.1 | 7.9 | 684 |
| Comparative Embodiment II-9 | 750 | 3 | 600 | 8 | 650 | 8 | 5.2 | 4.1 | 2.31 | 48.4 | 81 | −1.93 | 141.8 | 10.2 | 567 |
| Comparative Embodiment II-10 | 750 | 3 | 600 | 8 | 850 | 8 | 5.0 | 4.0 | 2.34 | 49.1 | 78 | −1.95 | 141.2 | 8.7 | 678 |
| Comparative Embodiment II-11 | 750 | 3 | 600 | 8 | 750 | 5.5 | 4.3 | 4.2 | 2.27 | 47.8 | 84 | −1.91 | 142.9 | 9.4 | 521 |
| Comparative Embodiment II-12 | 750 | 3 | 600 | 8 | 750 | 10.5 | 50 | 4.9 | 2.35 | 49.8 | 78 | −1.94 | 141.7 | 9.5 | 655 |

It can be seen from the above data that when the sintering temperature is in the range of 650-800° C. and the sintering time is 2-6 h in step S4, the sintering temperature is 500-700° C. and the sintering time is 6-10 h in step S6, and the sintering temperature is 700-800° C. and the sintering time is 6-10 h in step S8, smaller lattice change rate, smaller Li/Mn antisite defect concentration, less dissolution of elements manganese and iron, better capacity rate of constant-current charging at 3C, larger battery capacity, better cycling performance of batteries, and better high-temperature storage stability are achieved.

Furthermore, compared with Comparative Embodiment II-4 (in step S4, the sintering temperature is 750° C. and the sintering time is 4.5 h), better performances of positive electrode active material and better performances of batteries are achieved in Preparation Embodiment II-1 (in step S4, the sintering temperature is 750° C. and the sintering time is 4 h). This shows that when the sintering temperature in step S4 is 750° C. or greater than 750° C., the sintering time needs to be controlled to be 4.5 h or less.

III. Investigation of the Influence of Reaction Temperature and Reaction Time in Inner Core Preparation on the Performance of Positive Electrode Active Materials The preparation of positive electrode active materials and batteries in the preparation Embodiments in the table below is similar to that in Preparation Embodiment 1, and the differences in the preparation of the positive electrode active materials are shown by the method parameters in the table below. The results are also shown in the table below.

TABLE 15

The influence of reaction temperature and reaction time in inner core preparation on the performance of positive electrode active materials

| No. | Step S1 Reaction temperature (° C.) | Step S1 Reaction time (h) | Step S2 Reaction temperature (° C.) | Step S2 Reaction time (h) | Lattice change rate (%) | Li/Mn antisite defect concertration (%) | Compacted density (g/cm³) | Capacity rate of constant – current charging at 3 C (%) | Dissolution of Mn and Fe after cycling (ppm) | Surface oxygen valence | Capacity of button battery at 0.1 C (mAh/g) | Battery cell expansion rate (%) after storage at 60° C. for 30 d | Cycle number for 80% of capacity retention rate (%) at 45° C. |
|---|---|---|---|---|---|---|---|---|---|---|---|---|---|
| Preparation Embodiment 1 | 80 | 6 | 80 | 10 | 2.5 | 1.8 | 2.35 | 70.3 | 7 | −1.93 | 157.2 | 4.2 | 1128 |
| Preparation Embodiment III-1 | 70 | 6 | 80 | 10 | 2.8 | 3.4 | 2.30 | 60.1 | 34 | −1.93 | 155.4 | 5.8 | 876 |
| Preparation Embodiment III-2 | 60 | 6 | 80 | 10 | 3.1 | 3.1 | 2.33 | 64.2 | 18 | −1.92 | 156.2 | 5.1 | 997 |
| Preparation Embodiment III-4 | 100 | 6 | 80 | 10 | 2.3 | 2.4 | 2.37 | 71.3 | 7 | −1.94 | 156.8 | 4.1 | 1137 |
| Preparation Embodiment III-5 | 120 | 6 | 80 | 10 | 2.1 | 2.2 | 2.38 | 72.1 | 5 | −1.92 | 155.4 | 4.0 | 1158 |
| Preparation Embodiment III-6 | 80 | 2 | 80 | 10 | 2.8 | 3.2 | 2.27 | 68.4 | 24 | −1.90 | 154.9 | 5.1 | 895 |
| Preparation Embodiment III-7 | 80 | 3 | 80 | 10 | 2.6 | 2.7 | 2.29 | 69.7 | 17 | −1.92 | 156.1 | 4.7 | 967 |
| Preparation Embodiment III-8 | 80 | 5 | 80 | 10 | 2.4 | 1.9 | 2.34 | 70.6 | 8 | −1.94 | 156.8 | 4.3 | 1137 |
| Preparation Embodiment III-9 | 80 | 7 | 80 | 10 | 2.5 | 1.8 | 2.35 | 68.3 | 11 | −1.94 | 156.4 | 4.8 | 987 |
| Preparation III-10 | 80 | 9 | 80 | 10 | 2.6 | 1.8 | 2.36 | 67.2 | 15 | −1.93 | 155.9 | 5.2 | 921 |
| Preparation III-11 | 80 | 6 | 40 | 10 | 3.2 | 3.4 | 2.28 | 67.8 | 35 | −1.94 | 156.8 | 5.4 | 894 |
| Preparation III-12 | 80 | 6 | 60 | 10 | 2.8 | 2.9 | 2.31 | 68.7 | 18 | −1.95 | 157.0 | 4.9 | 927 |
| Preparation III-13 | 80 | 6 | 80 | 10 | 2.5 | 2.7 | 2.35 | 70.3 | 7 | −1.93 | 157.2 | 4.2 | 1128 |
| Preparation III-14 | 80 | 6 | 100 | 10 | 2.7 | 2.8 | 2.33 | 69.4 | 15 | −1.93 | 156.7 | 4.6 | 957 |
| Preparation III-15 | 80 | 6 | 120 | 10 | 2.8 | 3.1 | 2.32 | 68.1 | 24 | −1.94 | 156.2 | 4.8 | 914 |
| Preparation III-16 | 80 | 6 | 90 | 1 | 3.7 | 3.8 | 2.26 | 67.9 | 38 | −1.93 | 155.8 | 5.2 | 885 |

TABLE 15-continued

The influence of reaction temperature and reaction time in inner core preparation on the performance of positive electrode active materials

| No. | Step S1 Reaction temperature (° C.) | Step S1 Reaction time (h) | Step S2 Reaction temperature (° C.) | Step S2 Reaction time (h) | Lattice change rate (%) | Li/Mn antisite defect concentration (%) | Compacted density (g/cm$^3$) | Capacity rate of constant-current charging at 3 C (%) | Dissolution of Mn and Fe after cycling (ppm) | Surface oxygen valence | Capacity of button battery at 0.1 C (mAh/g) | Battery cell expansion rate (%) after storage at 60° C. for 30 d | Cycle number for 80% of capacity retention rate (%) at 45° C. |
|---|---|---|---|---|---|---|---|---|---|---|---|---|---|
| Preparation III-17 | 80 | 6 | 90 | 3 | 3.4 | 3.4 | 2.31 | 68.2 | 32 | −1.94 | 156.1 | 4.8 | 915 |
| Preparation III-18 | 80 | 6 | 90 | 5 | 3.1 | 3.1 | 2.33 | 69.1 | 27 | −1.92 | 156.4 | 4.6 | 934 |
| Preparation III-19 | 80 | 6 | 90 | 7 | 2.8 | 2.9 | 2.34 | 69.4 | 15 | −1.93 | 156.8 | 4.5 | 971 |
| Preparation III-20 | 80 | 6 | 90 | 9 | 2.5 | 2.7 | 2.35 | 70.3 | 7 | −1.93 | 157.2 | 4.2 | 1128 |

As can be seen from Table 15, when the reaction temperature is in the range of 60-120° C. and the reaction time is 2-9 h in step S1, and the reaction temperature is in the range of 40-120° C. and the reaction time is 1-10 h in step S2, the performances of the positive electrode active material powder (lattice change rate, Li/Mn antisite defect concentration, surface oxygen valence, and compacted density) and the performance of the prepared battery (capacity, high temperature cycling performance, high temperature storage performance) are excellent.

IV. Battery Test

The secondary batteries prepared by adopting the positive electrode sheets P1-P42 were tested as follows:

(1) The energy density and furnace temperature test results of the secondary battery are measured according to the method in the national standard GB 38031-2020 "Safety Requirements for Power Batteries for Electric Vehicles";

(2) Nail penetration test: the secondary battery is charged to 100% SOC, the battery cell is penetrated with a Φ8 mm steel needle at a speed of 25 mm/2, and observed for 1 h; if no fire occurs, the secondary battery passes the test;

(3) The room-temperature 1C rate charge capacity retention rate and low-temperature discharge capacity retention rate of the secondary battery are measured according to the national standard GBT31486-2015 "Electrical Performance Requirements and Test Methods for Power Batteries for Electric Vehicles", to obtain the kinetic performance data of the battery cell; and (4) The cycle life data of secondary batteries is measured according to the national standard GBT31484-2015 "Cycle Life Requirements and Test Methods for Power Batteries for Electric Vehicles".

The above results are shown in Table 16.

TABLE 16

Battery test results

| Positive electrode sheet for battery cell | Energy density (Wh/L) | Energy density (Wh/kg) | Furnace temperature experiment | Nail penetration experiment | Room-temperature 1 C charge capacity retention rate (Vs 0.33 C) | Cycle life, Cycles (80% SOH, 25° C.) | −20° C, 0.33 C discharge capacity retention rate |
|---|---|---|---|---|---|---|---|
| Positive electrode sheet P1 | 431.4 Base | 191.3 Base | Pass | Pass | 84% | 3000 | 70% |
| Positive electrode sheet P2 | 567.7 ↑ 32% | 228.5 ↑ 19% | Fire | Fire | 100% | 2000 | 80% |
| Positive electrode sheet P3 | 476.7 ↑ 10% | 209.8 ↑ 10% | Pass | Pass | 92% | 2610 | 76% |
| Positive electrode sheet P4 | 508.6 ↑ 18% | 212.8 ↑ 11% | Pass | Pass | 91% | 2560 | 74% |
| Positive electrode sheet P5 | 454.4 ↑ 5% | 200.6 ↑ 5% | Pass | Pass | 88% | 2840 | 74% |
| Positive electrode sheet P6 | 526.7 ↑ 22% | 215.8 ↑ 13% | Pass | Pass | 96% | 2360 | 78% |
| Positive electrode sheet P7 | 476.7 ↑ 10% | 209.8 ↑ 10% | Pass | Pass | 92% | 2420 | 75% |
| Positive electrode sheet P8 | 476.7 ↑ 10% | 209.8 ↑ 10% | Pass | Pass | 92% | 2590 | 77% |
| Positive electrode sheet P9 | 454.4 ↑ 5% | 200.6 ↑ 5% | Pass | Pass | 89% | 2850 | 70% |
| Positive electrode sheet P10 | 467.4 ↑ 8% | 201.3 ↑ 5% | Pass | Pass | 88% | 2650 | 73% |
| Positive electrode sheet P11 | 526.7 ↑ 22% | 215.8 ↑ 13% | Pass | Pass | 95% | 2280 | 77% |
| Positive electrode sheet P12 | 526.7 ↑ 22% | 215.8 ↑ 13% | Pass | Pass | 96% | 2290 | 78% |
| Positive electrode sheet P13 | 454.4 ↑ 5% | 200.6 ↑ 5% | Pass | Pass | 90% | 2780 | 73% |
| Positive electrode sheet P14 | 456.1 ↑ 6% | 200.7 ↑ 5% | Pass | Pass | 98% | 2270 | 78% |
| Positive electrode sheet P15 | 476.7 ↑ 10% | 209.8 ↑ 10% | Pass | Pass | 93% | 2710 | 75% |
| Positive electrode sheet P16 | 454.4 ↑ 5% | 200.6 ↑ 5% | Pass | Pass | 88% | 2660 | 73% |

TABLE 16-continued

| Battery test results | | | | | | | |
|---|---|---|---|---|---|---|---|
| Positive electrode sheet for battery cell | Energy density (Wh/L) | Energy density (Wh/kg) | Furnace temperature experiment | Nail penetration experiment | Room-temperature 1 C charge capacity retention rate (Vs 0.33 C) | Cycle life, Cycles (80% SOH, 25° C.) | −20° C, 0.33 C discharge capacity retention rate |
| Positive electrode sheet P17 | 526.7 ↑ 22% | 215.8 ↑ 13% | Pass | Pass | 97% | 2360 | 80% |
| Positive electrode sheet P18 | 508.6 ↑ 18% | 212.8 ↑ 11% | Pass | Pass | 91% | 2500 | 74% |
| Positive electrode sheet P19 | 445.4 ↑ 3% | 196.9 ↑ 3% | Pass | Pass | 85% | 2940 | 72% |
| Positive electrode sheet P20 | 479.4 ↑ 11% | 210.9 ↑ 10% | Pass | Pass | 94% | 2480 | 77% |
| Positive electrode sheet P21 | 462.0 ↑ 7% | 204.0 ↑ 7% | Pass | Pass | 89% | 2670 | 70% |
| Positive electrode sheet P22 | 445.4 ↑ 3% | 196.9 ↑ 3% | Pass | Pass | 87% | 2840 | 70% |
| Positive electrode sheet P23 | 511.4 ↑ 19% | 212.2 ↑ 11% | Pass | Pass | 94% | 2460 | 77% |
| Positive electrode sheet P24 | 481.9 ↑ 12% | 204.8 ↑ 7% | Pass | Pass | 91% | 2690 | 75% |
| Positive electrode sheet P25 | 462.0 ↑ 7% | 204.0 ↑ 7% | Pass | Pass | 90% | 2540 | 74% |
| Positive electrode sheet P26 | 540.6 ↑ 25% | 219.2 ↑ 15% | Pass | Pass | 99% | 1850 | 79% |
| Positive electrode sheet P27 | 511.4 ↑ 19% | 212.2 ↑ 11% | Pass | Pass | 95% | 2290 | 76% |
| Positive electrode sheet P28 | 462.0 ↑ 7% | 204.0 ↑ 7% | Pass | Pass | 91% | 2680 | 75% |
| Positive electrode sheet P29 | 540.6 ↑ 25% | 219.2 ↑ 15% | Pass | Pass | 99% | 2140 | 79% |
| Positive electrode sheet P30 | 511.4 ↑ 19% | 212.2 ↑ 11% | Pass | Pass | 95% | 2350 | 77% |
| Positive electrode sheet P31 | 567.7 ↑ 32% | 228.5 ↑ 19% | Fire | Fire | 100% | 2100 | 80% |
| Positive electrode sheet P32 | 567.7 ↑ 32% | 228.5 ↑ 19% | Fire | Fire | 100% | 1600 | 81% |
| Positive electrode sheet P33 | 567.7 ↑ 32% | 228.5 ↑ 19% | Fire | Fire | 100% | 1500 | 80% |
| Positive electrode sheet P34 | 567.7 ↑ 32% | 228.5 ↑ 19% | Fire | Fire | 100% | 1300 | 79% |
| Positive electrode sheet P35 | 567.7 ↑ 32% | 228.5 ↑ 19% | Fire | Fire | 100% | 1100 | 81% |
| Positive electrode sheet P36 | 567.7 ↑ 32% | 228.5 ↑ 19% | Fire | Fire | 100% | 1000 | 78% |
| Positive electrode sheet P37 | 508.6 ↑ 18% | 212.8 ↑ 11% | Pass | Pass | 91% | 2570 | 74% |
| Positive electrode sheet P38 | 508.6 ↑ 18% | 212.8 ↑ 11% | Pass | Pass | 90% | 2030 | 76% |
| Positive electrode sheet P39 | 508.6 ↑ 18% | 212.8 ↑ 11% | Pass | Pass | 93% | 2450 | 76% |

TABLE 16-continued

| Battery test results | | | | | | | |
|---|---|---|---|---|---|---|---|
| Positive electrode sheet for battery cell | Energy density (Wh/L) | Energy density (Wh/kg) | Furnace temperature experiment | Nail penetration experiment | Room-temperature 1 C charge capacity retention rate (Vs 0.33 C) | Cycle life, Cycles (80% SOH, 25° C.) | −20° C, 0.33 C discharge capacity retention rate |
| Positive electrode sheet P40 | 508.6 ↑ 18% | 212.8 ↑ 11% | Pass | Pass | 93% | 2120 | 73% |
| Positive electrode sheet P41 | 508.6 ↑ 18% | 212.8 ↑ 11% | Pass | Pass | 92% | 2060 | 77% |
| Positive electrode sheet P42 | 508.6 ↑ 18% | 212.8 ↑ 11% | Pass | Pass | 92% | 2150 | 74% |

According to the above results, it can be seen that:

Compared with the secondary battery using the positive electrode sheet P1, the secondary batteries using the positive electrode sheets P3-P30 and positive electrode sheets P37-P42 had higher energy density and higher-room temperature rate charge capacity retention rate, the low-temperature discharge capacity retention rate of secondary batteries using the positive electrode sheets P3-P8, positive electrode sheets P10-P20, positive electrode sheets P23-P30, and positive electrode sheets P37-P42 was higher, and the secondary batteries using the positive electrode sheets P3-P30 and positive electrode sheets P37-P42 successfully passed the furnace temperature test and the nail penetration test; compared with the secondary battery using the positive electrode sheets P3-P30, the secondary battery using the positive electrode sheet P2 failed to pass the furnace temperature test and the nail penetration test, and caught fire during the test; also, the cycle life of the secondary batteries using the positive electrode sheets P3-P30 was longer than that of the secondary battery using the positive electrode sheet P2. Compared with the secondary batteries using the positive electrode sheets P37-P42, the secondary batteries using the positive electrode sheets P31-P36 failed to pass the furnace temperature experiment and the nail penetration test, and caught fire during the test; the positive electrode sheets P37-P42 comprise a first positive electrode active material and a second positive electrode active material, and the positive electrode sheets P31-P36 comprise an equivalent amount of the corresponding second positive electrode active material. It can be seen that the cycle life of the secondary battery using positive electrode sheets comprising the positive electrode active material and the second positive electrode active material is longer than that of the secondary battery using positive electrode sheets comprising the second positive electrode active material alone.

The above shows that the secondary battery made of the positive electrode sheet of the present application has higher energy density, higher battery cell rate performance, better kinetic performance and low-temperature performance, longer cycle life, and higher safety.

It should be noted that the present application is not limited to the embodiments above. The above embodiments are merely exemplary, and embodiments having substantially the same technical idea and the same effects within the scope of the technical solutions of the present application are all included in the technical scope of the present application. In addition, without departing from the scope of the subject matter of the present application, various modifications that can be conceived by those skilled in the art are applied to the embodiments, and other modes constructed by combining some of the constituent elements of the embodiments are also included in the scope of the present application.

The invention claimed is:

1. A positive electrode sheet comprising a positive electrode current collector and at least one positive electrode film, wherein at least one positive electrode film is arranged on at least one surface of the positive electrode current collector;

the positive electrode film is selected from a single-layer structure and a multi-layer structure; when the positive electrode film is a single-layer structure, the positive electrode film comprises both a first positive electrode active material with a core-shell structure and a second positive electrode active material; or, when the positive electrode film is a multi-layer structure, at least one layer of multi-layer structure comprises both a first positive electrode active material with a core-shell structure and a second positive electrode active material;

the first positive electrode active material includes an inner core, a first cladding layer coating the inner core, a second cladding layer coating the first cladding layer and a third cladding layer coating the second cladding layer; the inner core has a chemical formula of $Li_{1+x}Mn_{1-y}A_yP_{1-z}R_zO_4$, the first cladding layer comprises crystalline pyrophosphates $Li_aMP_2O_7$ and/or $M_b(P_2O_7)_c$, the second cladding layer comprises crystalline phosphate $XPO_4$, and the third cladding layer is carbon;

wherein, the A is selected from one or more elements of Zn, Al, Na, K, Mg, Mo, W, Ti, V, Zr, Fe, Ni, Co, Ga, Sn, Sb, Nb and Ge;

the R is selected from one or more elements of B, Si, N and S;

the x is selected from any value within the range of −0.100 to 0.100;

the y is selected from any value within the range of 0.001 to 0.500;

the z is selected from any value within the range of 0.001 to 0.100;

M in the crystalline pyrophosphates $Li_aMP_2O_7$ and $M_b(P_2O_7)_c$ is each independently one or more elements selected from Fe, Ni, Mg, Co, Cu, Zn, Ti, Ag, Zr, Nb and Al, the a is selected from any value within the range of 0 to 2;

the b is selected from any value within the range of 1 to 4;

the c is selected from any value within the range of 1 to 6;

the X is one or more elements selected from Li, Fe, Ni, Mg, Co, Cu, Zn, Ti, Ag, Zr, Nb and Al; and the second positive electrode active material is selected from one or more of $LiNi_dCo_eMn_{(1-d-e)}O_2$, $LiNi_dCo_eAl_{(1-d-e)}O_2$ and $LiCoO_2$, wherein, d is independently selected from any value within the range of 0.3-0.9, and the sum of d and e is selected from any value within the range of 0.3-0.9.

2. The positive electrode sheet according to claim 1, wherein the positive electrode film is a multi-layer structure, and the multi-layer structure comprises a first positive electrode active material with a core-shell structure and a second positive electrode active material in different layer;

optionally, any one of the positive electrode film layers with a multi-layer structure comprises the first positive electrode active material and the second positive electrode active material in adjacent layers, respectively.

3. The positive electrode sheet according to claim 1, wherein the positive electrode film comprises a positive electrode film A and a positive electrode film B respectively arranged on the two surfaces of the positive electrode current collector; the positive electrode film A and the positive electrode film B are each independently a single-layer structure or a multi-layer structure; at least one layer of the positive electrode film A comprises a first positive electrode active material with a core-shell structure, and at least one layer of the positive electrode film B comprises a second positive electrode active material.

4. The positive electrode sheet according to claim 1, wherein mass ratio of the first active material to the second active material is 1:7-7:1.

5. The positive electrode sheet according to claim 1, wherein, in the first positive electrode active material, the A is selected from one or more elements of Fe, Ti, V, Ni, Co and Mg, and/or, the R is selected from one element of B, Si, N and S, and/or, the ratio of y to 1-y is selected from 1:10 to 1:1, and/or, the ratio of z to 1-z is selected from 1:9 to 1:999.

6. The positive electrode sheet according to claim 1, wherein, in the first positive electrode active material, interplanar spacing of the crystalline pyrophosphate in the first cladding layer is in the range of 0.293 nm-0.470 nm, and angle of the crystal orientation (111) is in the range of 18.00°-32.00°; and interplanar spacing of the crystalline phosphate in the secondary cladding layer is in the range of 0.244 nm to 0.425 nm, and angle of the crystal orientation (111) is in the range of 20.00°-37.00°.

7. The positive electrode sheet according to claim 1, wherein, in the first electrode active material, the carbon in the third cladding layer is a mixture of SP2 hybridized carbon and SP3 hybridized carbon.

8. The positive electrode sheet according to claim 1, wherein, in the first positive electrode active material, the coating amount of the first cladding layer is greater than 0 and less than or equal to 6 wt %, based on the weight of the inner core; and/or the coating amount of the second cladding layer is greater than 0 and less than or equal to 6 wt %, based on the weight of the inner core; and/or the coating amount of the third cladding layer is greater than 0 and less than or equal to 6 wt %, based on the weight of the inner core.

9. The positive electrode sheet according to claim 1, wherein, in the first positive electrode active material, the first cladding layer has a thickness of 1 nm-10 nm; and/or the second cladding layer has a thickness of 2 nm-15 nm; and/or the third cladding layer has a thickness of 2 nm-25 nm.

10. The positive electrode sheet according to claim 1, wherein, in the first positive electrode active material, based on the weight of the first positive electrode active material, the content of element manganese is in the range of 10 wt % to 35 wt %, and/or, the content of element phosphorus is in the range of 12 wt % to 25 wt %, and/or, the weight ratio of element manganese to element phosphorus is in the range of 0.90-1.25.

11. The positive electrode sheet according to claim 1, wherein lattice change rate of the first positive electrode active material before and after complete intercalation and deintercalation of lithium is 4% or less.

12. The positive electrode sheet according to claim 1, wherein Li/Mn antisite defect concentration of the first positive electrode active material is 4% or less.

13. The positive electrode sheet according to claim 1, wherein compacted density of the first positive electrode active material at 3T is 2.2 g/cm$^3$ or more.

14. The positive electrode sheet according to claim 1, wherein, surface oxygen valence of the first positive electrode active material is −1.90 or less.

15. The positive electrode sheet according to claim 1, wherein the ratios of d, (1-d-e) and e in the $LiNi_dCo_eMn_{(1-d-e)}O_2$ and $LiNi_dCo_eAl_{(1-d-e)}O_2$ are each independently 5:2:3 or 3:1:1 or 8:1:1.

16. The positive electrode sheet according to claim 1, wherein the sum of the mass of the first positive electrode active material and the second positive electrode active material accounts for 88%-98.7% of the mass of the positive electrode sheet.

17. A secondary battery, comprising the positive electrode sheet of claim 1.

18. A battery module, comprising the secondary battery of claim 17.

19. A battery pack, comprising the battery module of claim 18.

20. An electrical apparatus, comprising at least one of the secondary battery of claim 17.

* * * * *